(12) United States Patent
Lair

(10) Patent No.: US 6,938,408 B2
(45) Date of Patent: Sep. 6, 2005

(54) THRUST VECTORING AND VARIABLE EXHAUST AREA FOR JET ENGINE NOZZLE

(75) Inventor: Jean-Pierre Lair, San Antonio, TX (US)

(73) Assignee: Propulsion Vectoring, L.P., San Antonio, TX (US)

( * ) Notice: Subject to any disclaimer, the term of this patent is extended or adjusted under 35 U.S.C. 154(b) by 0 days.

(21) Appl. No.: 10/379,633

(22) Filed: Mar. 5, 2003

(65) Prior Publication Data

US 2003/0159430 A1 Aug. 28, 2003

Related U.S. Application Data

(63) Continuation-in-part of application No. 09/842,178, filed on Apr. 26, 2001, now Pat. No. 6,546,716.
(60) Provisional application No. 60/410,833, filed on Sep. 16, 2002.

(51) Int. Cl.[7] .............................. F02K 1/11; F02K 1/60; F02K 1/68
(52) U.S. Cl. ......................... 60/226.2; 60/230; 60/232; 239/265.35; 239/265.33
(58) Field of Search ............................. 60/771, 226.2, 60/230, 232; 239/265.19, 265.33, 265.35, 265.37

(56) References Cited

U.S. PATENT DOCUMENTS

| | | |
|---|---|---|
| 2,620,622 A | 12/1952 | Lundberg |
| 2,680,948 A | 6/1954 | Greene |
| 2,715,312 A | 8/1955 | Brame |
| 2,735,264 A | 2/1956 | Jewett |
| 2,847,823 A | 8/1958 | Brewer |
| 2,975,593 A | 3/1961 | Bauger et al. |
| 2,980,199 A | 4/1961 | Keen |
| 2,989,845 A | 6/1961 | Howald |
| 3,058,449 A | 10/1962 | Corbett |
| 3,266,734 A | 8/1966 | Gahagan et al. |
| 3,290,887 A | 12/1966 | Poole |
| 3,386,247 A | 6/1968 | Gross et al. |
| 3,550,855 A | 12/1970 | Feld et al. |
| 3,568,792 A | 3/1971 | Urquhart |
| 3,601,340 A | 8/1971 | Hilbig |
| 3,601,992 A | 8/1971 | Maison |
| 3,612,399 A | 10/1971 | Rodgers et al. |
| 3,616,648 A | 11/1971 | Weise |

(Continued)

FOREIGN PATENT DOCUMENTS

| | | |
|---|---|---|
| AU | 261 487 | 6/1960 |
| CA | 2099502 | 6/1993 |
| CA | 2126313 | 7/1993 |
| CA | 2 077 232 | 3/1994 |
| CA | 2 156 089 | 8/1994 |
| DE | 2 027 882 | 12/1971 |
| FR | 86 09838 | 1/1988 |
| FR | 88 14695 | 5/1990 |
| FR | 91 06138 | 11/1992 |
| FR | 76 10968 | 11/1997 |
| GB | 2168298 A | 6/1986 |
| IT | 648 842 | 11/1962 |
| SE | SW 182 858 | 3/1963 |

Primary Examiner—Ted Kim
(74) Attorney, Agent, or Firm—Thompson & Knight LLP; James J. Murphy

(57) ABSTRACT

A jet engine nozzle having a pair of pivoting extension arms and a pair of pivoting shells connected to a jet pipe is provided. The first extension arm is pivotally connected to the jet pipe at a first location, while the second extension arm is pivotally connected to the jet pipe at a second location. Each shell is pivotally connected at both the first and second locations. An axis of rotation associated with the first location is coaxial to an axis of rotation associated with the second location. Independent actuation means are provided to rotate the extension arms and the shells, thereby enabling adjustment of the thrust-vector angle or the exhaust area of the nozzle.

19 Claims, 43 Drawing Sheets

U.S. PATENT DOCUMENTS

| | | | |
|---|---|---|---|
| 3,685,737 A | 8/1972 | Ronald | |
| 3,833,187 A | 9/1974 | Kahler et al. | |
| 3,837,411 A | 9/1974 | Nash et al. | |
| 3,837,578 A * | 9/1974 | Leibach | 239/265.35 |
| 3,837,579 A | 9/1974 | Camboulives et al. | |
| 3,856,239 A | 12/1974 | Leibach | |
| 3,893,626 A | 7/1975 | Leibach et al. | |
| 4,030,687 A | 6/1977 | Hapke | |
| 4,049,220 A | 9/1977 | Rodgers | |
| 4,147,027 A | 4/1979 | Greathouse | |
| 4,182,501 A | 1/1980 | Fage | |
| 4,194,692 A | 3/1980 | Dickenson | |
| 4,212,442 A | 7/1980 | Fage | |
| 4,349,155 A | 9/1982 | Donguy | |
| 4,362,015 A | 12/1982 | Fage | |
| 4,410,152 A | 10/1983 | Kennedy et al. | |
| 4,424,669 A | 1/1984 | Fage | |
| 4,485,970 A | 12/1984 | Fournier et al. | |
| 4,506,850 A | 3/1985 | McConnell | |
| 4,508,270 A | 4/1985 | Joubert | |
| 4,519,561 A | 5/1985 | Timms | |
| 4,577,814 A | 3/1986 | Bayle-Laboure et al. | |
| 4,581,890 A | 4/1986 | Giraud | |
| 4,592,201 A | 6/1986 | Dusa et al. | |
| 4,618,094 A | 10/1986 | Palmer | |
| 4,671,460 A | 6/1987 | Kennedy et al. | |
| 4,763,840 A | 8/1988 | Madden | |
| 4,836,451 A | 6/1989 | Herrick et al. | |
| 4,865,256 A * | 9/1989 | Durand et al. | 239/265.37 |
| 4,966,327 A | 10/1990 | Fage et al. | |
| 4,976,466 A | 12/1990 | Vauchel | |
| 5,007,495 A | 4/1991 | Yoshida et al. | |
| 5,040,730 A | 8/1991 | Hogie et al. | |
| 5,054,285 A | 10/1991 | Geidel et al. | |
| 5,102,049 A | 4/1992 | Ward | |
| 5,176,340 A | 1/1993 | Lair | |
| 5,181,676 A | 1/1993 | Lair | |
| 5,192,023 A | 3/1993 | Fage et al. | |
| 5,221,048 A | 6/1993 | Lair | |
| 5,224,342 A | 7/1993 | Lair | |
| 5,310,117 A | 5/1994 | Fage et al. | |
| 5,343,696 A | 9/1994 | Rohra et al. | |
| 5,372,006 A | 12/1994 | Lair | |
| 5,390,879 A | 2/1995 | Lair | |
| 5,419,515 A | 5/1995 | Lair | |
| 5,571,262 A | 11/1996 | Camboulives | |
| 5,666,802 A | 9/1997 | Lair | |
| 5,730,392 A | 3/1998 | Lair | |
| 5,735,557 A | 4/1998 | Harvey | |
| 5,775,639 A | 7/1998 | Fage | |
| 5,826,823 A | 10/1998 | Lymons et al. | |
| 5,833,140 A | 11/1998 | Loffredo et al. | |
| 6,027,071 A | 2/2000 | Lair | |
| 6,546,716 B2 | 4/2003 | Lair | |

* cited by examiner

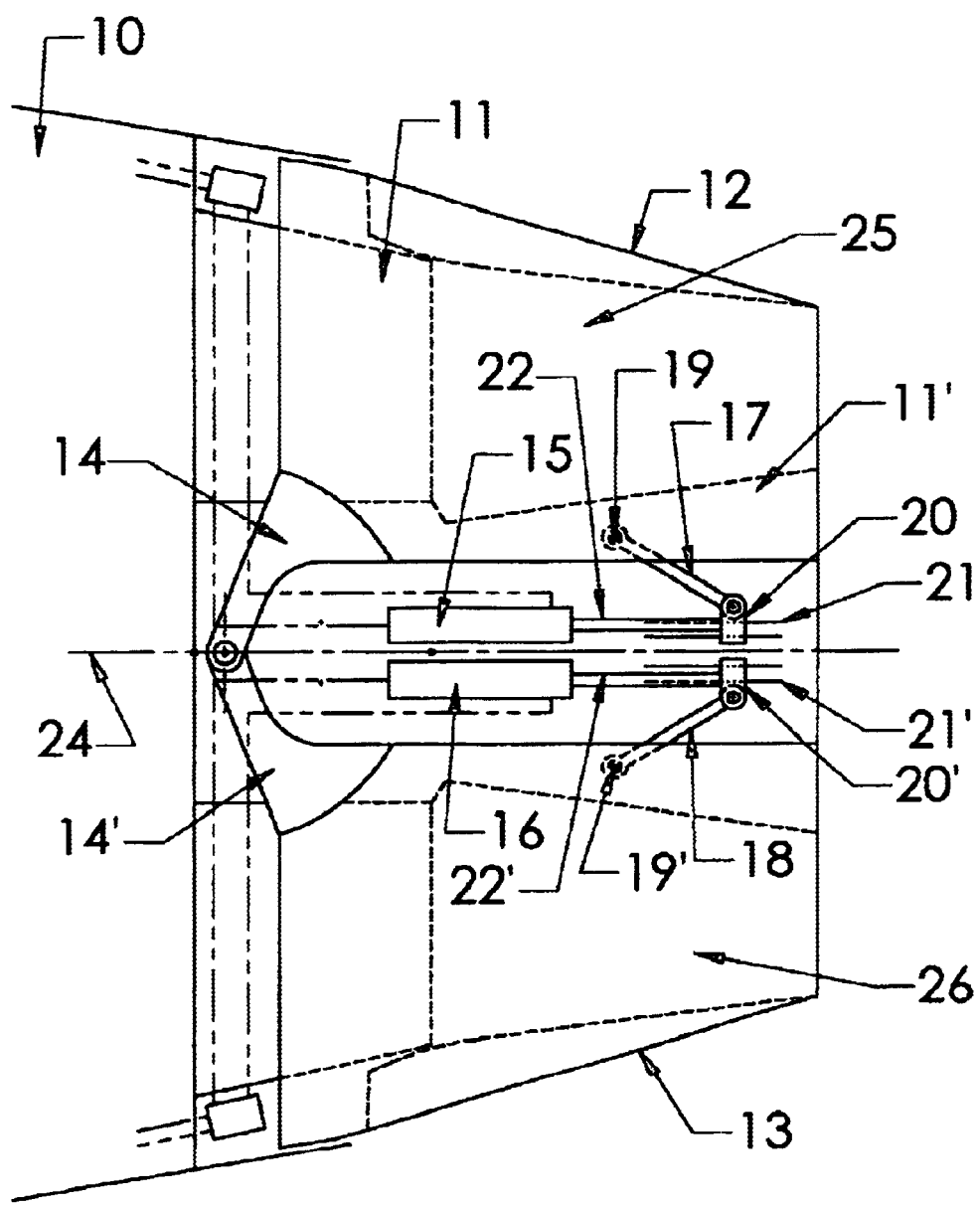

FIGURE 2  FIGURE 3  FIGURE 4
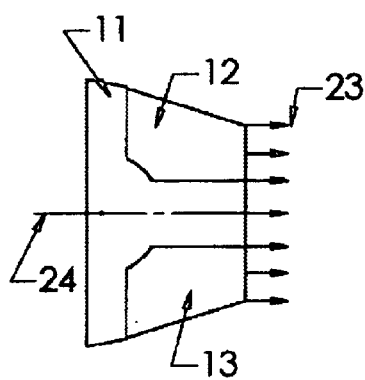
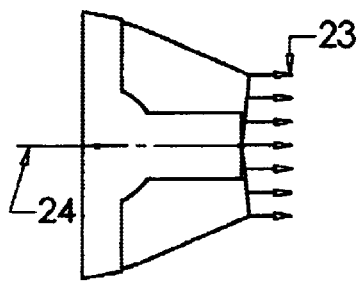
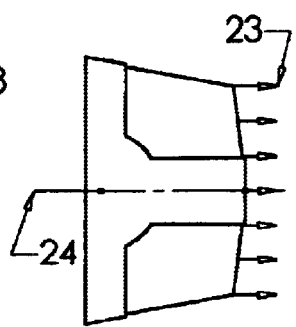
NOMINAL    NOMINAL - X%    NOMINAL + Y%

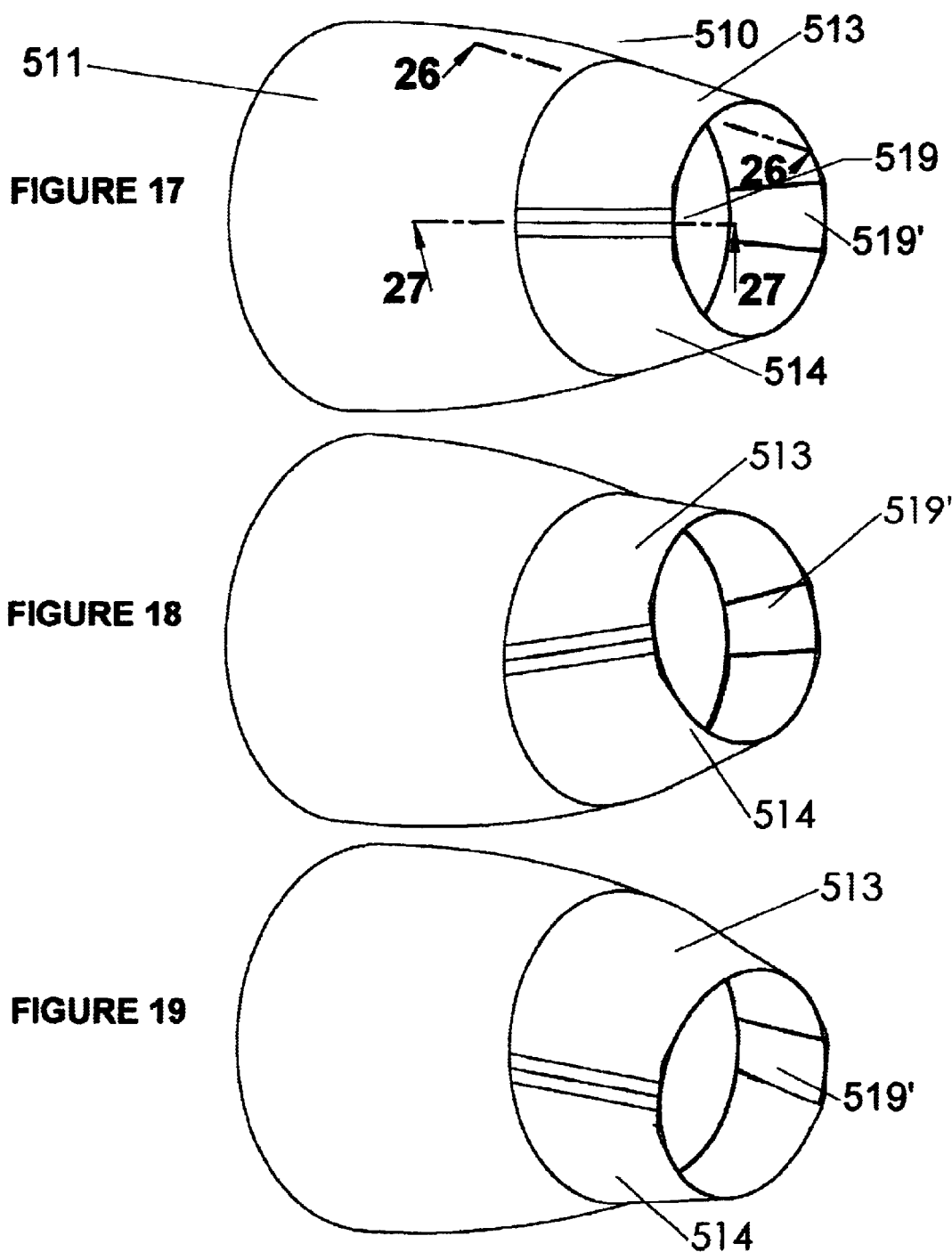

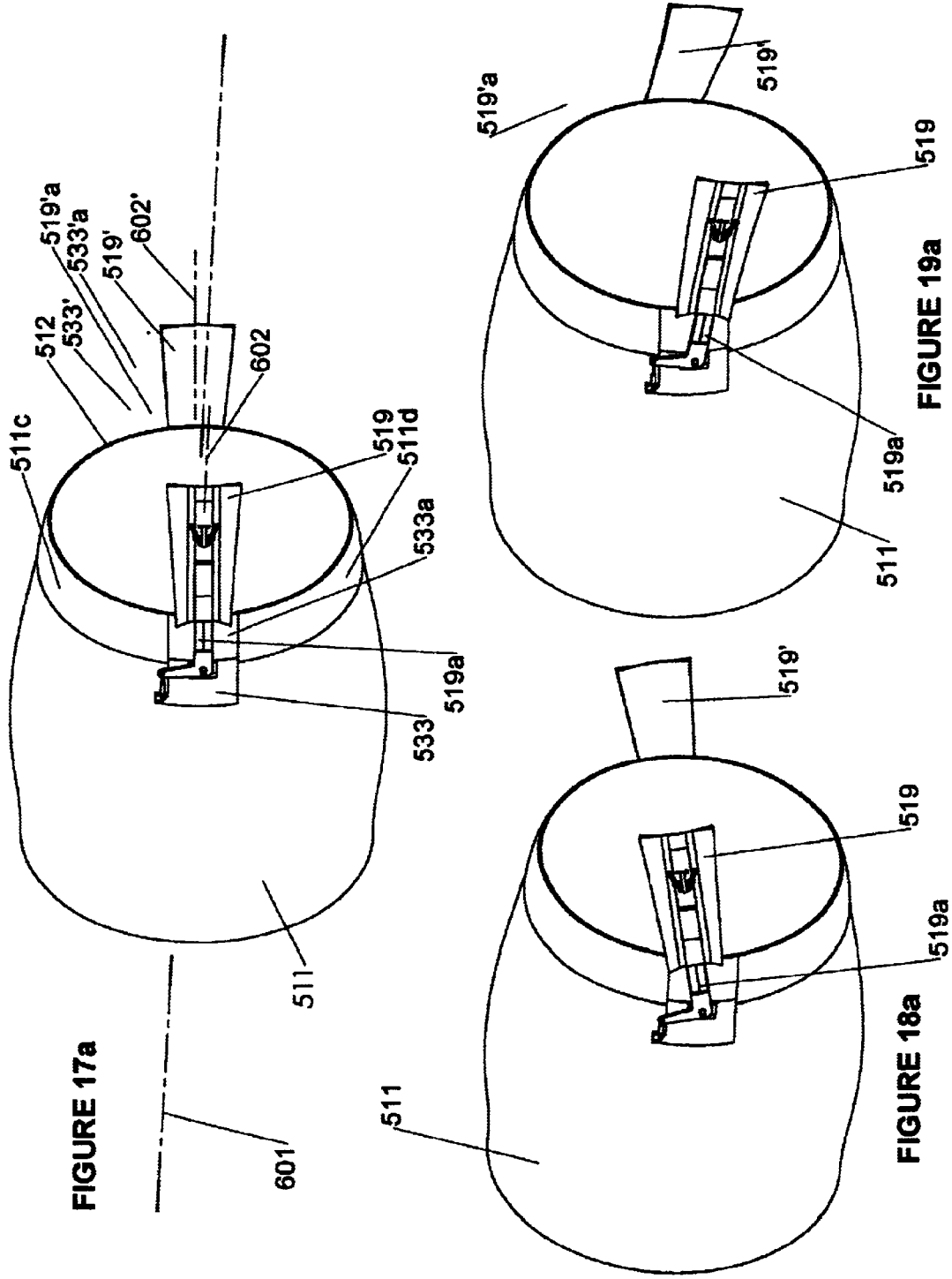

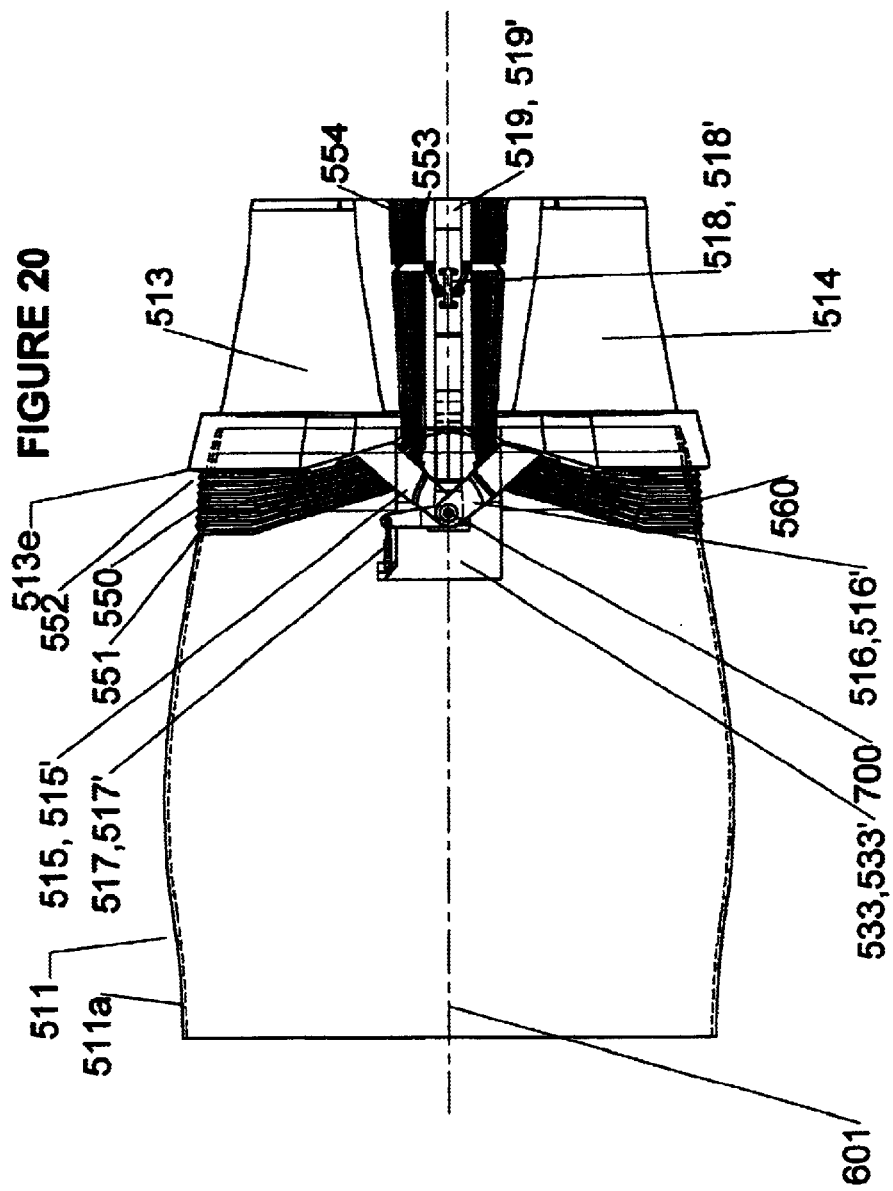

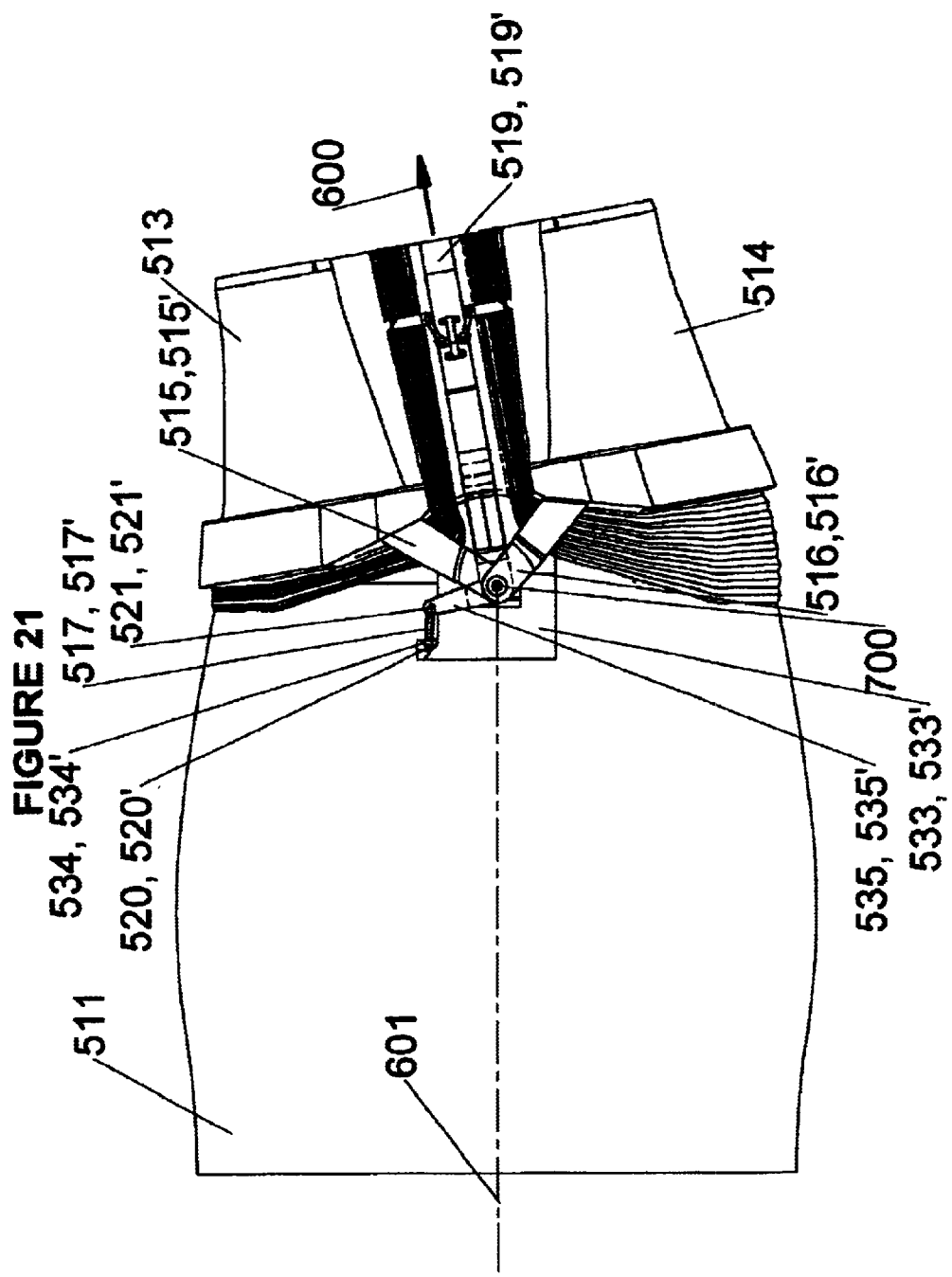

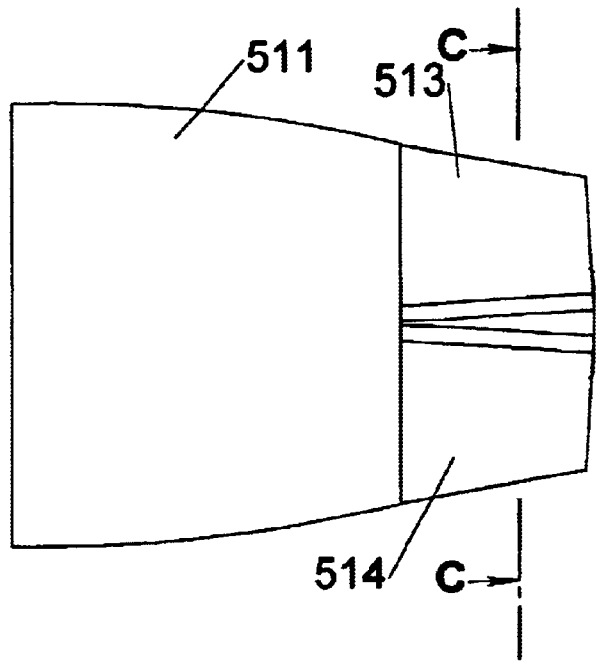
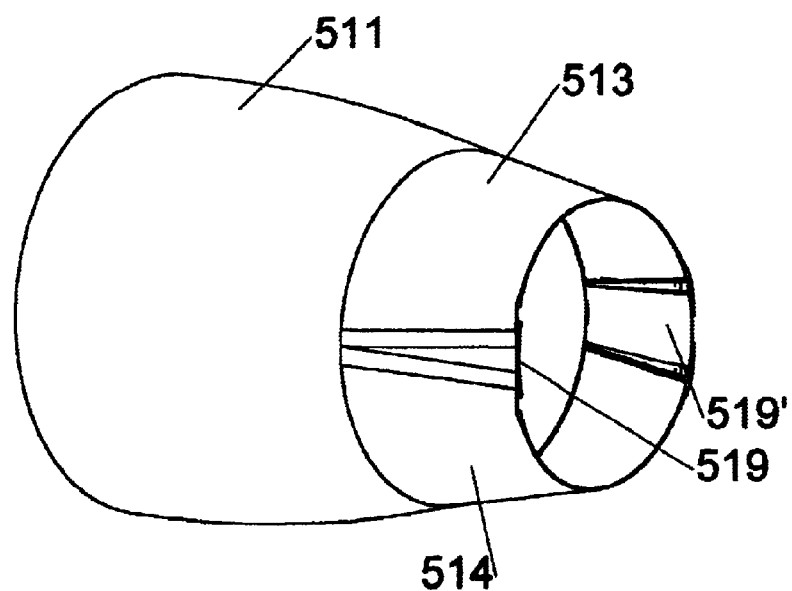

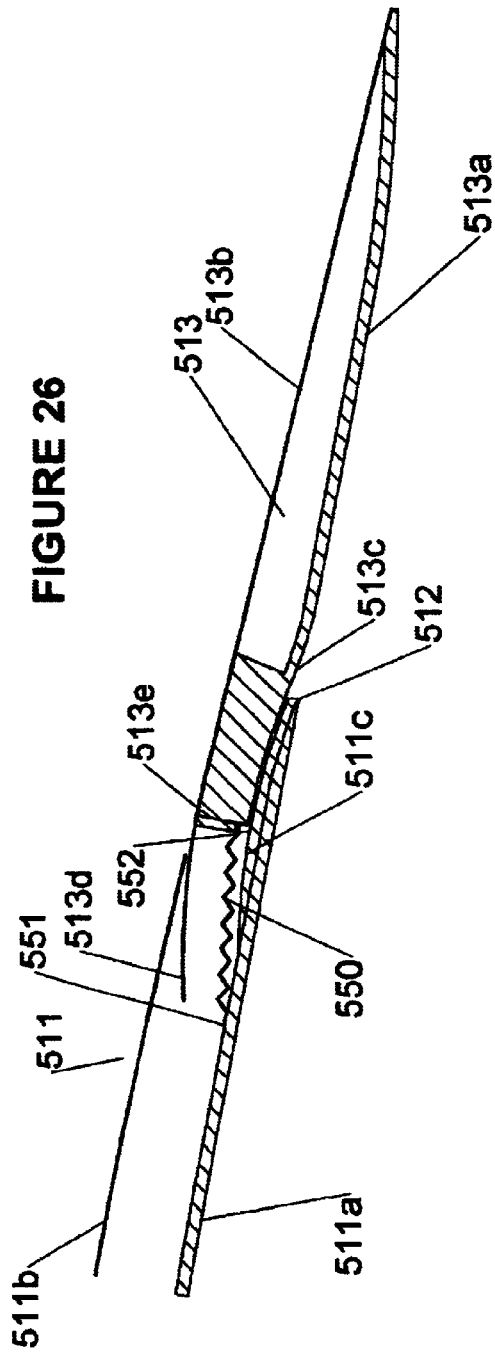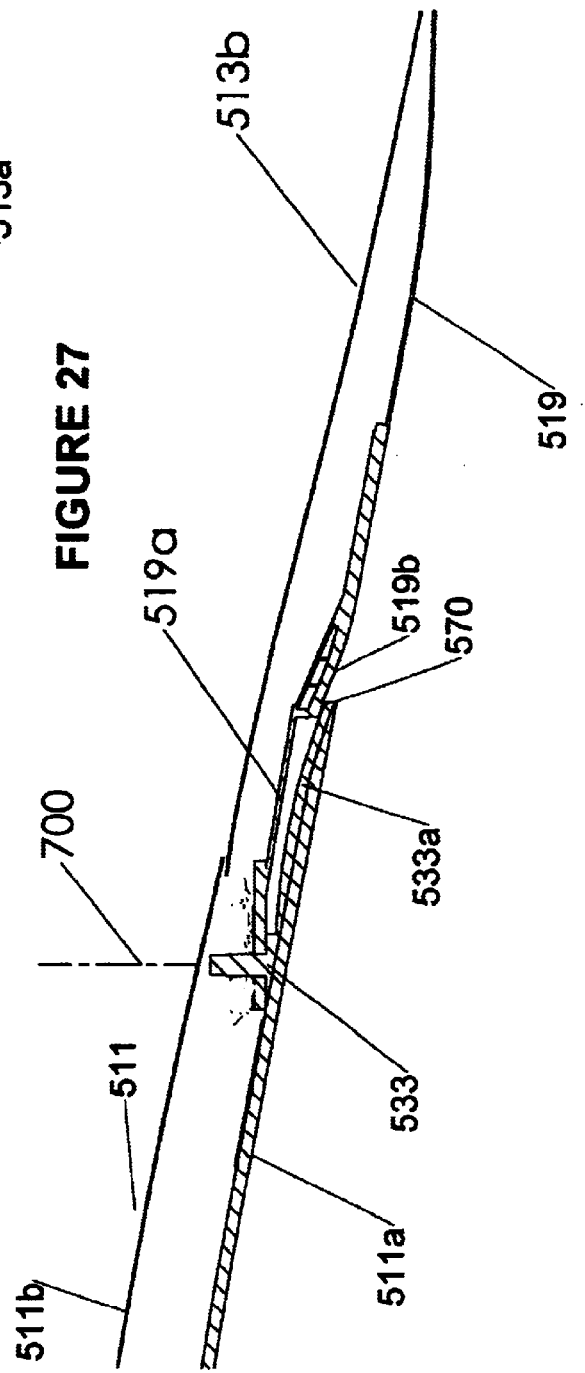

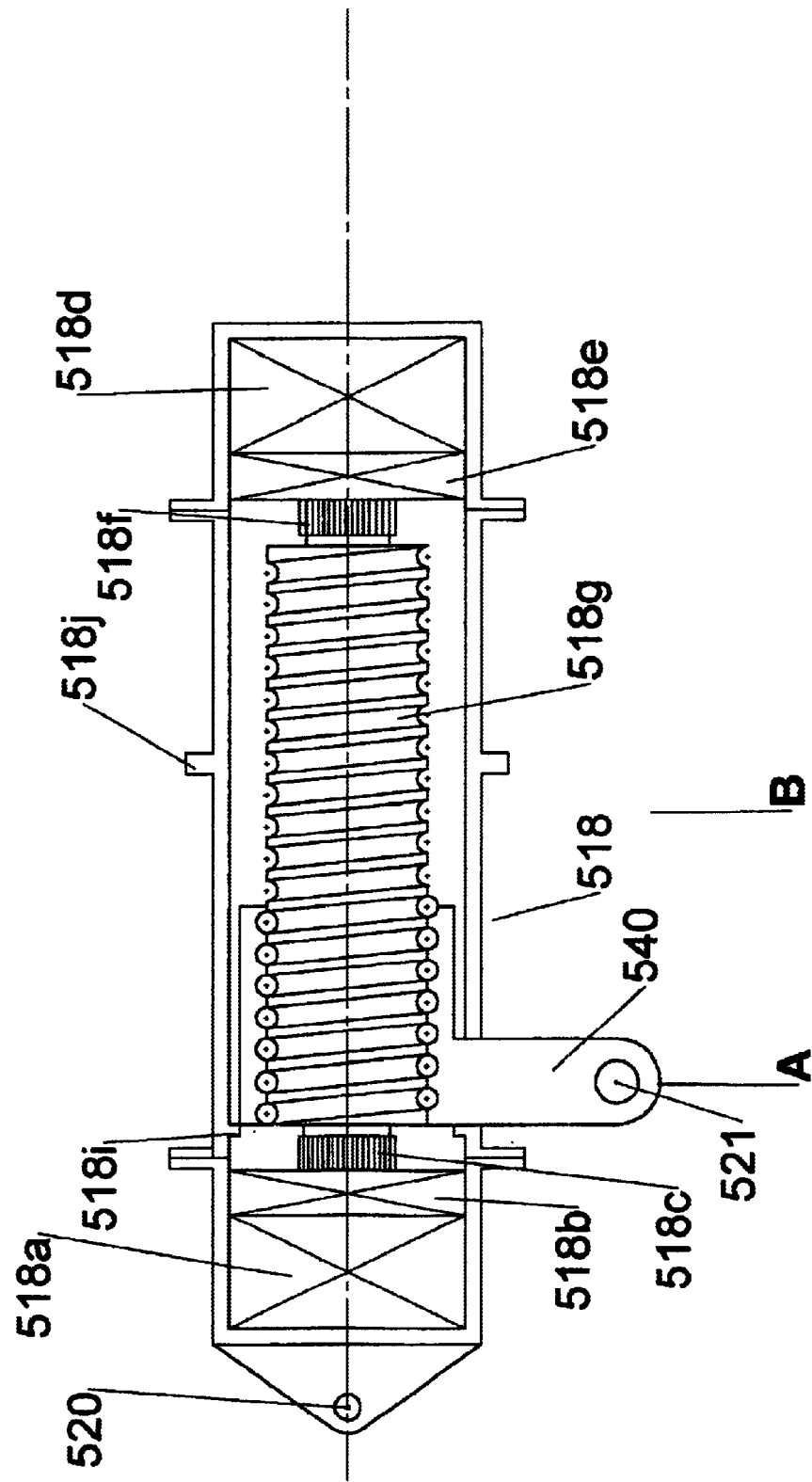

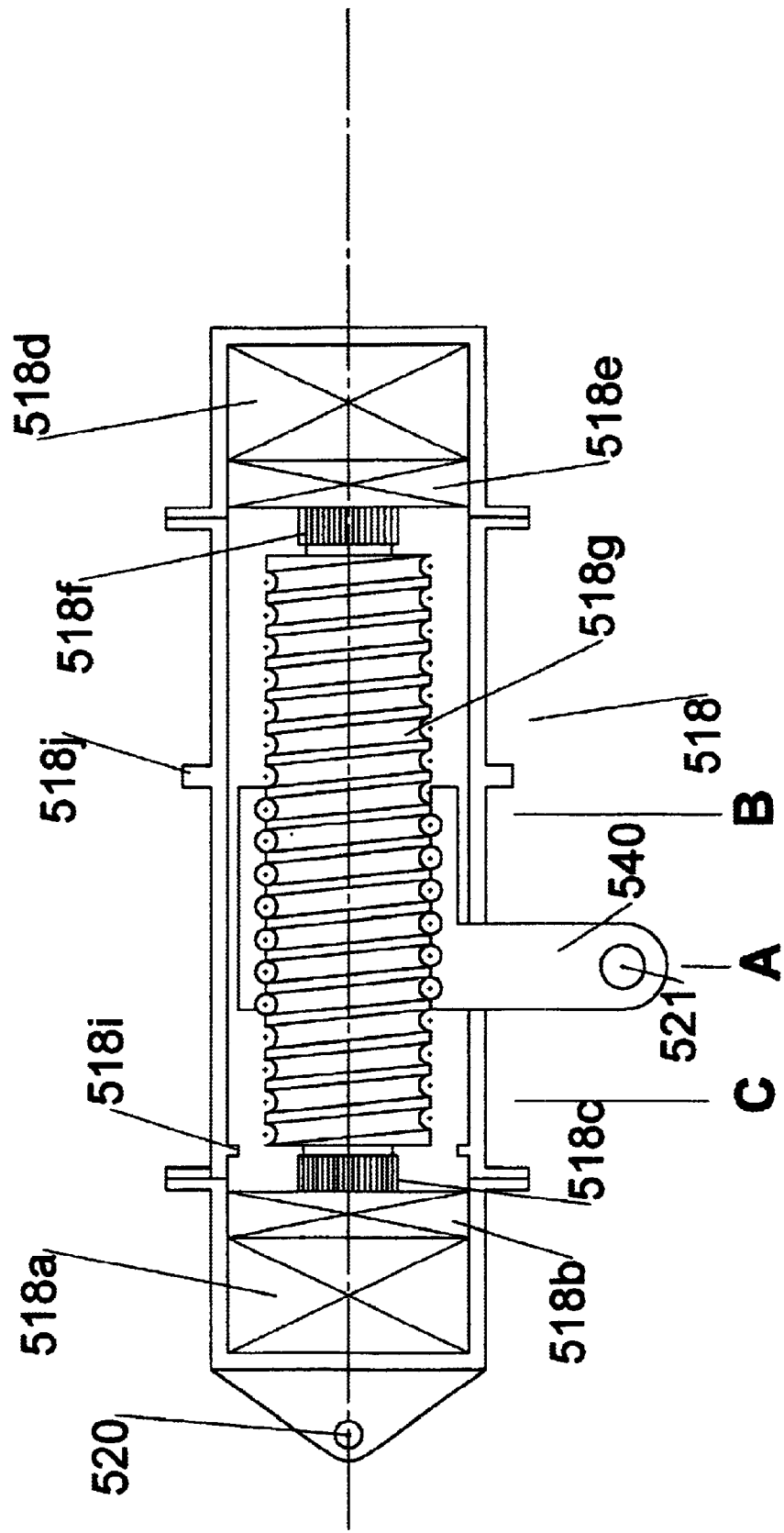

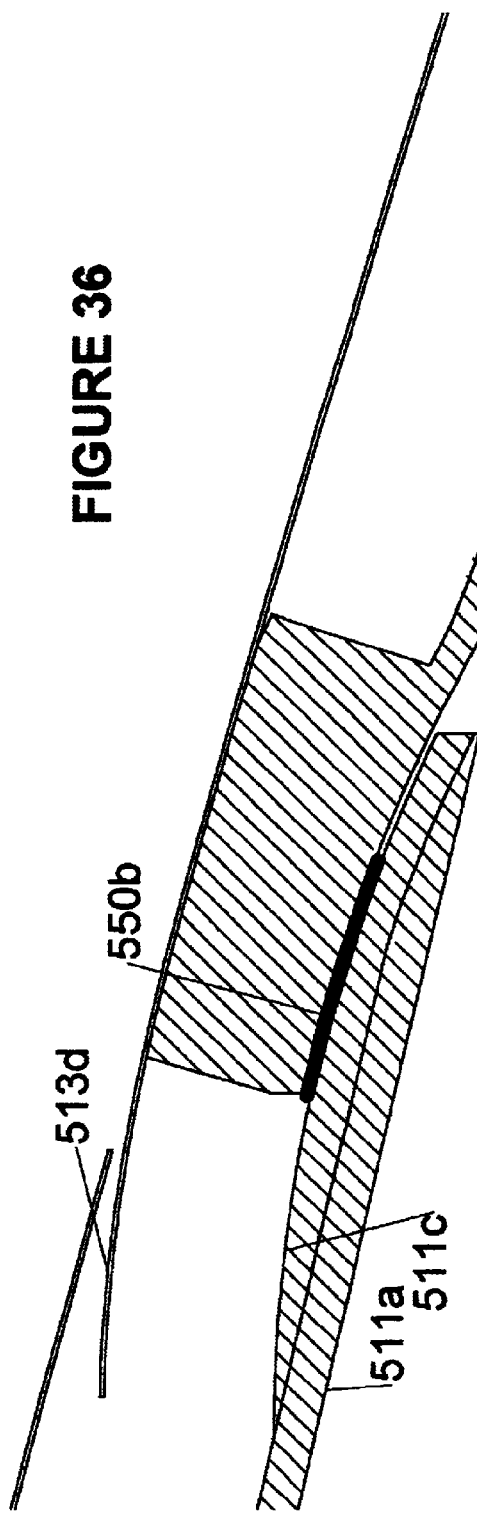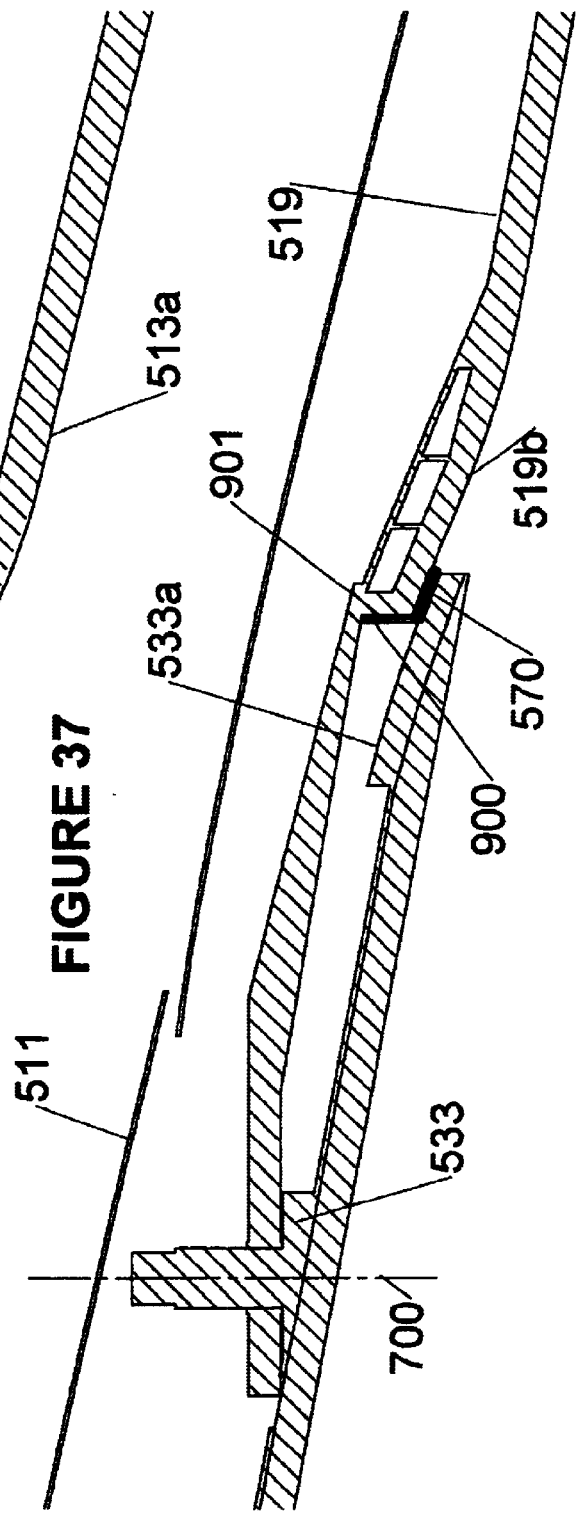

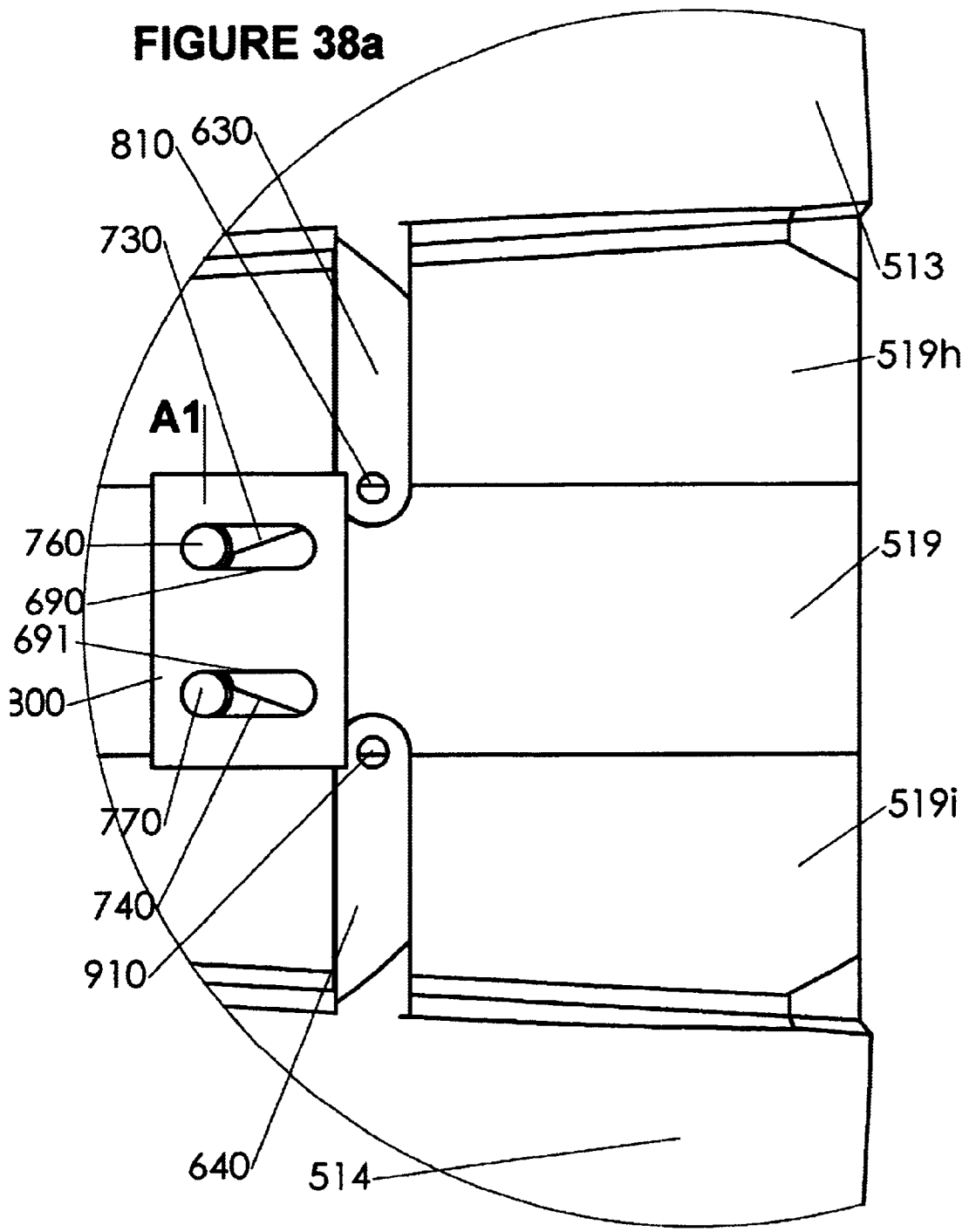

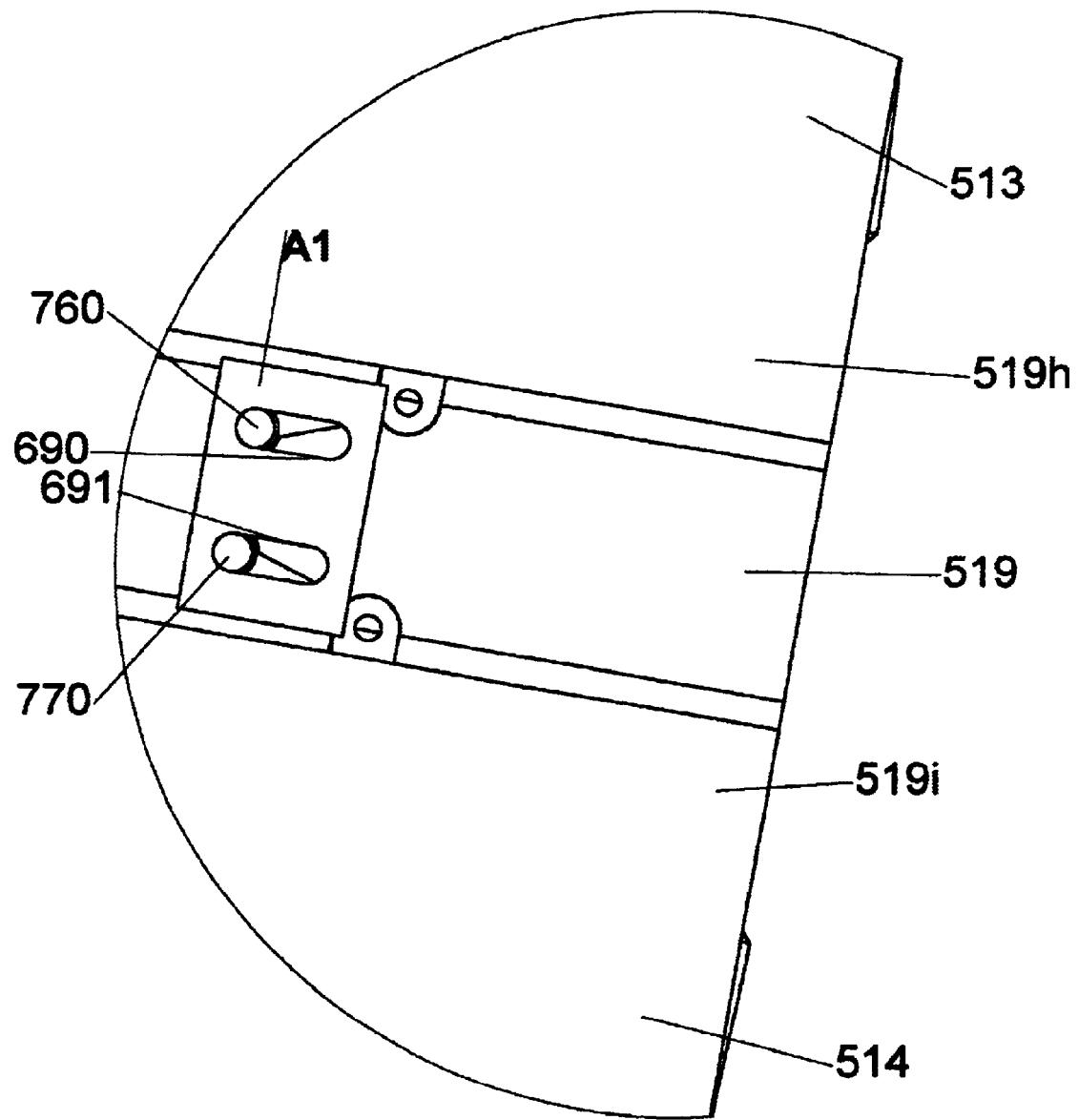

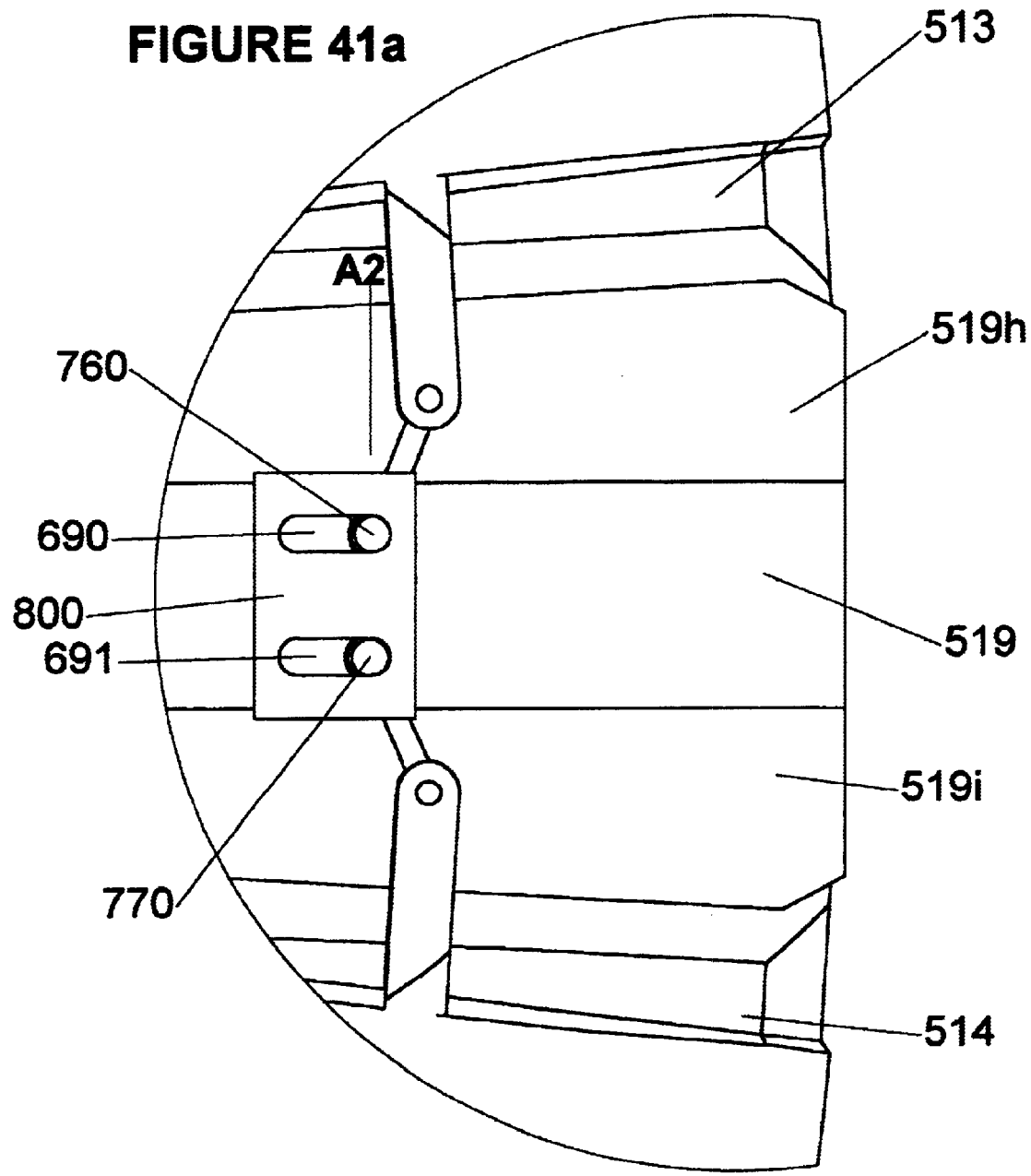

THRUST VECTORING AND VARIABLE EXHAUST AREA FOR JET ENGINE NOZZLE

CROSS-REFERENCES TO RELATED APPLICATIONS

This application is a continuation-in-part of U.S. application Ser. No. 09/842,178, filed Apr. 26, 2001, which is hereby incorporated by reference and now U.S Pat. No. 6,546,716. The application also claims the benefit of U.S. Provisional Application No. 60/410,833, filed Sep. 16, 2002, which is hereby incorporated by reference.

BACKGROUND OF THE INVENTION

1. Field of the Invention

The present invention relates generally to exhaust nozzles for jet engines, and in particular to a jet-engine-exhaust nozzle that may be used on fixed or rotary wing aircraft, rockets, or missiles for optimizing take-off, climb and cruise performance, as well as for increasing flight safety and reducing speed at landing.

2. Description of Related Art

Thrust vectoring technology has been successfully demonstrated on tactical military aircraft to provide maneuvering advantages in very low speed, as well as very high angle-of-attack flight regimes. Current research is exploring the benefits of using thrust vectoring to decrease cruise trim drag under high altitude and mid to high speed conditions. This technology has matured to the extent that it is being incorporated into military fighter aircraft.

As far as is known, thrust vectoring has not been used on commercial or business aircraft. Some of the reasons for this are that the technology is typically very complex and involves many moving parts, which is detrimental to the overall dispatch reliability and operational cost of a business or commercial aircraft. Another reason that thrust vectoring has not been used on commercial or business aircraft is that these aircraft usually have little need for maneuvering agility. Despite the foregoing, the potential for improved safety and increased cruise efficiency that may result from the use of thrust vectoring would make it attractive to the commercial and business aircraft community if a simple thrust vectoring system having a low number of moving parts could be provided.

Thrust vectoring could provide benefit to commercial and business aircraft by providing improved longitudinal stability. Longitudinal stability is needed due to the fact that aircraft are designed to have an aerodynamic center of pressure (CP) located aft of the aircraft center of gravity (CG). As a result of this arrangement, cruising aircraft inherently have a nose down pitching moment, caused by the CP being aft of the CG. This nose down moment must be offset during flight by a nose up pitching moment created by the horizontal stabilizer. These opposing forces help maintain stability but create drag, which in turn reduces aircraft efficiency.

Thrust vectoring may be used to assist in the provision of aircraft longitudinal stability and the reduction of overall drag during cruising by placing the exhaust nozzle in a "nozzle up" position. When the thrust vector is directed upwards, the vertical component of the thrust vector creates a nose up pitching moment for the aircraft. The nose up pitching moment produced by the thrust vector allows the horizontal stabilizer to be operated at a lower angle-of-attack, which reduces the negative lift created by the aircraft horizontal stabilizer and therefore reduces the aircraft drag.

Furthermore, integration of the thrust vectoring system into the flight control system assists in providing aircraft longitudinal stability, thus allowing highly efficient reduced-tail designs, which in turn may reduce tail weight and consequently the overall aircraft weight.

Swept-wing, T-tailed aircraft tend to suffer a marked nose up pitching moment at aerodynamic stall that can allow the low energy turbulent airflow behind the wing to immerse the tail. This can greatly reduce the effectiveness of the tail in countering the nose up pitching moment. When the nose up pitching moment created by the wing during stall is greater than the nose down pitching moment created by the horizontal tail, recovery from the stall may be impossible. Just as thrust vectoring may be used to assist the tail in providing a nose up pitching moment during cruise, thrust vectoring may be used to assist the tail in providing a nose down pitching moment during stall. All that is required is that the nozzle be placed in a nozzle-down position.

Thrust vectoring may be used further to improve landing performance and decrease or eliminate the need for thrust reversers. Landing performance is predicated on the landing approach being carried out at a generally constant angle-of-attack. At a generally constant angle-of-attack, airspeed varies directly with the weight supported by the wing i.e., aircraft weight. Required runway length is a function of aircraft weight, approach speed, and aircraft braking ability. As the ability to increase runway length and decrease aircraft weight is somewhat limited, control over aircraft stopping distance is largely exercised through control of braking ability.

Most aircraft, at landing, use thrust reversers for deceleration. However, these reversers that are used at landing for about 30 seconds can produce catastrophic events if an inadvertent deployment occurs during flight. Thrust reversers are required primarily on wet or icy runways, because of the high speeds at which aircraft are required to land. If the landing speed of an aircraft could be reduced, the need for thrust reversers could potentially be avoided.

One such method of reducing aircraft landing speed may be to provide an engine that assists in lift through adjustment of the engine thrust vector. By placing the exhaust nozzle in a nozzle-down position, some portion of the aircraft weight may be supported directly by the vertical component of the vectored thrust thus reducing the weight supported by the wing. This support of the aircraft by a vertical component of thrust vectoring could be used to reduce approach speeds, and thus reduce landing speeds. Reduced landing speeds could decrease or eliminate the need for thrust reversers on the aircraft. Induced drag would be decreased and angle-of-attack reduced.

Thrust vectoring may also be used to assist in maneuvering an aircraft. For fuselage mounted engines in particular, the left engine exhaust nozzle can be controlled to an asymmetrical vectoring position (nozzle up for example) while the exhaust nozzle of the right engine is controlled to the opposite direction (nozzle down position), and vice versa. Such thrust vectoring may be used to generate a rolling moment to the aircraft. If the thrust vectoring system is integrated into the flight control and/or auto-flight systems, then an independent backup flight control system is available to the flight crew. Furthermore, if power for the thrust vectoring system is different from the flight control system i.e., electric vs. hydraulic, then an additional level of redundancy is created, which further increases the overall safety of the aircraft. On a multi-engine aircraft, pitch axis thrust vectoring can create aircraft movement about the pitch (symmetrical vectoring) and roll (asymmetrical vectoring) axes.

Another technology related to the engine nozzle is variable area exhaust. U.S. Pat. No. 5,221,048, which is incorporated by reference herein, describes a variable exhaust area nozzle comprising a fixed structure having mounted thereon two pivoting half shells that cooperate radially and longitudinally with said fixed structure. The two shells and the fixed structure form the exhaust nozzle of the engine. Actuators are used to pivot the shells into any position between their fully opened position and their fully closed position. Although adjustment of the position of the two shells provides control over the nozzle exhaust area, it does so without modification of the engine thrust-vector angle. The apparatus described in U.S. Pat. No. 5,221,048 has no thrust vectoring capability.

Variable nozzle and thrust vectoring of the exhaust of a jet engine is known. U.S. Pat. No. 4,000,610, which is incorporated by reference herein, discloses an apparatus using a flap downstream of a series of converging-diverging flaps to provide flight maneuver (thrust) vectoring as well as external exhaust expansion control. While the series of flaps are internal to the nozzle, and are adapted to form a convergent-divergent shape, they cooperate with the one flap located downstream of the exhaust nozzle for external expansion control of the exhaust. Convergent-divergent nozzles such as this are typically used on supersonic aircraft such as military aircraft.

It would, therefore, be a significant advance in the operation of jet engines if an alternate means for providing thrust vectoring and exhaust area variation were provided. More specifically, it would be advantageous if an exhaust nozzle were provided that allowed larger angles of thrust vectoring and maintained a planar exhaust area. It would also be advantageous to provide an exhaust nozzle having a simplified design and operation for varying the angle of a thrust vector and the value of the exhaust area. Finally, it would be advantageous to provide an exhaust nozzle with actuation means that allowed for independent adjustment of the thrust vectoring angle and the nozzle exhaust area.

All references cited herein are incorporated by reference.

BRIEF SUMMARY OF THE INVENTION

The problems associated with vectoring thrust and varying the exhaust area of a jet engine are solved by the present invention. The invention comprises a variable area exhaust nozzle with thrust vectoring capability for one or more jet engines. Each nozzle includes shells pivotally mounted on a fixed structure called a jet pipe that is fitted with two pivoting extension arms. The jet pipe, the pivoting extension arms, and the pivoting shells form the exhaust nozzle of the engine. In a preferred embodiment, there are two independent actuation means: one for the control of the thrust-vector angle and the other one for the control of the nozzle exhaust area. In this embodiment the shells are connected to the pivoting arms, and the pivoting arms are driven by the first actuation means to adjust the thrust-vector angle. The pivoting arms are the muscle to the shells for adjusting the thrust-vector angle. The actuation means are only energized to move the nozzle to its desired position. Once that position is reached, the actuation means are de-energized. The second actuation means of the preferred embodiment pivots the shells relative to the pivoting arms to provide adjustment of the nozzle exhaust area.

In an alternate embodiment, a single actuation means is used to adjust both the thrust-vector angle and the nozzle exhaust area. This actuator means is used to pivot the shells and is either positioned in a symmetrical configuration for changing the exhaust area of the nozzle or in an unsymmetrical configuration for changing the angle of the thrust vector relative to the engine centerline. The actuation means is only energized to move the nozzle to its desired position and is then de-energized. The actuator can be hydraulic, electric, or pneumatic, or could comprise any other extendible actuators that provide controlled pivoting of the shells. The sealing system of the nozzle is characterized, in a preferred embodiment, by an accordion seal that provides a virtually friction free configuration for any position of the nozzle.

It is therefore an object of the present invention to provide a jet engine nozzle with thrust vectoring capabilities.

It is another object of the present invention to provide a jet engine nozzle with variable exhaust area capabilities.

It is yet another object of the present invention to provide a jet engine nozzle with both thrust vectoring and variable exhaust area capabilities.

It is still another object of the present invention to provide a jet engine nozzle with a large angle of thrust vectoring and large variable exhaust area capabilities.

It is still another object of the invention to provide a virtually friction free sealing arrangement for a thrust vectoring and variable exhaust nozzle for a jet engine.

It is still yet another object of this invention to provide a planar exhaust nozzle for any angular position of the nozzle when the value of the exhaust area of said nozzle is nominal.

It is still another object of this invention to provide separate actuation means for the control of the thrust-vector angle and for the control of the value of the nozzle exhaust area.

It is still yet another object of the present invention to provide a jet engine nozzle that improves the longitudinal stability of an aircraft.

It is still yet another object of the present invention to provide a jet engine nozzle that reduces the required landing speed of an aircraft.

It is still yet another object of the present invention to provide a jet engine nozzle that may be used to pitch and/or roll an aircraft.

Other objects, characteristics and advantages will become apparent from the following description in reference to the accompanying drawings.

BRIEF DESCRIPTION OF THE DRAWINGS

FIG. 1 illustrates a schematic side view of a thrust vectoring and variable area exhaust nozzle;

FIG. 2 depicts a schematic side view of the nozzle shown in FIG. 1 in a nominal position;

FIG. 3 illustrates a schematic side view of the nozzle shown in FIG. 1 in a reduced exhaust area (closed) position;

FIG. 4 depicts a schematic side view of the nozzle shown in FIG. 1 in an increased exhaust area (opened) position;

FIG. 17 illustrates a perspective view of a jet engine nozzle according to a preferred embodiment of the present invention, the nozzle being shown in a neutral thrust vector position and in a nominal exhaust area position;

FIG. 17a depicts a perspective view of a jet pipe of the nozzle of FIG. 17, the nozzle having extension arms, which are shown in a neutral thrust vector position;

FIG. 18 illustrates a perspective view of the nozzle of FIG. 17 in a nozzle-up thrust vector position and a nominal exhaust area position;

FIG. 18a depicts a perspective view of the jet pipe of FIG. 17a with the extension arms shown in a arms-up position;

FIG. 19 illustrates a perspective view of the nozzle of FIG. 17 in a nozzle-down thrust vector position and a nominal exhaust area position;

FIG. 19a depicts a perspective view of the jet pipe of FIG. 17a with the extension arms shown in an arms-down position;

FIG. 20 illustrates a side view of the nozzle of FIG. 17 with the outer skin of the jet pipe and of the shells removed;

FIG. 21 depicts a side view of the nozzle of FIG. 18 with the outer skin of the jet pipe and of the shells removed;

FIG. 23 depicts a side view of the nozzle of FIG. 17 in a neutral thrust vector position and an increased exhaust area (opened) position;

FIG. 23a illustrates a perspective view of the nozzle of FIG. 23;

FIG. 26 illustrates a cross-sectional side view of a sealing arrangement between the shells and jet pipe of the nozzle of FIG. 17, the cross-sectional view taken along line A—A;

FIG. 27 depicts a cross-sectional bottom view of a sealing arrangement between the shells and jet pipe of the nozzle of FIG. 17, the cross-sectional view taken along line B—B;

FIG. 30a depicts a schematic side view of one embodiment of an actuator for controlling the thrust-vector angle of the nozzle of FIG. 17;

FIG. 31b illustrates a schematic side view of another embodiment of an actuator for controlling the thrust-vector angle of the nozzle of FIG. 17;

FIG. 36 depicts a partial cross-sectional side view of the nozzle of FIG. 35 showing the sealing arrangement between the shells and jet pipe of the nozzle, the view being similar to that view of FIG. 26;

FIG. 37 illustrates depicts a partial cross-sectional side view of the nozzle of FIG. 35 showing the sealing arrangement between the shells and jet pipe of the nozzle, the view being similar to that view of FIG. 27;

FIG. 38a illustrates an enlarged side view of the nozzle of FIG. 38 taken at Detail D;

FIG. 40a illustrates an enlarged side view of the nozzle of FIG. 40 taken at Detail F;

FIG. 41a illustrates an enlarged side view of the nozzle of FIG. 41 taken at

DESCRIPTION OF THE PREFERRED EMBODIMENTS

Figure 5:
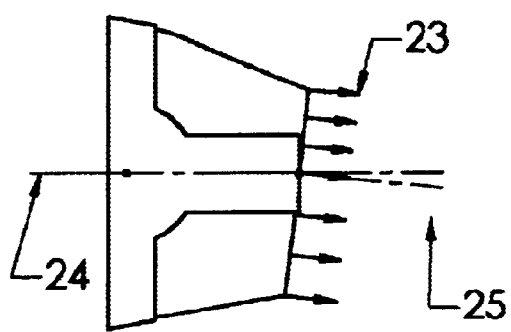
FIG. 5 illustrates a schematic side view of the nozzle shown in FIG. 1 in a down thrust vector position.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and material changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

In this continuation-in-part of U.S. application Ser. No. 09/842,178, filed Apr. 26, 2001, the preferred embodiments of the invention are shown in FIGS. 17–34.

As used in the present application, a "jet engine" could be a gas turbine engine (including a turbofan engine, a turbojet engine, or a propfan engine), or any other type of engine that generates pressurized fluid or other matter for creating thrust.

FIG. 1 illustrates a thrust vectoring and variable exhaust area nozzle 10 for a jet engine. The nozzle 10 includes a fixed structure 11, first and second pivoting shells 12 and 13, a sealing system (shown in FIG. 15), and first and second actuators 15 and 16. The fixed structure 11, also called a jet pipe, is the structure that provides the support for the two pivoting shells 12 and 13, and for the actuators 15 and 16. The fixed structure 11 cooperates radially and longitudinally with the two pivoting shells 15 and 16 through a sealing arrangement that ensures fluid tightness between the respective elements.

With continued reference to FIG. 1, the rear (aft) end of the jet engine generally designated 10, includes a jet pipe 11 in which two radial cutouts 25 and 26 are provided. The radial cutouts 25 and 26 are defined by the jet pipe extensions 11' (only one of which is shown as a result of the side view of the nozzle). The first and second pivoting shells 12 and 13 close the jet pipe cutouts 25 and 26, and are pivotally mounted on said jet pipe 11 via shell hinge arms 14 and 14'. The pivoting shells 12 and 13 are shown in FIG. 1 to pivot about the same point. It is appreciated, however, that in an alternative embodiment, the pivoting shells 12 and 13 may each pivot about their own dedicated pivot points. The two pivoting shells 12 and 13, and the jet pipe 11 form the exhaust nozzle of the engine.

Each of the pivoting shells 12 and 13 includes an external profile and an internal profile. In FIG. 1, the external profile of the shells is shown to be convergent in the direction approaching the exhaust exit of the nozzle. The internal profile of the shells is also convergent, but to a lesser degree than the external profile.

The longitudinal axis of the engine 10 is indicated by the centerline 24. With respect to this longitudinal axis, each of the shells 12 and 13 includes a leading edge that is contained in a plane substantially perpendicular to the engine longitudinal axis and a longitudinal edge that is contained in a plane substantially parallel to a horizontal plane containing the engine longitudinal axis.

Figure 6:
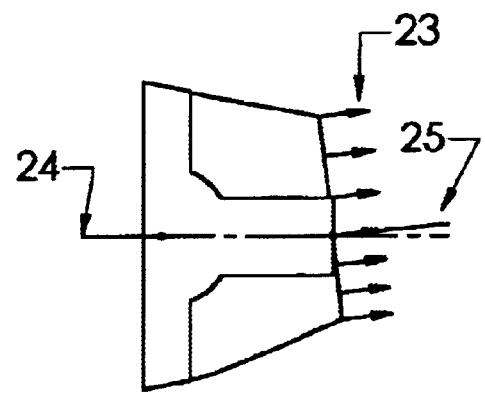
FIG. 6 depicts a schematic side view of the nozzle shown in FIG. 1 in an up thrust vector position.

First and second independently operated actuators 15 and 16 connect the jet pipe 11 to the first and second shells 12 and 13, respectively. In the embodiment shown in FIG. 1, the actuators 15 and 16 are connected to the shells 12 and 13 at a point that is along the longitudinal edge of the shells. The actuators provide the motion necessary to pivot the shells about the pivot points at which they are connected to the jet pipe. The pivoting of the shells may be symmetrical (as shown in FIGS. 3 and 4) to provide variation of the exhaust area, or asymmetrical (as shown in FIGS. 5 and 6) to provide thrust vectoring.

As also shown in FIG. 1, each shell 12 and 13 is connected to its own actuator through an arm arrangement 17 and 18. One end 19 of the upper arm 17 is pivotally connected to the first shell 12 while the other end of the arm 17 is pivotally connected to the cross head 20 of the first actuator 15 of the first shell. One end 19' of the lower arm 18 is pivotally connected to the second shell 13 while the other end of the arm 18 is pivotally connected to the cross head 20' of the second actuator 16 of the second shell. The jet pipe 11 may be equipped with guiding rails 21 and 21'. Each of the guiding rails engages its respective actuator cross head 20 and 20'. This arrangement prevents any side loads in the piston rods 22 and 22' of the actuators. In this embodiment, each actuator 15 and 16 directly controls the position of one end of its respective arm 17 and 18, since the cross heads 20 and 20' are respectively attached to the piston rods 22 and 22' of their respective actuators 15 and 16.

With reference to FIGS. 2, 3, 4 and 7, the actuators 15 and 16, which control the value of the area of the exhaust nozzle, are activated symmetrically to provide one method of operation. This causes the actuators to provide a symmetrical rotation to the shells 12 and 13, so that the value of the exhaust area of the nozzle can be decreased as shown in FIG. 3 or increased as shown in FIG. 4. In these cases, the thrust vector 23 remains aligned parallel with the engine centerline 24.

Figure 7:
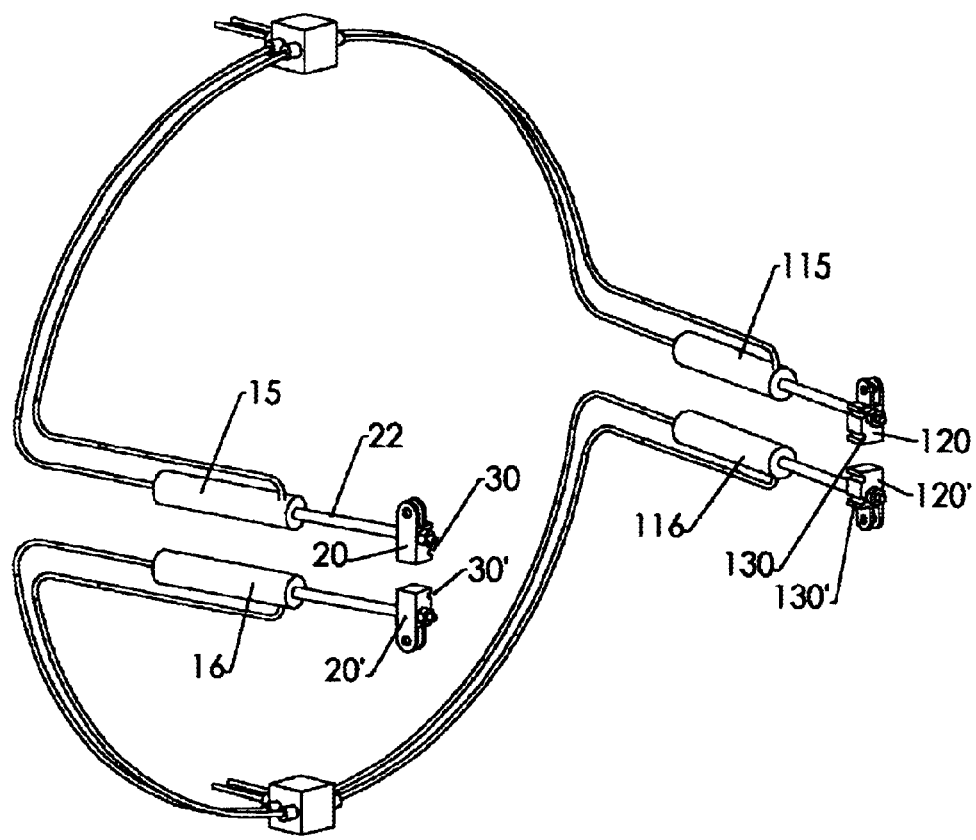
FIG. 7 illustrates a schematic perspective view of the actuators that may be used to pivot the shells comprising the nozzle shown in FIG. 1, the actuators are shown in a nominal position.

With further reference to FIG. 7 the mechanism which controls the pivoting of the shells 12 and 13, as shown in FIGS. 2, 3 and 4, is composed of two identical independent pairs of actuators 15, 115 and 16, 116. Each actuator is connected to its respective cross heads 20, 120, 20' and 120'. The cross heads 20, 120, 20' and 120' have corresponding grooves 30, 30', 130 and 130' that slid ably engage guiding rails 21 and 21' (shown in FIG. 1) attached to the jet pipe 11. It is appreciated that if the structural rigidity of each of the shells 12 and 13 is great enough, the actuators 115 and 116 may be eliminated and replaced by two arms and slots like the ones shown in FIG. 10. In such a case, the actuators would comprise the combination of two actuators 15, 16 as shown in FIG. 7, and the two arms 221, 223 guided by their respective slots 226, 229 as shown in FIG. 10.

Figure 8:
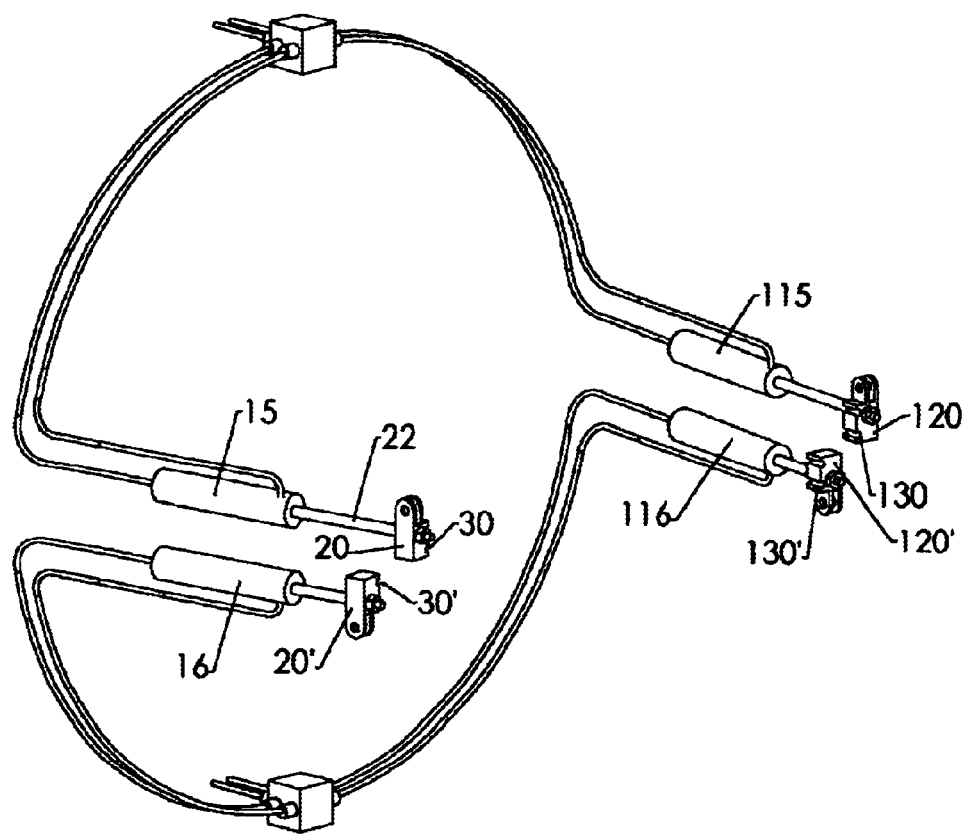
FIG. 8 depicts a schematic perspective view of the actuators shown in FIG. 7 in a thrust-vector down position.
Figure 9:
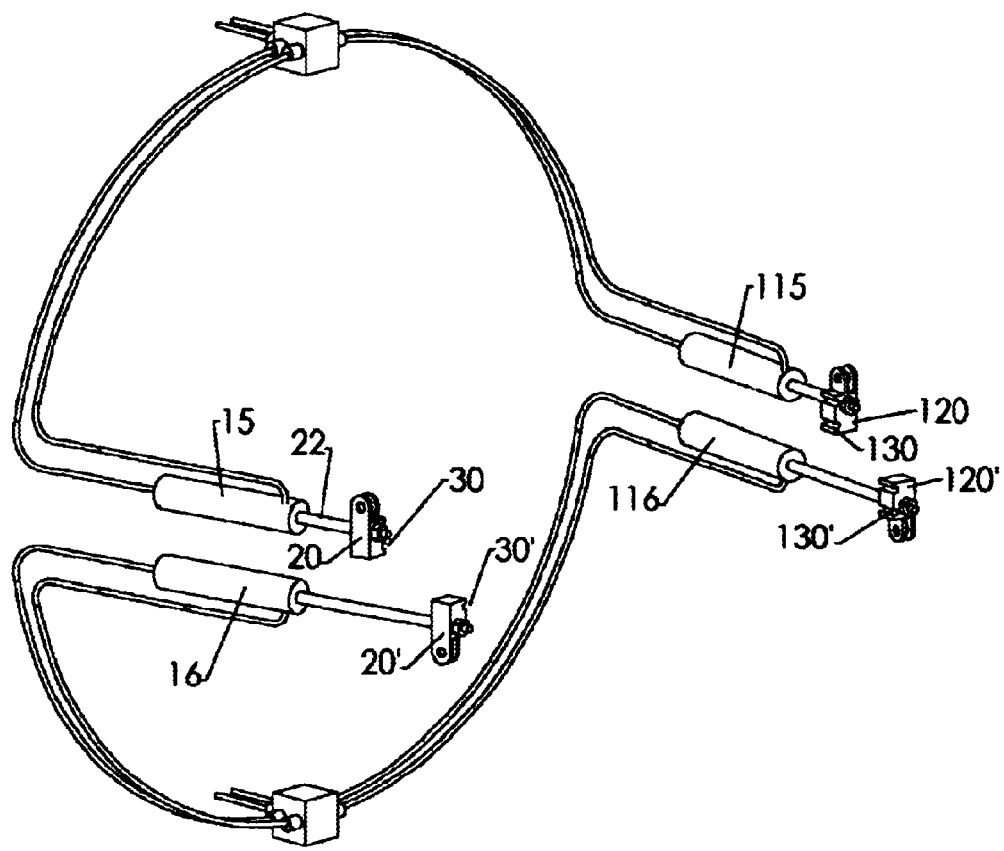
FIG. 9 illustrates a schematic perspective view of the actuators shown in FIG. 7 in a thrust-vector up position.

With reference to FIGS. 5 and 8, the actuators 15 and 16 may be activated non-symmetrically to pivot the shells 12 and 13 clockwise to produce a down thrust vector, as shown. With reference to FIGS. 6 and 9, the actuators 15 and 16, may be activated non-symmetrically to pivot the shells 12 and 13 counter-clockwise to produce an up thrust vector, as shown. It is apparent from FIGS. 7, 8 and 9 that the same actuators (15, 115 and 16, 116) are capable of two different functions to provide two methods of operation. One is to increase or decrease the value of the exhaust area of the exhaust nozzle without modification of the thrust-vector angle (FIG. 7). The other one is to modify the angular position of the exhaust nozzle, i.e., providing it with a nozzle down position (FIGS. 5, 8) or a nozzle up position (FIGS. 6, 9).

Figure 10:
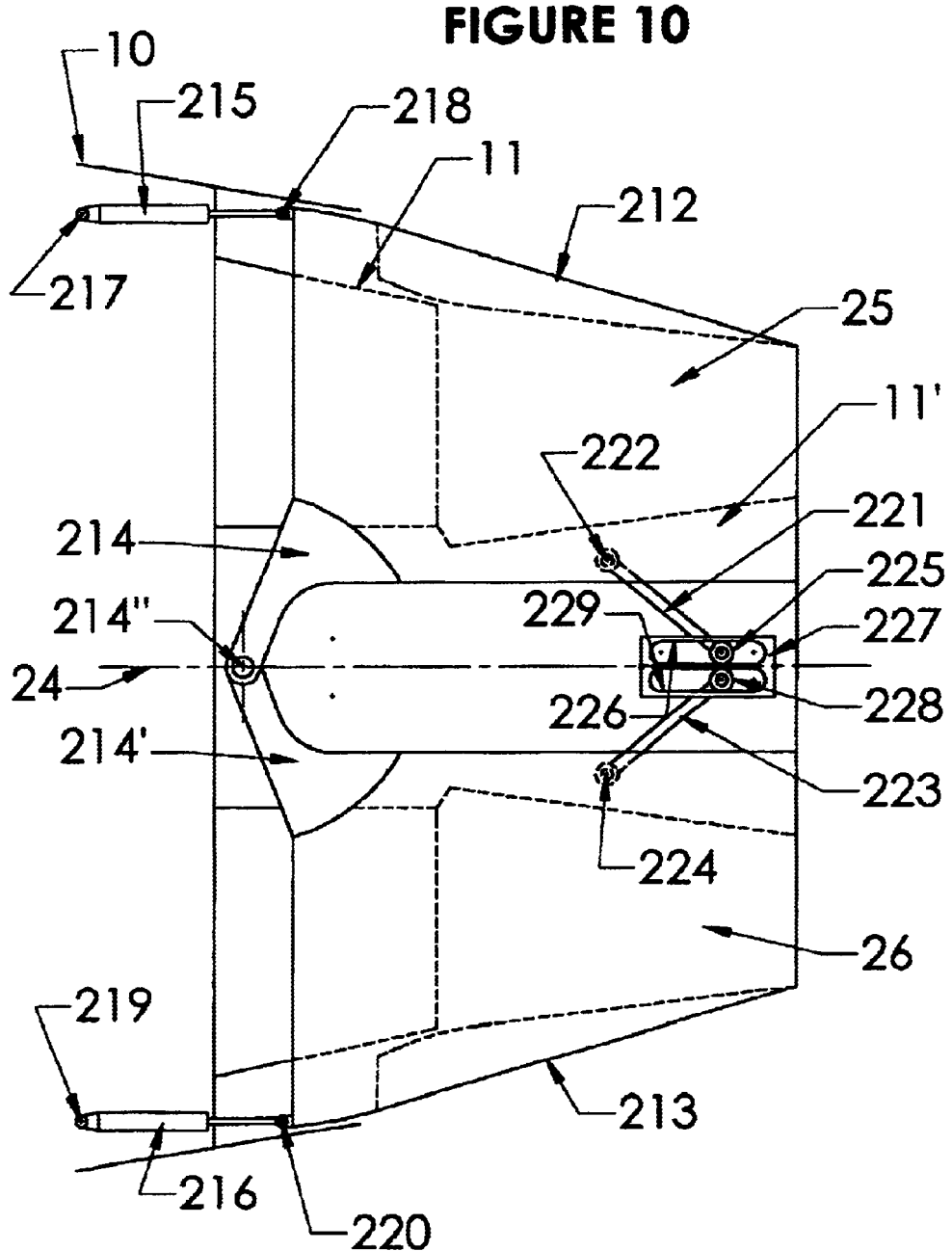
FIG. 10 depicts a schematic side view of another thrust vectoring and variable area exhaust nozzle.
Figure 13:
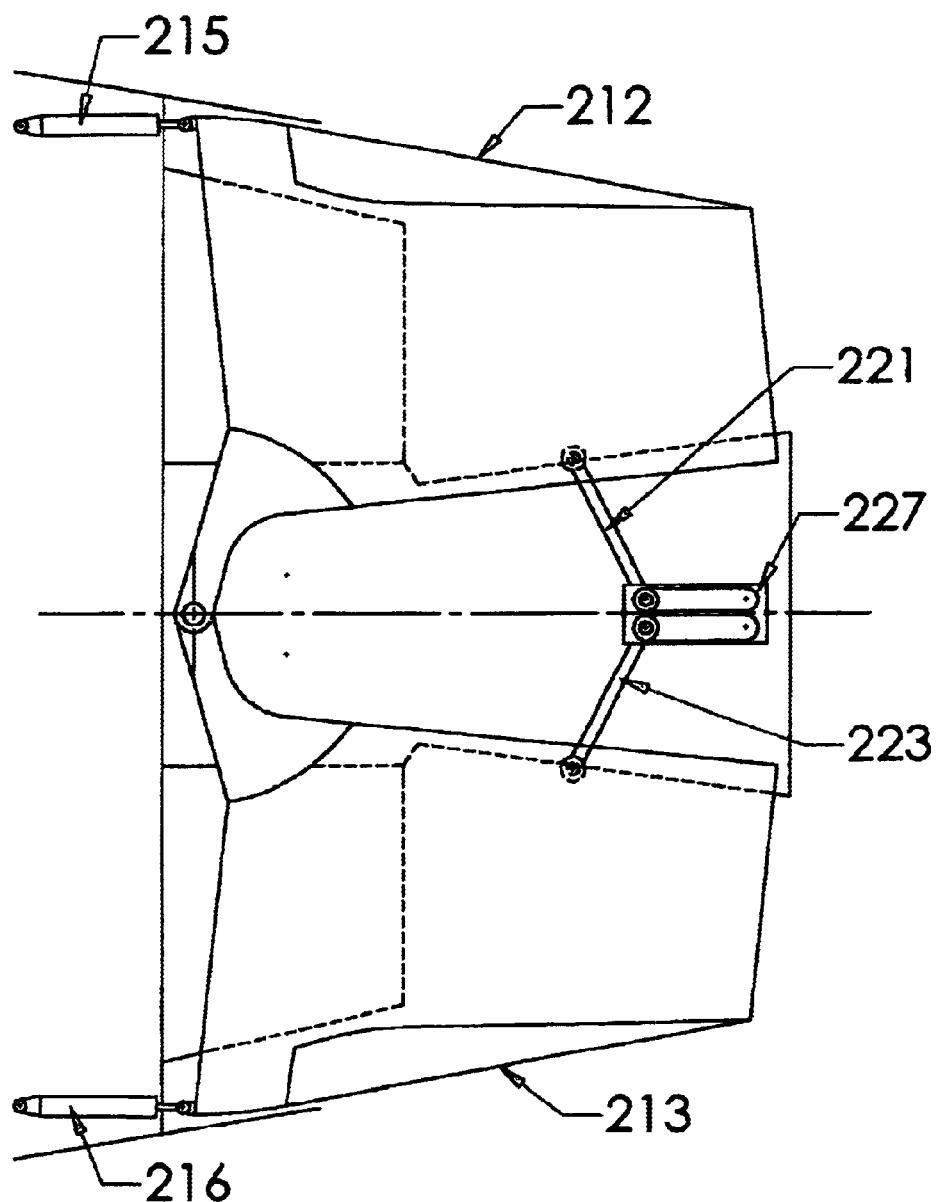
FIG. 13 illustrates a schematic side view of the nozzle shown in FIG. 10 in an increased exhaust area (opened) position.
Figure 14:
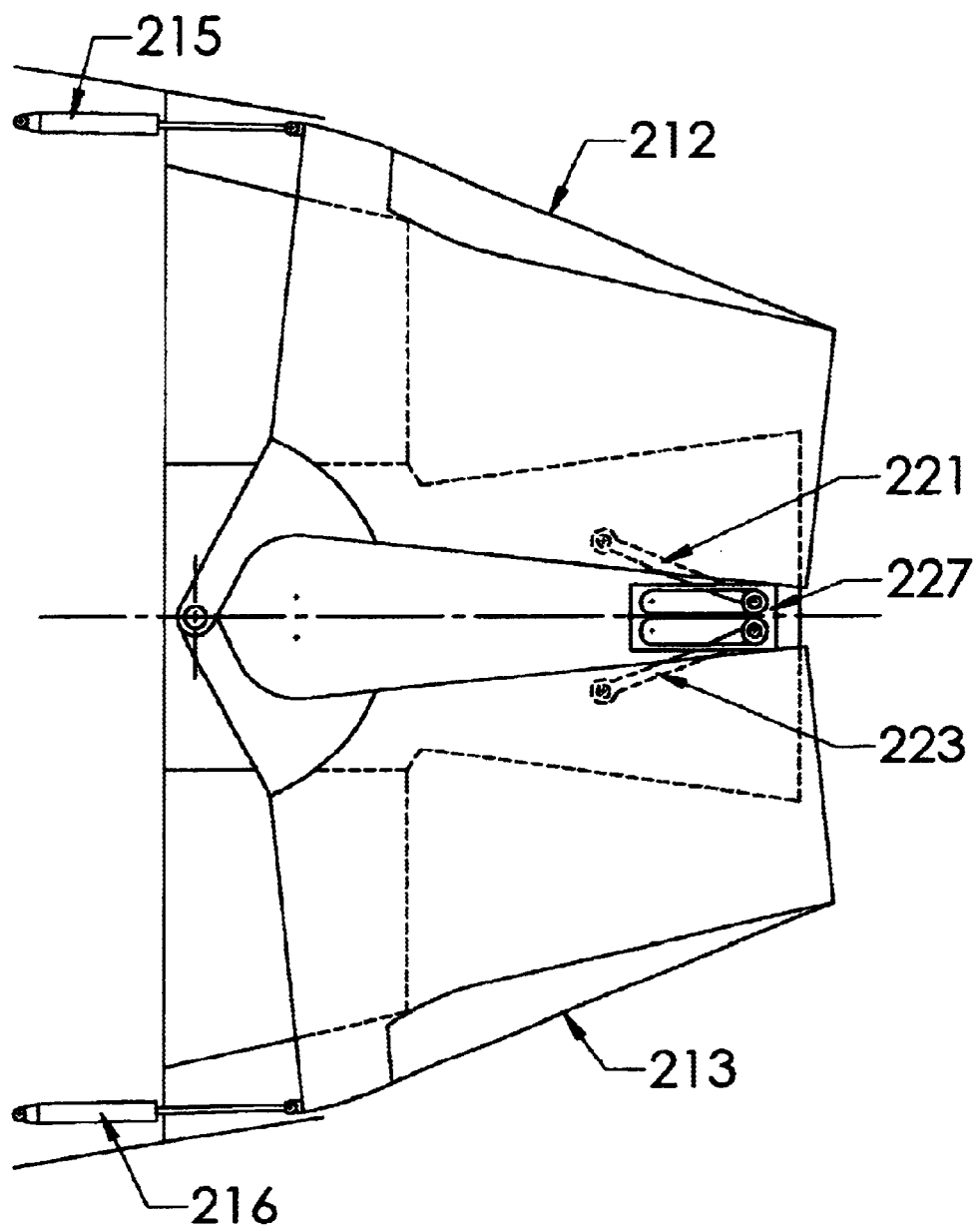
FIG. 14 depicts a schematic side view of the nozzle shown in FIG. 10 in a decreased exhaust area (closed) position.

With reference to FIG. 10, another embodiment of the invention is shown in which like reference numerals refer to like elements. The difference between the embodiments shown in FIGS. 1 and 10 is that in the later embodiment the actuators 215 and 216 are connected to the shells 212 and 213 at points along the leading edge of the shells, and the later embodiment shows a nozzle with an internal convergent-divergent profile. The independent actuators 215 and 216 are connected to the jet pipe 11 through pivot connections 217 and 219, respectively. The actuators 215 and 216 are also connected to the shells 212 and 213 through pivot connections 218 and 220. As with the embodiment shown in FIG. 1, pivoting may be symmetrical to provide variable exit nozzle areas as shown in FIGS. 13 and 14. Alternatively, pivoting may be asymmetrical to vary the thrust-vector angle as shown in FIGS. 11 and 12.

As also shown in FIG. 10, a first control arm 221 is pivotally connected to the first shell 212 through a pivot pin 222. A second control arm 223 is pivotally connected to the second shell 213 through a pivot pin 224. Guide roller 225 is pivotally connected to the end of the first control arm 221 and slid ably positioned in the slot 226 in the guide bracket 227. The guide bracket 227 is connected to the extension arm 11' and its opposite (not shown) of fixed structure 11. The guide roller 228 is pivotally connected to the end of second control arm 223 and slid ably positioned in the slot 229 in the guide bracket 227. The control arms 221 and 223 close the hoop loop between the two shells 212, 213, ensuring structural integrity of the assembly. The slots 226 and 229 define the pivoting limits of the shells 212 and 213. In this embodiment, each shell 212, 213 directly controls the position of its respective arm 221, 223.

Figure 11:
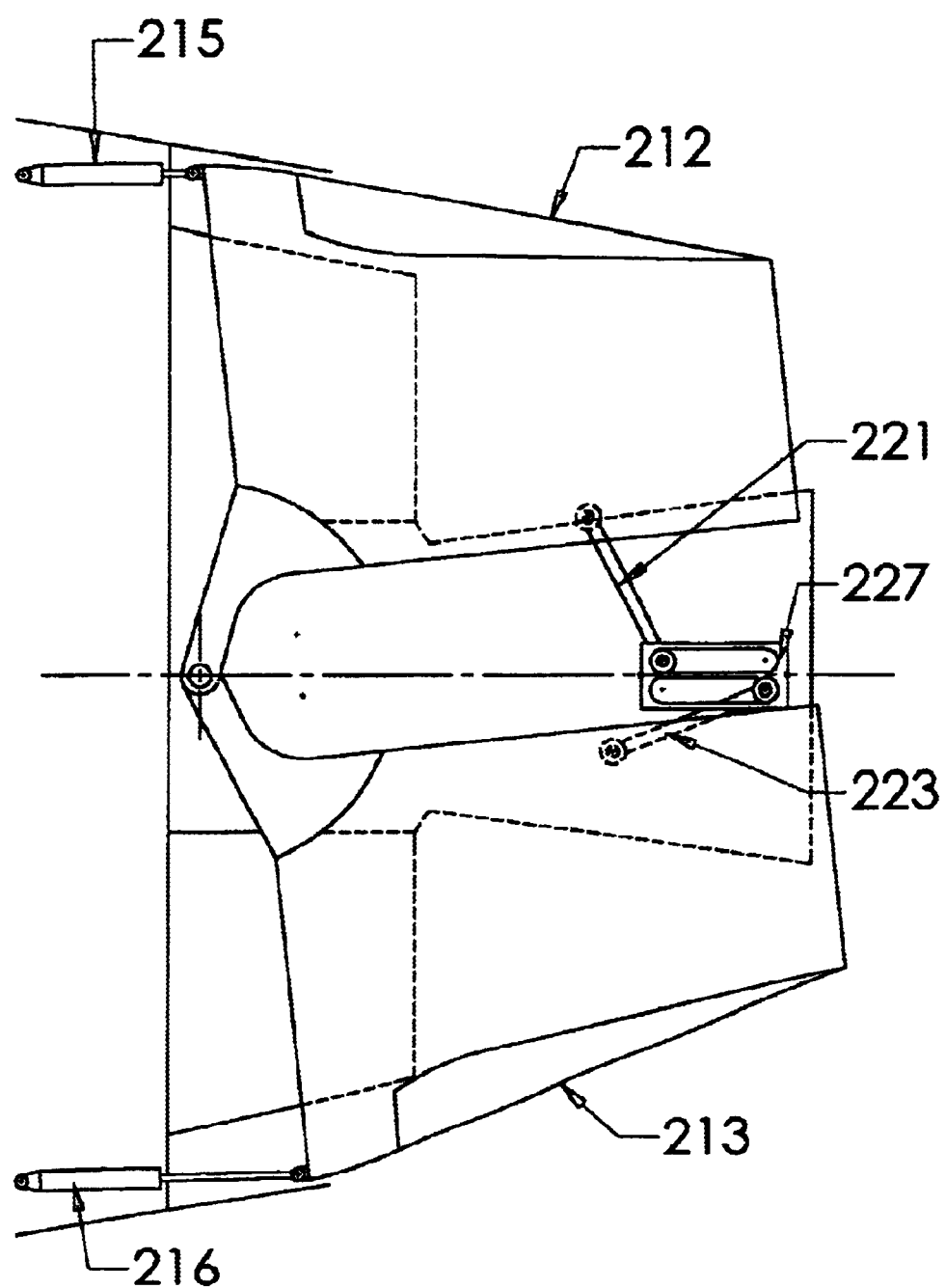
FIG. 11 illustrates a schematic side view of the nozzle shown in FIG. 10 in a thrust-vector up position.
Figure 12:
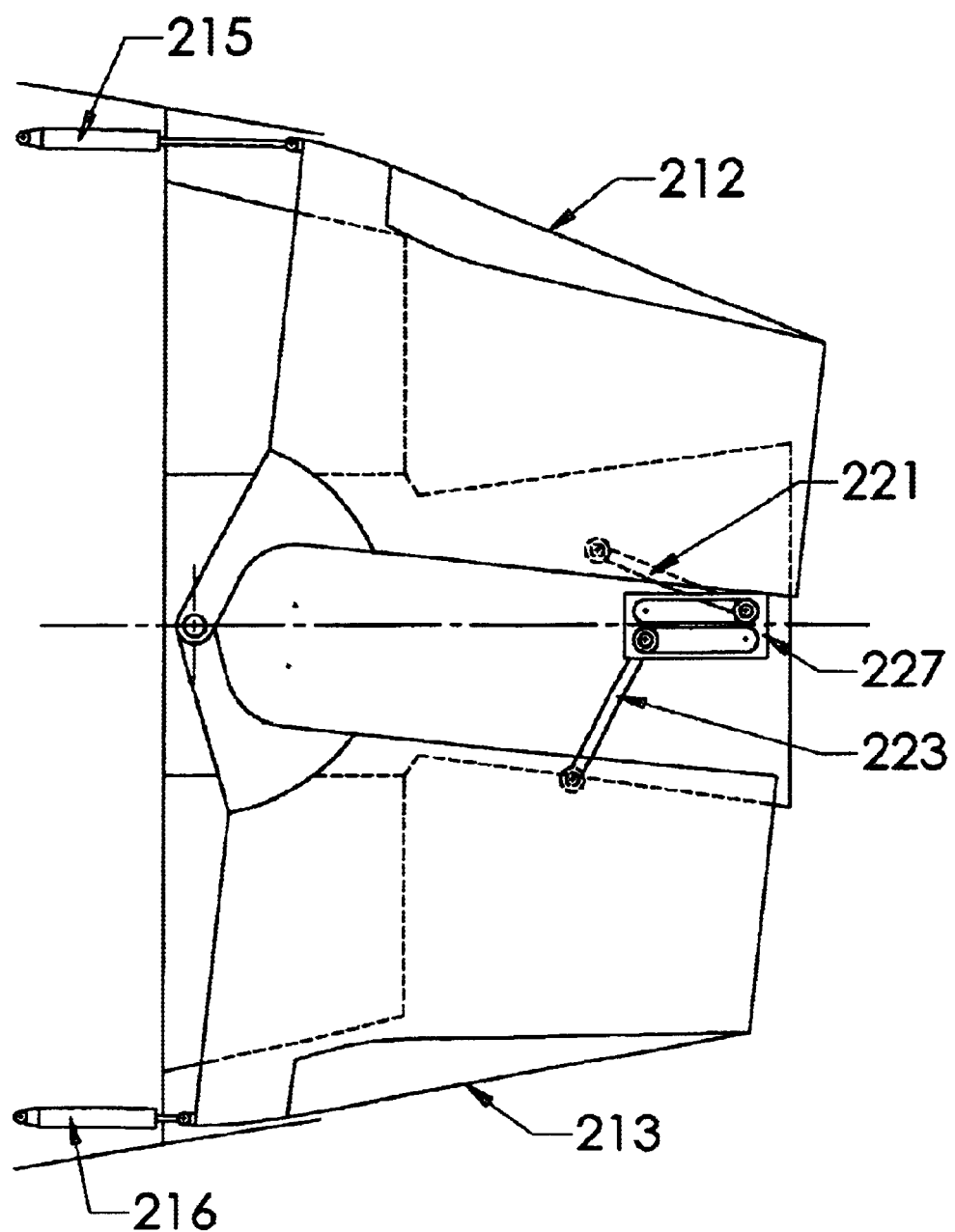
FIG. 12 depicts a schematic side view of the nozzle shown in FIG. 10 in a thrust-vector down position.

With reference to FIGS. 11 and 12 the actuators 215 and 216 can be activated to control the angular position of the exhaust nozzle to rotate the nozzle to have a "nozzle up" or a "nozzle down" position.

Figure 15:
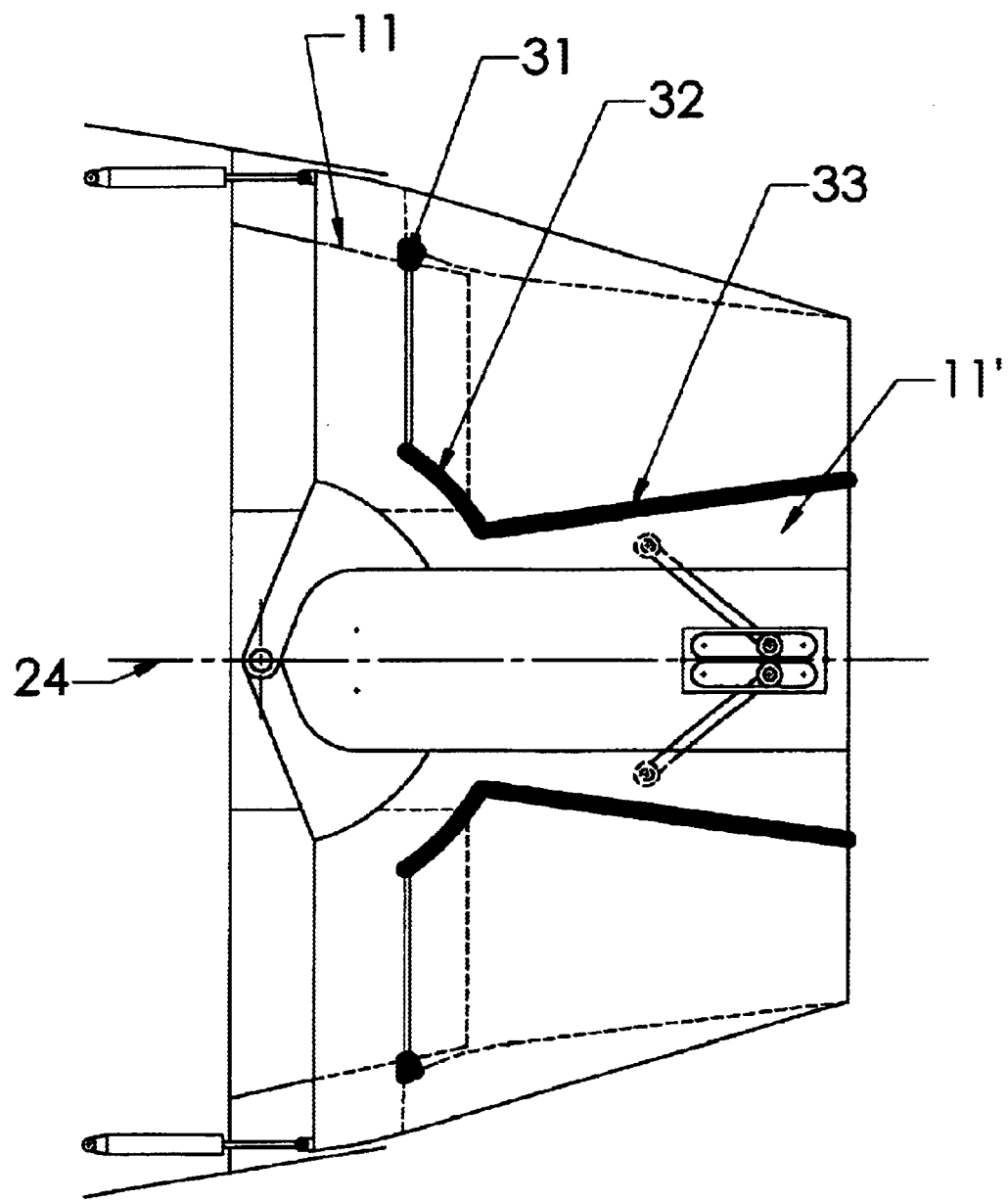
FIG. 15 illustrates a schematic side view of the nozzles shown in FIGS. 1 and 10 showing a sealing arrangement.

Referring to FIG. 15, fluid tightness between the shells and the fixed structure is ensured by a sealing arrangement (symbolically shown) which is typically composed of a radial seal 31 mounted on each shell in the vicinity of their leading edge, a longitudinal seal 33 mounted along the edges of the jet pipe two extension arms, and a cylindrical seal 32 mounted on the jet pipe and connecting said longitudinal seals to said radial seals. So long as the function of said seals is not impaired, further variation of the sealing arrangement can be made. For example, all seals including the radial seals can be installed on the fixed jet pipe, or all seals can be installed on the pivoting shells. Although any type of seal shape can be used, it is advantageous to minimize their size as well as to use a seal material characterized by a low friction capability (Teflon coated, composite or other).

Figure 16:
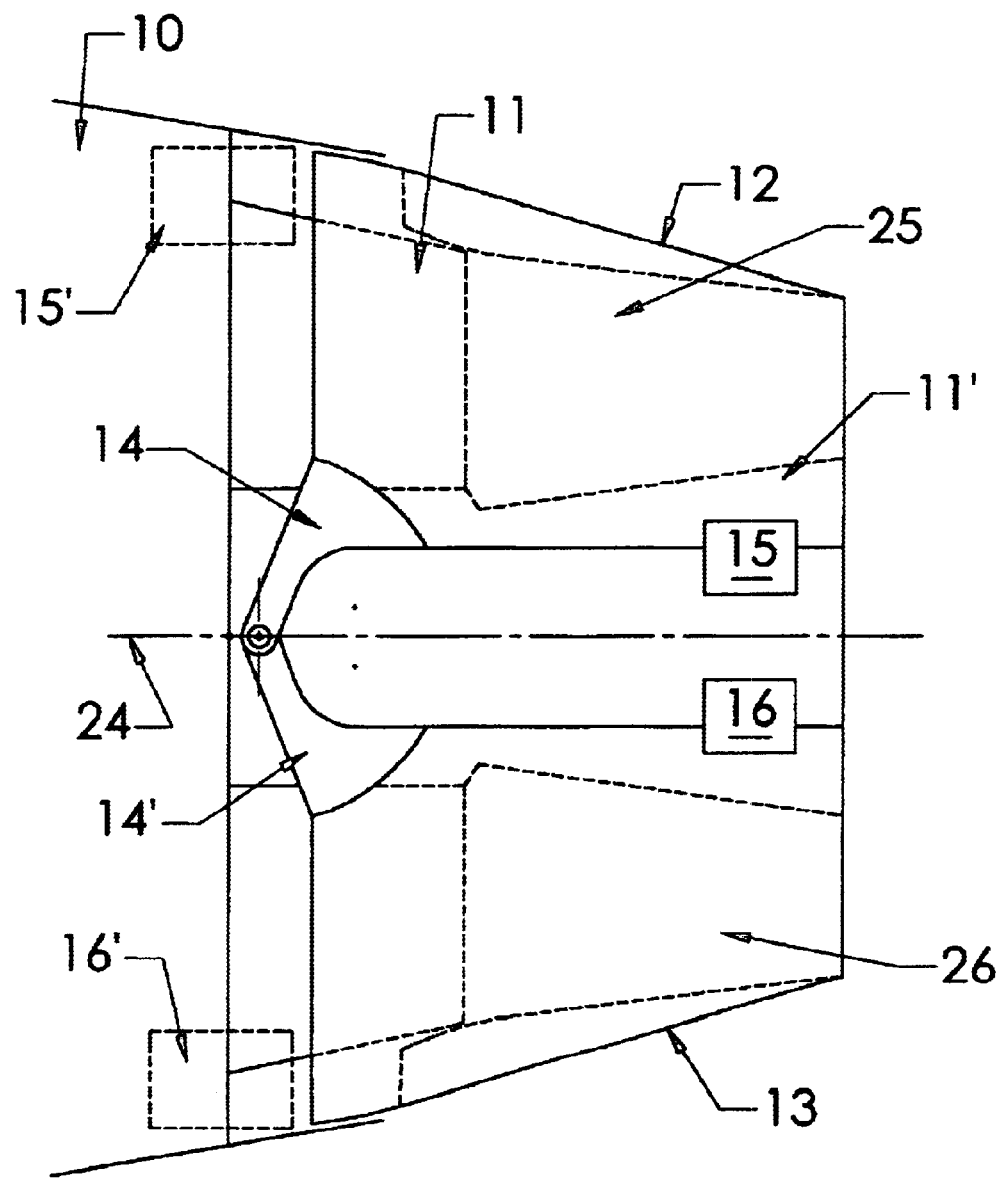
FIG. 16 depicts a schematic side view of another thrust vectoring and variable area exhaust nozzle.

With reference to FIG. 16, it is shown that the position of the actuators 15, 15', 16, and 16' may be varied without departing from the intended scope of the invention. As indicated by showing the actuators as "black boxes," it is also appreciated that each may be any type of actuator, such as hydraulic, pneumatic or electric actuators. While a hydraulic actuator is shown with a piston rod in FIGS. 1 and 10, a screw type actuator can be used to provide the pivoting motion to the shells. A standard control system including a computer can be used to provide controlled movement to the actuator systems during flight.

In the various embodiments of the present invention, the two shells 12 and 13 and 212 and 213 are pivotally mounted on two hinge clevises, each of said devises being supported and attached to the fixed jet pipe, and substantially diametrically opposed. An independent actuator attached to the jet pipe controls each shell. The actuators can either be symmetrically or asymmetrically controlled. When the actuators are symmetrically operated they provide a symmetrical rotation to the shells around their pivots. The two shells rotate away from one another to cause the value of the exhaust area of the nozzle to be increased or towards each other to cause the value of the exhaust area of the nozzle to be decreased. This symmetrical operation of the shells provides the variable nozzle area function of the apparatus. When each of the actuation means are operated asymmetrically, the shells rotate around their pivots to provide an off-angle thrust vector (whether it be up, down, left, or right). This asymmetrical operation of the shells provides the thrust vectoring function of the apparatus.

The pivoting shells allowing the execution of the nozzle area variation as well as the modification of the angle of the thrust vector in an upwards or downwards position are mounted on the jet pipe such that their hinge axis is substantially diametrical along the 3:00 o'clock–9:00 o'clock direction. It is appreciated, however, that the pivoting shells may be mounted side-by-side, such that their hinge axis is substantially diametrical along the 6:00 o'clock–12:00 o'clock direction. It is further appreciated that the pivoting shells may be mounted at any intervening angle between the aforementioned horizontal and vertical positions.

In the following description, reference numbers having superscripts denote a component similar to those components labeled with the same number and no superscript (e.g. 15 and 15'). Said similar components are symmetrical with reference to a plane that is substantially vertical and contains the longitudinal axis of the engine.

Referring now to FIGS. 17 and 17a, the preferred embodiment of the present invention includes a rear portion of a nacelle that wraps a jet engine generally designated 510. Engine 510 is equipped with an exhaust system, or nozzle, comprising a fixed structure 511 called a jet pipe, two diametrically opposed pivoting extension arms 519, 519' and two pivoting shells 513, 514. In FIG. 17a (showing the exhaust system with the outer skin of the jet pipe and pivoting shells removed), the jet pipe has a trailing edge 512 that is substantially contained in a plane that is perpendicular to the axis 601 of the jet pipe. The two pivoting extension arms 519, 519' have distal ends 519a, 519'a that are respectively hinged on pivot fittings 533, 533' at a first location (indicated generally by pivot fitting 533) and a second location (indicated generally by pivot fitting 533'). Pivot fittings 533, 533' are each attached to the jet pipe. With reference to FIGS. 17, 20 (outer skins of the shells and jet pipe have been removed), a first shell 513 and a second shell 514 are pivotally connected to jet pipe 511 at the first location and the second location via hinge arms 515, 515' and 516, 516', respectively. As previously explained, 515' and 516' are the symmetrical components of 515 and 516 with reference to a vertical plane that contains the axis 601 of the jet pipe. Pivoting extension arms 519, 519' and pivoting shells 513, 514 share the same pivotal axis 700, which is normal to the view illustrated in FIG. 20. At least two independent actuation systems 517, 517' and 518, 518' are used for controlling the pivoting of the apparatus. As will become apparent in the description, the actuators 517, 517' control the thrust-vector angle of the nozzle defined by the two shells, while actuators 518, 518' control the value of the nozzle exhaust area.

Referring to FIGS. 18 and 21 (outer skins of the jet pipe and shells removed for clarity in FIG. 21), the nozzle of the invention is in a nozzle-up, or thrust-vector up, position. In other words, the actuation mechanism that controls the angle of rotation of the shells around their pivotal axis 700 has pivoted the arms 519, 519' around the same pivotal axis 700. As previously mentioned, the actuation means is composed of at least one actuator 517 per arm 519, and a similar actuator 517' for arm 519'. One end of actuator 517 is pivotally attached at or about axis 520 to a clevis 534 that is part of or mechanically attached to corresponding pivot fitting 533, while its other end is pivotally attached around axis 521 to distal arm 535 of pivoting arm 519. In a similar manner, the actuator 517' that controls the rotation of arm 519' around pivotal axis 700 has one end pivotally attached around axis 520' to a clevis 534' that is part of or mechanically attached to corresponding pivot fitting 533', while its other end is pivotally attached around axis 521' to distal arm 535' of pivoting arm 519'. Arm 519 has two distal ends, one 519a that hinges on axis 700, the other one 535 that provides pivoting attachment around axis 521 for actuator 517 (see FIGS. 21, 29). Arm 519' has a similar configuration. Without departing from the spirit of this invention, there could be more than one actuator per pivoting arm 519, 519'. It is a characteristic of this invention that during their pivoting motion, the arms 519, 519' are driving both shells 513, 514 to pivot around the common pivotal axis 700. In other words, the arms 519, 519' are truly the muscle that allows the variation of the value of the angle of the thrust vector. In the preferred embodiment, there are no actuators that directly drive the shells for changing the angle of the thrust vector.

Figure 22:
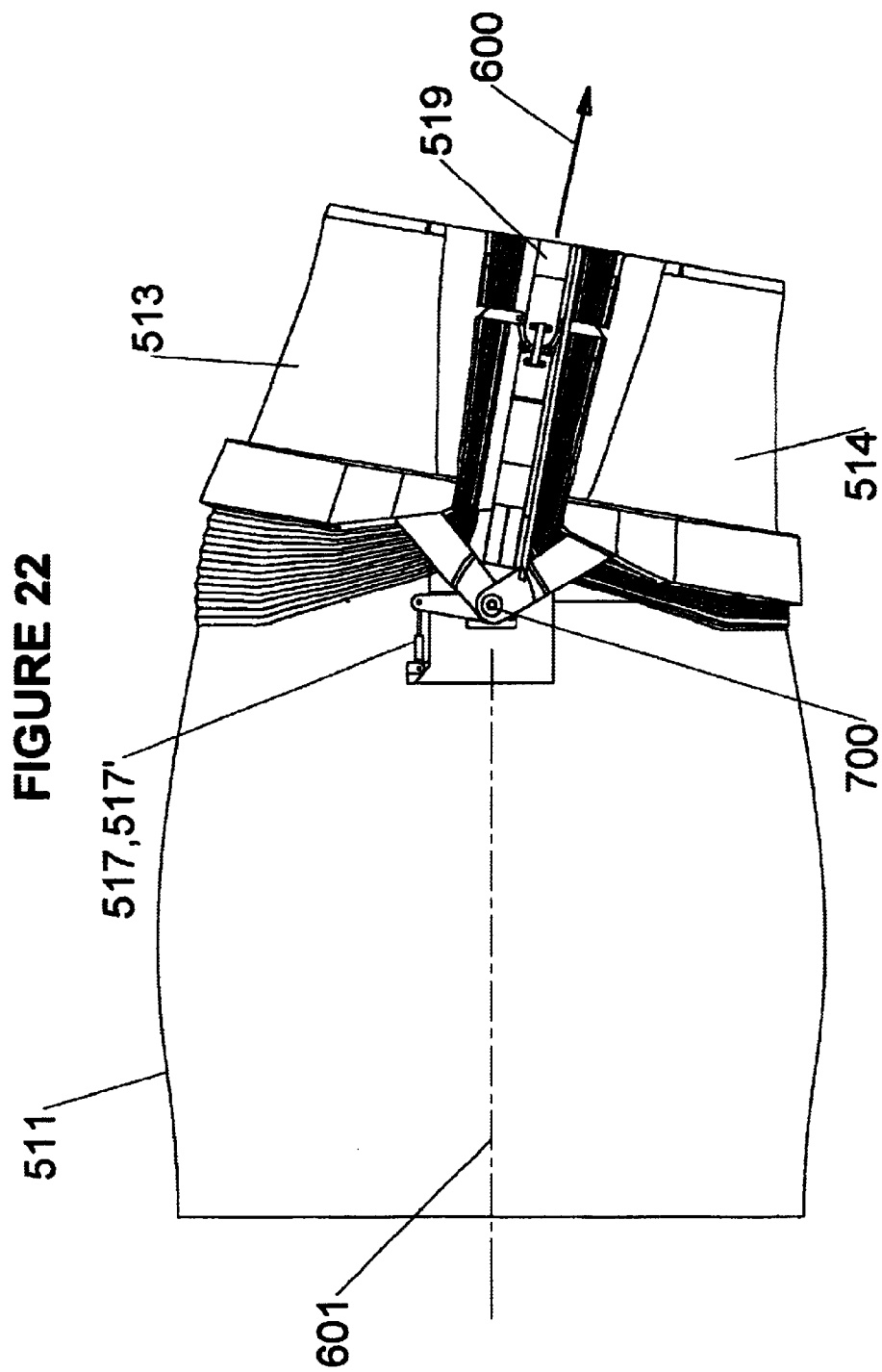
FIG. 22 illustrates a side view of the nozzle of FIG. 19 with the outer skin of the jet pipe and of the shells removed.
Figure 23B:
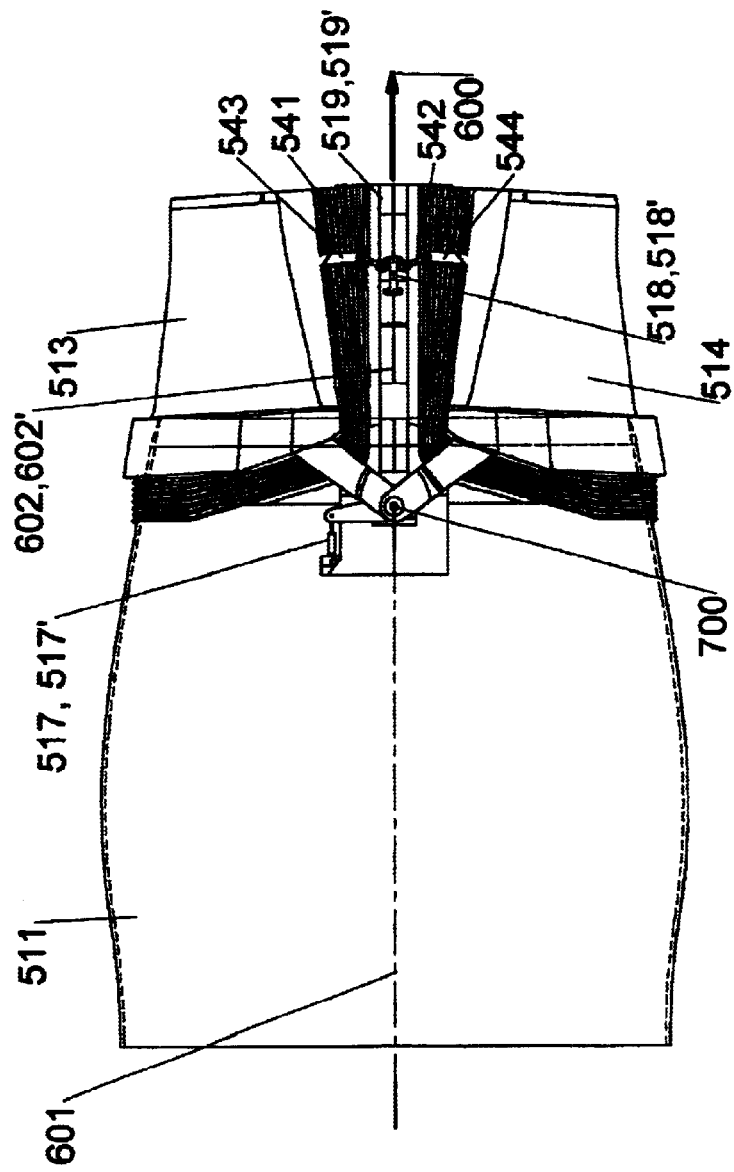
FIG. 23b depicts a side view of the nozzle of FIG. 23a with the outer skin of the jet pipe and of the shells removed.
Figure 23C:
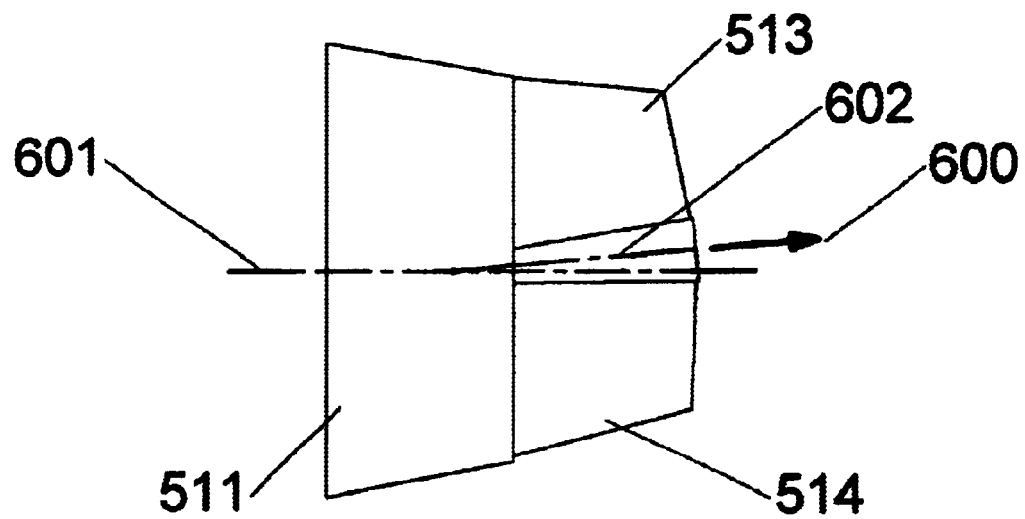
FIG. 23c illustrates a side view of the nozzle of FIG. 17 in a nozzle-up position and the increased exhaust area (opened) position.
Figure 23D:
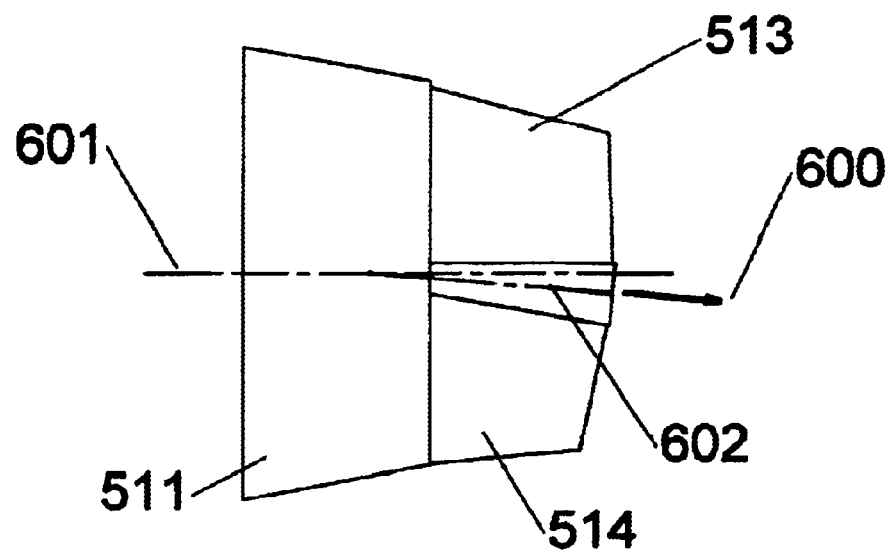
FIG. 23d depicts a side view of the nozzle of FIG. 17 in a nozzle-down position and in the increased exhaust area (opened position)

Referring to FIGS. 17, 17a, and 23b, the actuation means 517, 517' of the pivoting arms 519, 519' have positioned said arms and consequently the shells 513, 514 in a neutral position such that the thrust vector 600 of the exhaust nozzle is aligned with the centerline 601 of the jet pipe 511. Referring to FIGS. 18, 18a, and 21, the actuators 517 and 517', are activated in a first mode of operation to control the angular position of the arms 519, 519' to an arms-up position. This causes the arms to pivot the shells 513 and 514 toward an upward position until the nozzle reaches the nozzle up position. In this case the thrust vector 600 is located above the axis 601 of the jet pipe 511 (FIG. 21). In reference to FIGS. 19, 19a, 22 the actuators 517 and 517', are activated in a second mode of operation to control the angular position of the arms 519, 519' to an arms-down position. This causes the arms to pivot the shells 513 and 514 toward a downward position: the nozzle reaches a "nozzle down position". In this case the thrust vector 600 is located below the axis 601 of the jet pipe 511 (FIG. 22). As previously discussed, it is the arms 519, 519' that drive the shells 513, 514 to a neutral angle position, a nozzle-up position, or a nozzle-down (or thrust-vector down) position. Another characteristic of this invention is that when the arms 519, 519' are in the neutral position (FIG. 17a), the arms-up position (FIG. 18a), or the arms-down position (FIG. 19a), the value of the exhaust area formed by the shells 513, 514 may be separately adjusted to a nominal position like that shown in FIGS. 17, 18 and 19 or to a value that differs from the nominal value like that shown for example in FIGS. 23, 23a, 23b. This is possible because the actuation means 518, 518' (FIG. 23b) that is adjusting the value of the exhaust area of the two shells 513, 514 is independent from the actuation means that controls the adjustment of the thrust-vector angle.

Figure 25:
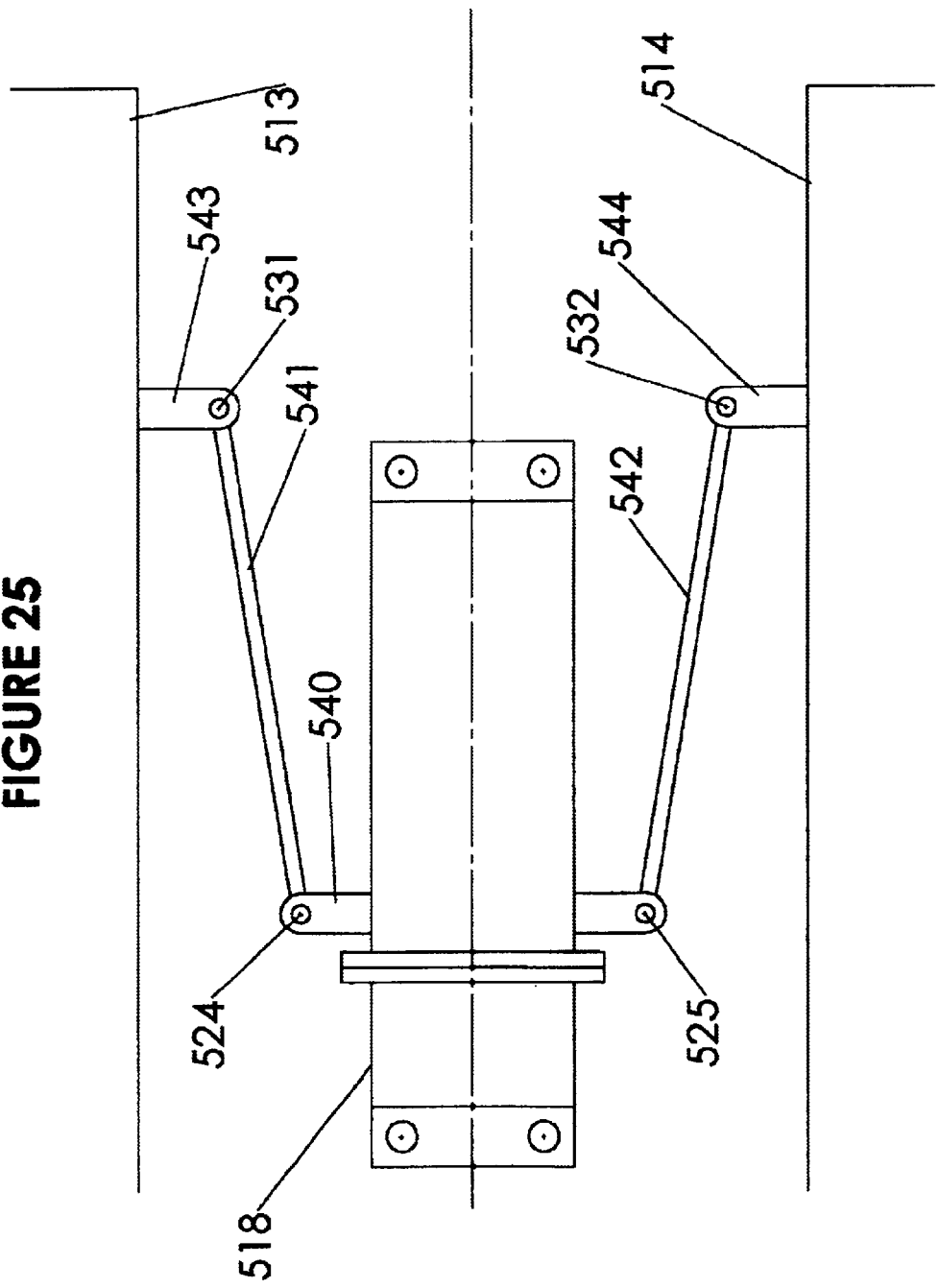
FIG. 25 depicts a side view of the kinematic details of an actuator and the shells of the nozzle of FIG. 17 for adjusting the nozzle exhaust area.

Referring to FIGS. 23b and 25, each of the actuators 518, 518' that controls the adjustment of the value of the exhaust area of the nozzle is mechanically attached to its corresponding pivoting arms 519, 519'. Each one of these actuators drives a cross-arm 540 that is pivotally connected to two links 541, 542 that are in turn pivotally connected to shells 513, 514 via clevis 543, 544. Link 541 is pivotally connected to axis 524 of cross-arm 540 and to axis 531 of clevis 543. In a similar way, link 542 is pivotally connected to axis 525 of cross-arm 540 and to axis 532 of clevis 544.

Referring to FIG. 23b, the actuators 518, 518' have driven the two shells 513, 514 to pivot around their pivotal axis 700 and symmetrically away from each other with reference to the longitudinal axis 602, 602' of the arms 519, 519'. Consequently, the value of the exhaust area of the nozzle is increased above nominal. In reference to FIG. 23c, the exhaust area of the nozzle formed by the two shells 513, 514 is the same as in FIG. 23b, while the pivoting arms 519, 519' have been driven by their actuation means 517, 517' to an arms-up position such that the thrust vector 600 is above axis 601 of the jet pipe. In reference to FIG. 23d, the exhaust area of the nozzle formed by the two shells 513, 514 is the same as in FIG. 23b, while the pivoting arms have been driven by their actuation means to the arms-down position such that the thrust vector 600 is below axis 601 of the jet pipe.

Figure 24B:
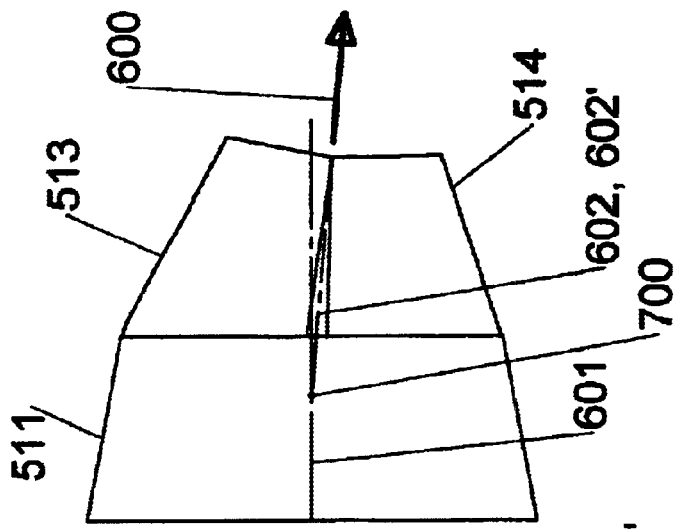
FIG. 24b illustrates a side view of the nozzle of FIG. 17 in the nozzle-down position and the decreased exhaust area (closed) position.
Figure 24:
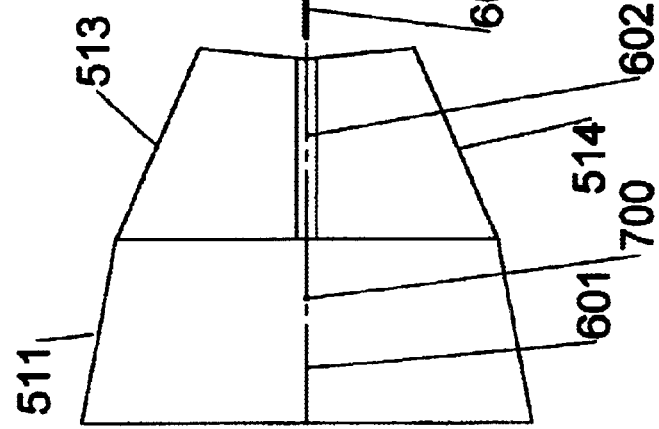
FIG. 24 illustrates a side view of the nozzle of FIG. 17 in the neutral thrust vector position and in a decreased exhaust area (closed) position.
Figure 24A:
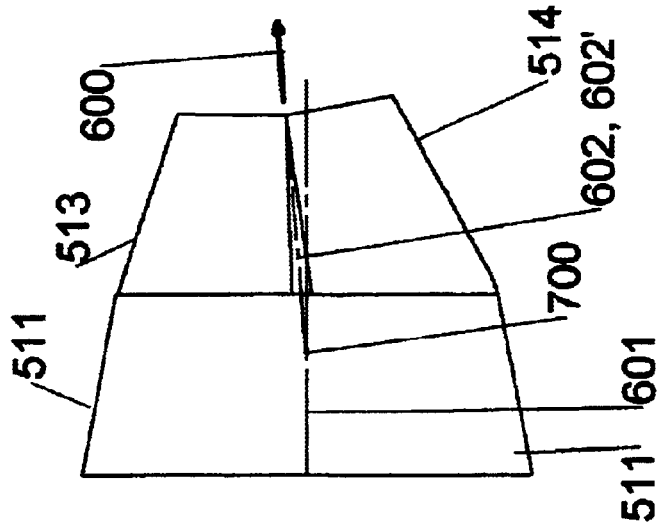
FIG. 24a depicts a side view of the nozzle of FIG. 17 in the nozzle-up position and in the decreased exhaust area (closed) position.

Referring to FIG. 24 the pivoting arms are in the neutral position and the actuators 518, 518' have driven the two shells 513, 514 to pivot around their pivotal axis 700 and symmetrically towards each other with reference to the longitudinal axis 602, 602' of the arms 519, 519'. This results in the value of the exhaust area of the nozzle being decreased below nominal. Referring to FIG. 24a, the exhaust area of the nozzle formed by the two shells 513, 514 is the same as FIG. 24, yet the pivoting arms have been driven by their actuation means to the arms-up position. Similarly in reference to FIG. 24b, the value of the exhaust area is the same, but the pivoting arms have now been driven by their actuation means to the arms-down position.

The actuation systems 518, 518' provide a symmetrical rotation to the shells 513 and 514, so that the exhaust area of the nozzle can be increased or decreased from a nominal value. If the pivoting arms 519, 519', controlled by the actuators 517, 517' are in the neutral position, then the thrust vector 600 remains aligned with the jet pipe centerline 601 (FIGS. 17, 23, 23a, 23b, 24). If the pivoting extension arms 519, 519' are in the arms-up position, then the thrust vector 600 is above the jet pipe centerline 601 for any value of the exhaust area of the nozzle (FIGS. 18, 21, 23c, 24a). If the extension arms are in the arms-down position, then the thrust vector 600 is below the jet pipe centerline 601 for any value of the exhaust area of the nozzle (FIGS. 19, 22, 23d, 24b).

It is possible to change the adjustability of the exhaust area by repositioning the "nominal" location of the cross-arm 540 relative to the stroke of the actuator. For example, if the cross-arm 540 is engineered to be at one end of its stroke when the nozzle is in its nominal position, then the value of the exhaust area of said nozzle could only be increased. If the cross-arm 540 is engineered to be at the other end of its stroke when the nozzle is in its nominal position, then the value of the exhaust area of said nozzle can only be decreased. It is only when the nominal position of the cross-arm is engineered to be in between the two ends of its stroke that the exhaust area of the nozzle can be adjusted above or below its nominal value.

It is apparent from the previous description that the actuation means for controlling the angle of the thrust vector of the exhaust nozzle is independent from the actuation means that controls the value of the exhaust area of said nozzle. The apparatus is therefore capable of adjusting the exhaust area of the nozzle for any angular position of the thrust-vector angle.

Referring now to FIGS. 20 and 26, there are two one-piece seals 550, 560 for sealing the shells to the pivoting arms and the jet pipe. Each seal is of the accordion type for allowing the pivoting motion of the shells. The radial edges 551, 552 of seal 550 are respectively connected to the inner skin 511a of the jet pipe 511 and to the radial edge 513e of the shell 513. The longitudinal edges 553, 554 (FIG. 28) of seal 550 are respectively connected to the arm 519 and to the longitudinal edges of the shell. A similar attachment of seal 550 is provided for arm 519'. Seal 560 is similarly attached to the jet pipe, its pivoting arms, and the shells. In this manner and as shown in FIGS. 20, 21, and 22, the sealing of the shells in any position remains efficient. Another characteristic of this sealing arrangement is that it creates no friction forces between the shells, the arms, and the jet pipe.

FIG. 26 is a local cross section, along line 26—26 of FIG. 17, of the nozzle in its nominal position. Jet pipe 511 has an inner skin 511a and an outer skin 511b. The portion of the jet pipe that is in the vicinity of the trailing edge 512 is fitted with spherical segments 511c, 511d (FIG. 17a) that extend circumferentially around the jet pipe. The aft portion of pivot fittings 533, 533' is fitted with matching spherical portions 533a, 533a' to spherical segments 511c, 511d (FIGS. 17a, 26, 27).

Shell 513 (FIG. 26) has an inner skin 513a and an outer skin 513b. The inner skin in the vicinity of its leading edge has a spherical segment 513c that extends along the radial edge of the shell and that is concentric to the spherical segment 511c of the jet pipe. The gap that is set between the two previous circumferential, concentric segments is kept minimum in order to minimize the amount of engine flow that the accordion seal 550 is required to seal. The upstream portion 513d of the outer skin 513b of the shell extends spherically and radially underneath the outer skin 511b of the jet pipe. In this manner and as shown on FIGS. 17, 18, and 19 there is always aerodynamic flow continuity between the jet pipe 511 and the shells 513, 514 for any of their pivoting positions.

Figure 29:
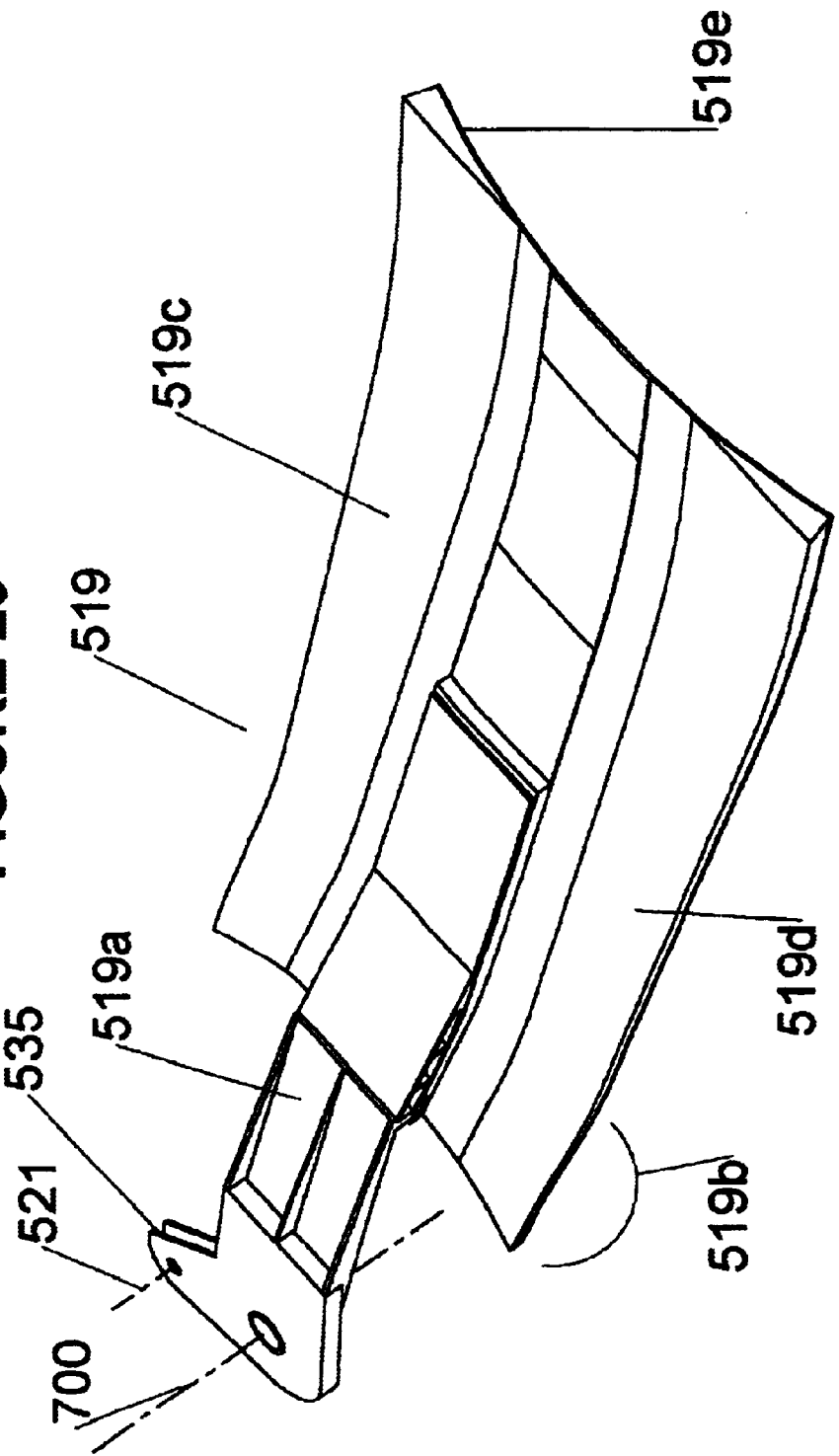
FIG. 29 depicts a perspective view of an extension arm of the nozzle of FIG. 17.

Referring to FIG. 27, a local cross section of the nozzle along line 27—27 of FIG. 17 illustrates the arm 519, the jet pipe inner and outer skins 511a, 511b, and the pivot fitting 533. In its upstream portion, the arm 519 overlaps spherically and concentrically, via spherical portion 519b, a part of the spherical portion 533a of pivot fitting 533. To avoid aerodynamic leakage between the spherical portion 533a of pivot fitting 533 and the arm 519 in the area of their spherical portions, a friction seal 570 is installed on 519b for sealing between spherical portions 519b and 533a. Spherical portion 519b is the upstream portion of concave surface 519e (FIG. 29).

In the preferred embodiment, the pivoting of the extension arms by their actuation means 517, 517' drive the shells to pivot around pivotal axis 700. This allows the modification of the angle of the thrust vector of the shells in an upward or downward position, while the pivoting of the shells by their actuation means 518, 518' allow the increase or the decrease of the value of the exhaust area of the nozzle that is formed by the two shells. The shells and the pivoting extension arms pivot about the same axis 700. The apparatus of the invention allows reaching much larger angle of thrust vectoring because the extension arms of the jet pipe drive the shells in their nozzle-up or down position. Another benefit of the invention is the complete elimination of any friction forces between the shells, the jet pipe, and the pivoting arms. Although all referenced figures show that said shells can be controlled to a nozzle-up or nozzle-down position, because their pivoting axis is substantially diametrical along the 3:00–9:00 o'clock direction, without departing from the spirit of this invention, the pivoting axis can be along the 12–6 o'clock direction for lateral variation of the thrust-vector angle.

Figure 28:
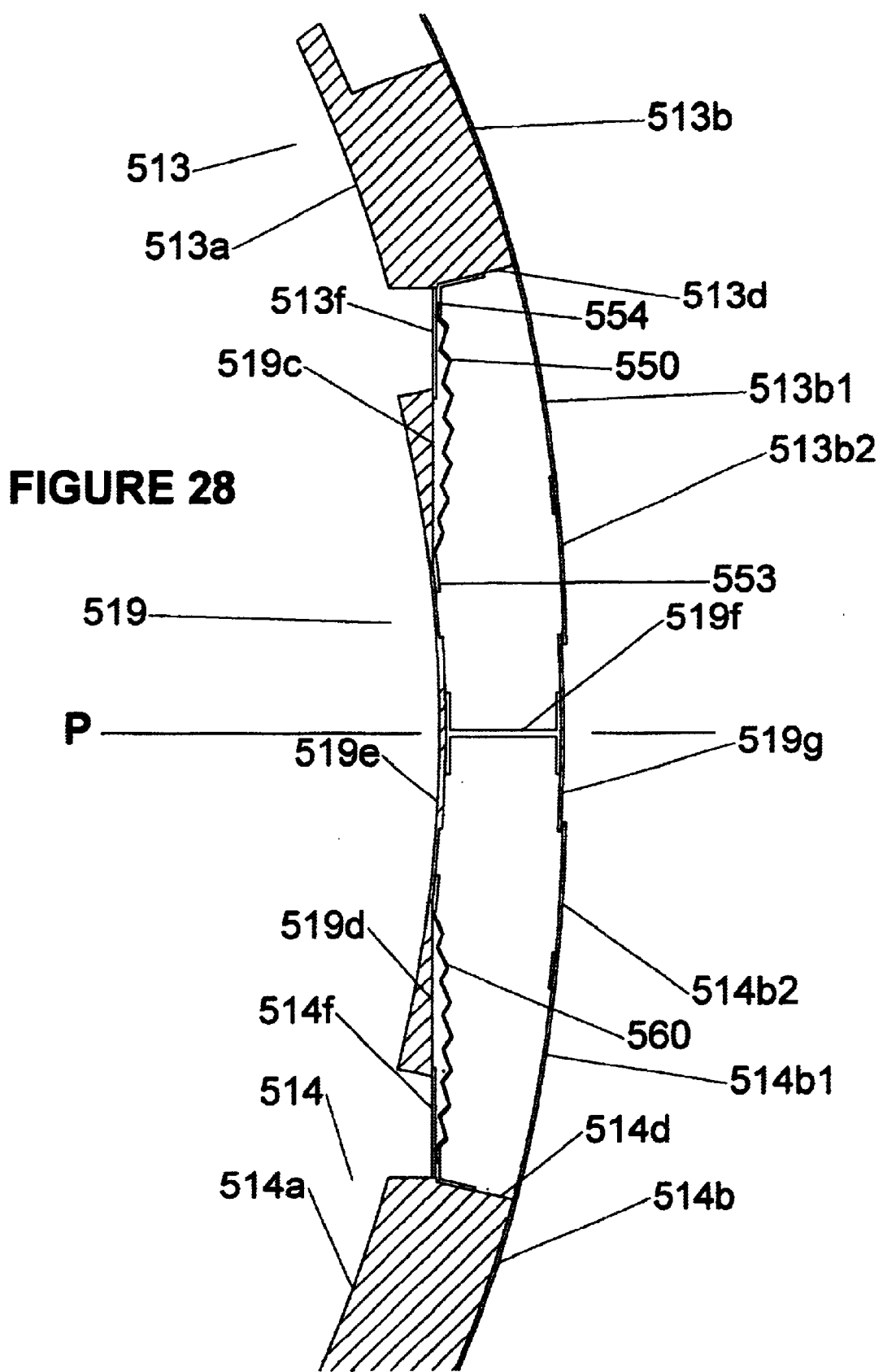
FIG. 28 illustrates a partial cross-sectional rear view of the nozzle of FIG. 23 taken along line C—C.

Another characteristic of this invention is the particular arrangement of each pivoting shell 513, 514 with the pivoting extension arms 519, 519'. This arrangement is detailed in FIG. 28. More particularly, shell 513 has one longitudinal wall 513f extending towards the horizontal plane P that contains the centerline of the jet pipe. This horizontal wall 513f is overlapping outwardly portion 519c of arm 519. Similarly, shell 514 has a longitudinal wall 514f that extends towards horizontal plane P, and that overlap outwardly portion 519d of arm 519. As shown in FIGS. 28, 29 each arm 519 has an inner concave surface 519e that extends longitudinally and two outer surfaces 519c, 519d that are symmetrical with reference to plane P. Walls 519c and 513f and walls 519d and 514f are matching each other in shape but are radially spaced from each other in order to avoid friction between said walls when the shells are pivoted by their actuation means. When the exhaust area of the nozzle formed by the shells and the pivoting arms is increased, as is shown on FIG. 28, the engine flow is contained by the shells concave surfaces 513a, 514a, by concave surface 519e and by longitudinal walls 513f, 514f. As was described earlier, seals 550 and 560 ensure fluid tightness since in their longitudinal section, seals 550 and 560 have one end 553 attached to the arm 519 and the other end 554 to the shells.

Another characteristic of the present invention is the particular arrangement of the fairing that covers the pivoting arms. The purpose of the fairing is to ensure the outer contour continuity of the apparatus for any angular position and value of exhaust area of the shells. As shown in FIG. 28, the fairing for arm 519 is composed of an outer portion 519g that is attached to arm 519 via a fitting 519f. Fairing 519g is removable from fitting 519f. The outer skin 513b of shell 513 has an extension 513b1 beyond longitudinal edge 513d of shell 513. Skin 513b2 is longitudinally attached to 513b1 but is free to slide on 519g. A similar arrangement is done for the other shell 514, where the outer skin 514b has an extension 514b1 that provides attachment to skin 514b2. Skin 514b2 is free to slide on skin 519g. The fairing of arm 519 is therefore composed of three parts: one part 519g that belongs to the arm, one part 513b2 that belongs to the shell 513, and one part 514b2 that belongs to the shell 514. The fairing of arm 519' is similarly composed. In this manner, for any of the position of the shells, the outer contour is always continuous.

Figure 30:
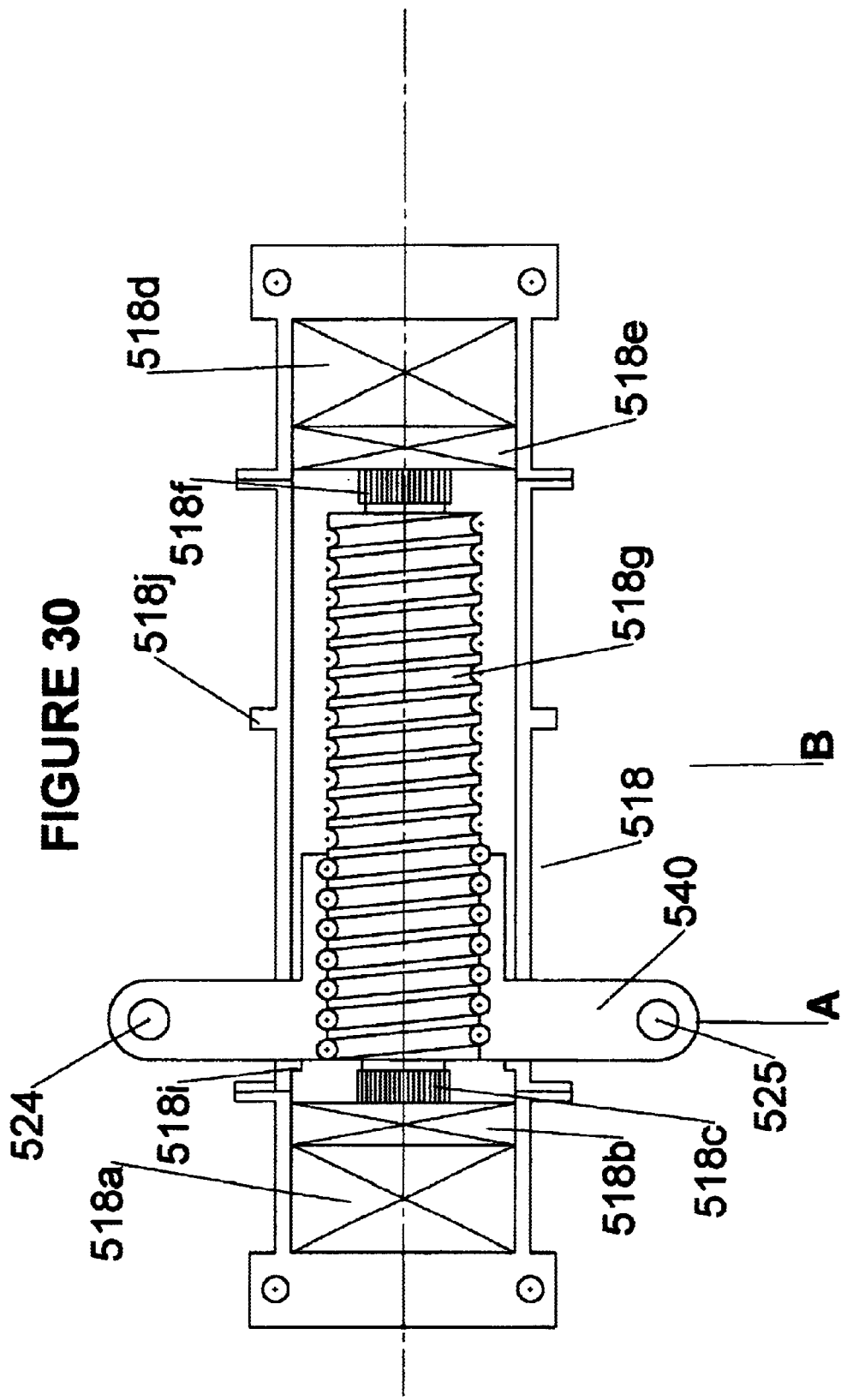
FIG. 30 illustrates a schematic side view of one embodiment of an actuator for controlling the exhaust area of the nozzle of FIG. 17.

Referring to FIG. 30, crosshead 540 of actuator 518 is in position A that corresponds to a nominal exhaust area position as shown in FIGS. 17, 18, 19, 20, 21, 22. To maintain this position, the actuator is not energized. When cross-head 540 of actuator 518 is in position B, the value of the exhaust area is maximum and corresponds to the exhaust area shown in FIGS. 23, 23a, 23b, 23c, 23d. To maintain this position, the actuator is not energized.

The actuator 518 (FIG. 30) is preferably an electro-mechanical actuator, but could be of any type. In the embodiment of FIG. 30, the actuator 518 is composed of an electric motor 518a, an associated gearbox 518b, a cross-head 540 with screw nut and an irreversible ball screw rod 518g. In this manner, once cross-head screw nut 540 has been driven by irreversible screw 518g to its position A or B, or to any intermediate position, then motor 518a is de-energized and the position of the cross-head screw nut 540 on its ball screw rod 518g is maintained by the irreversibility of the screw rod. Screw rod 518g has a pinion gear 518c that engages the gear box 518b. Two mechanical stops 518i, 518j located at either end of the actuator required stroke, limit the traveling of crosshead 540. Without departing from the spirit of this invention, the mechanical stops can be adjustable.

Screw rod 518g can be driven by an emergency motor 518d with associated gear box 518e. In normal operation, it is motor 518a that drives the screw rod such that the crosshead screw nut 540 reaches its intended position A, B or any position in between. In case motor 518a has failed, it is the emergency motor 518d that becomes energized to drive, via gear box 518e and pinion gear 518f, the cross-head screw nut 540 to its intended position. Once that position is reached, the emergency motor is de-energized.

Figure 31:
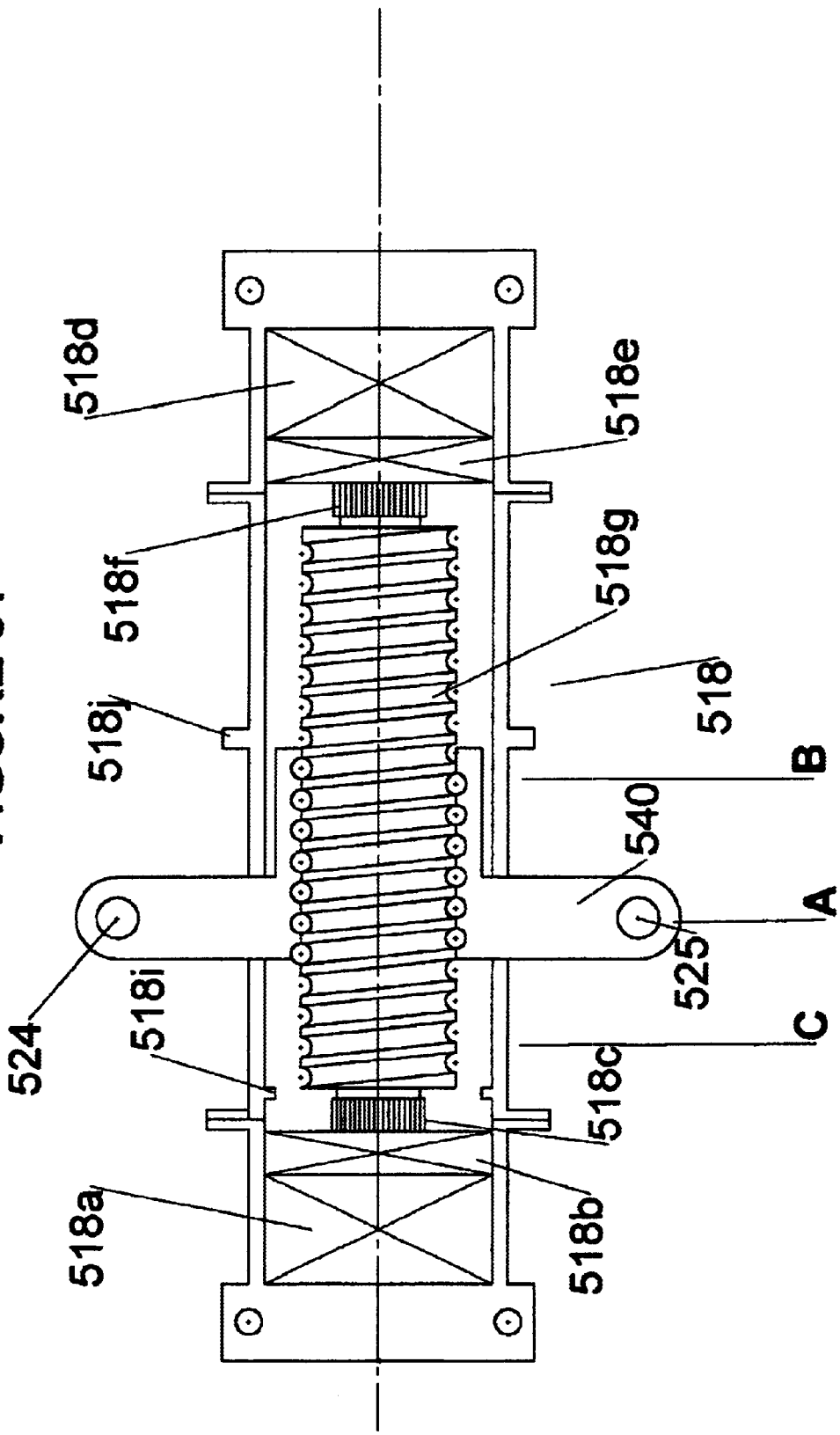
FIG. 31 illustrates a schematic side view of another embodiment of an actuator for controlling the exhaust area of the nozzle of FIG. 17.
Figure 31A:
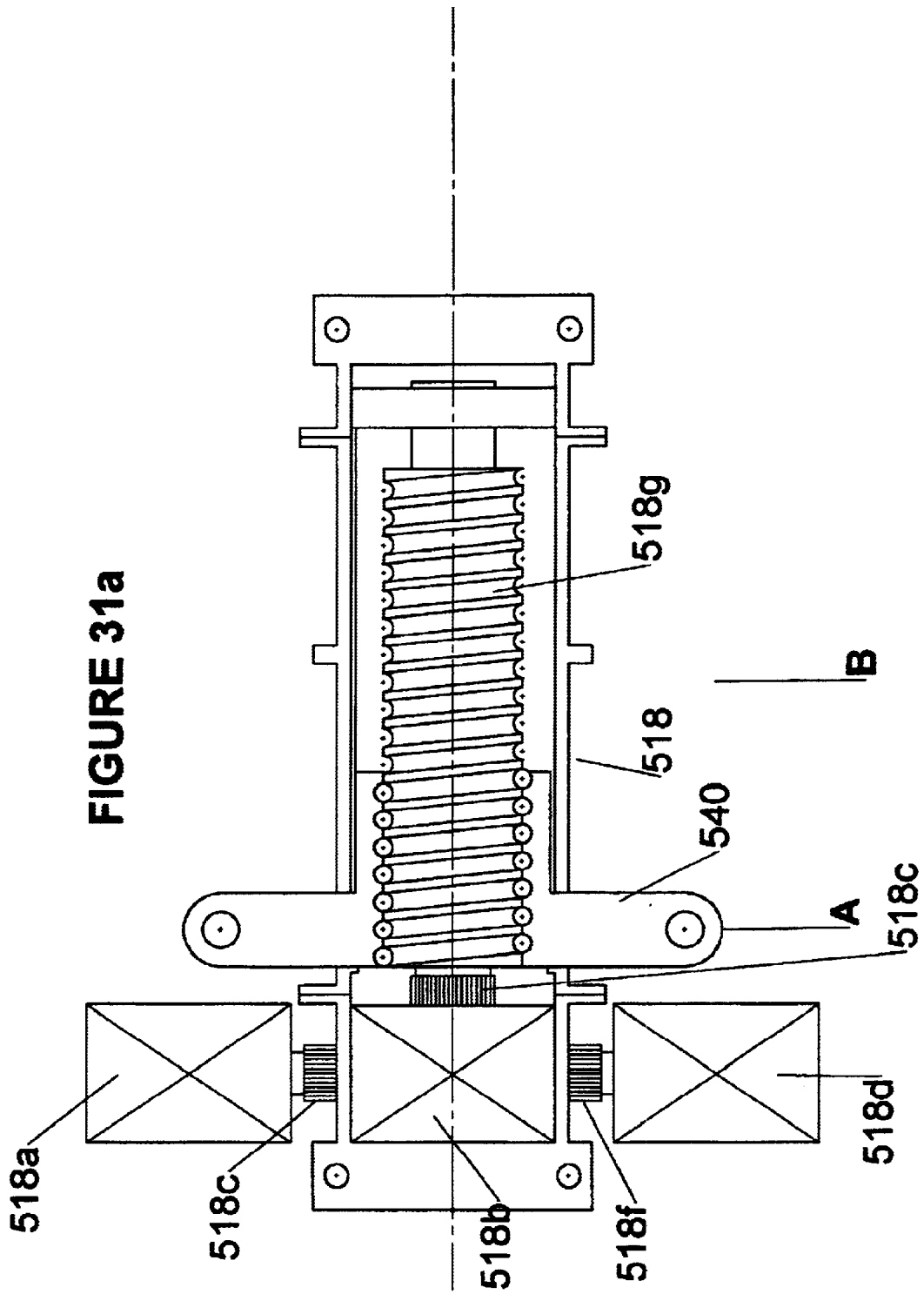
FIG. 31a depicts a schematic side view of another embodiment of an actuator for controlling the exhaust area of the nozzle of FIG. 17.

Referring to FIG. 31, an alternate embodiment of the starting position of cross-head 40 is illustrated. Cross-head screw nut 540 is in position A, when the exhaust area of the shells is at nominal. Crosshead screw nut 540 stays in this position by the irreversibility of the screw rod. Neither of the motors 518a, or 518d needs to be energized to maintain the position. In normal operation, motor 518a is energized to drive the screw rod 518g that makes the cross-head screw nut travel to position B corresponding to the shells' maximum exhaust area value shown in FIGS. 23, 23a, 23b, 23c, 23d or to position C corresponding to the shells' minimum exhaust area value shown in FIGS. 24, 24a, 24b. Once any position is reached, motor 518a is de-energized. In the event the normal motor 518a is inoperative, then emergency motor 518d is energized for positioning crosshead screw nut 540 to its intended position. While emergency motor 518d and gear box 518e are shown to be axially and opposite installed to normal motor 518a and associated gear box 518b, without departing from the spirit of this invention, both motors could be installed side by side as shown in FIG. 31a.

Figure 32:
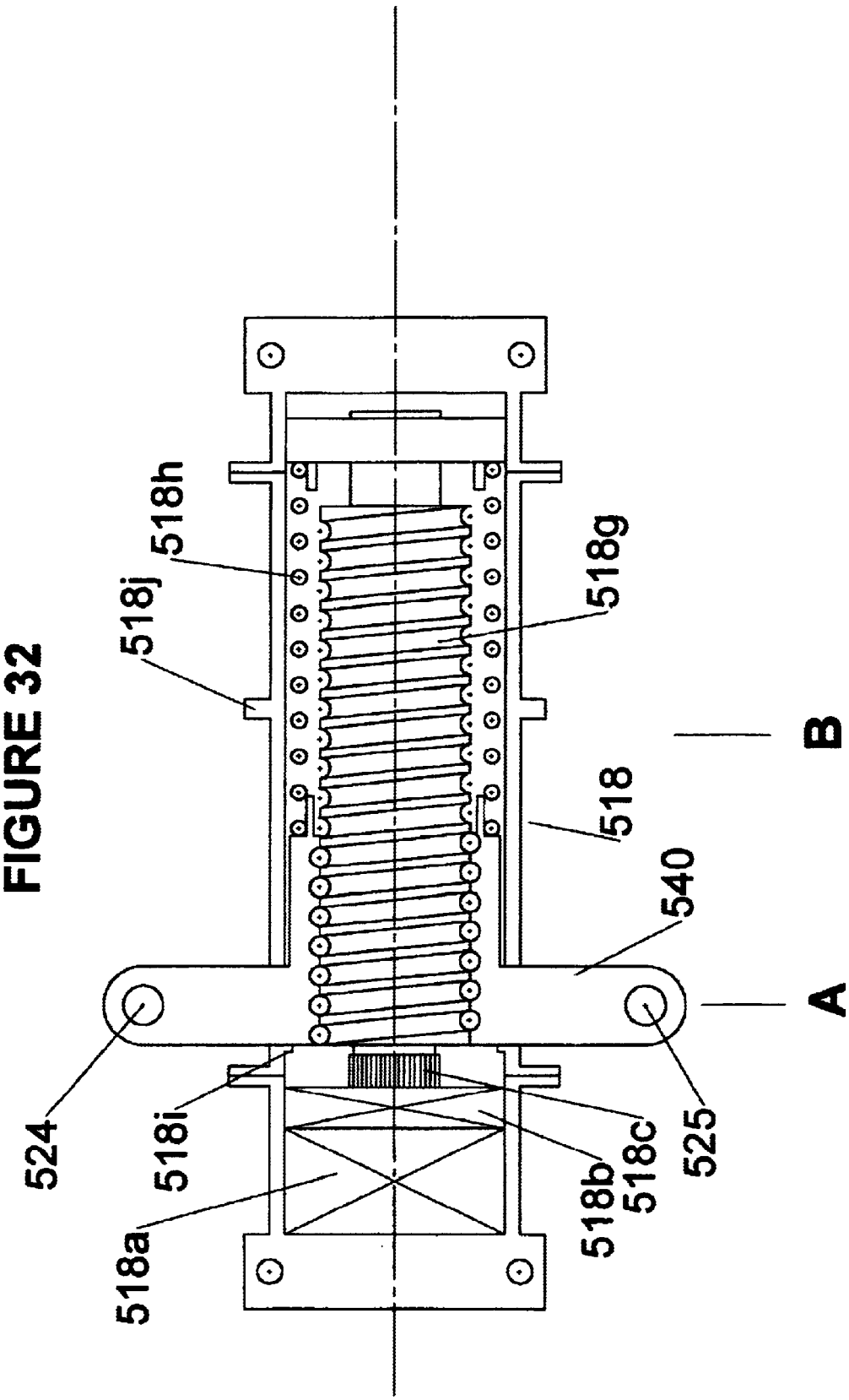
FIG. 32 depicts a schematic side view of another embodiment of an actuator for controlling the exhaust area of the nozzle of FIG. 17.
Figure 33:
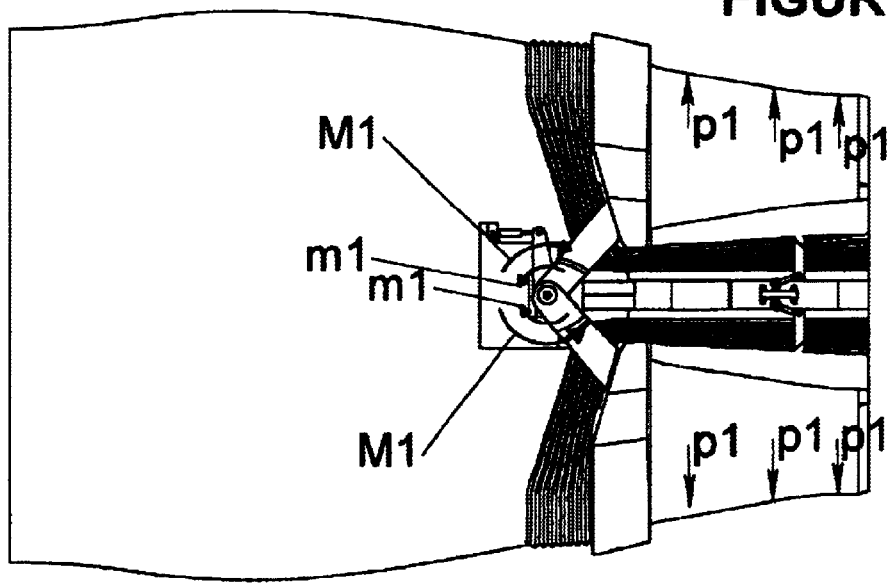
FIG. 33 illustrates a side view of the nozzle of FIG. 17 showing how the aerodynamic pressure acts on the shells of the nozzle.
Figure 34:
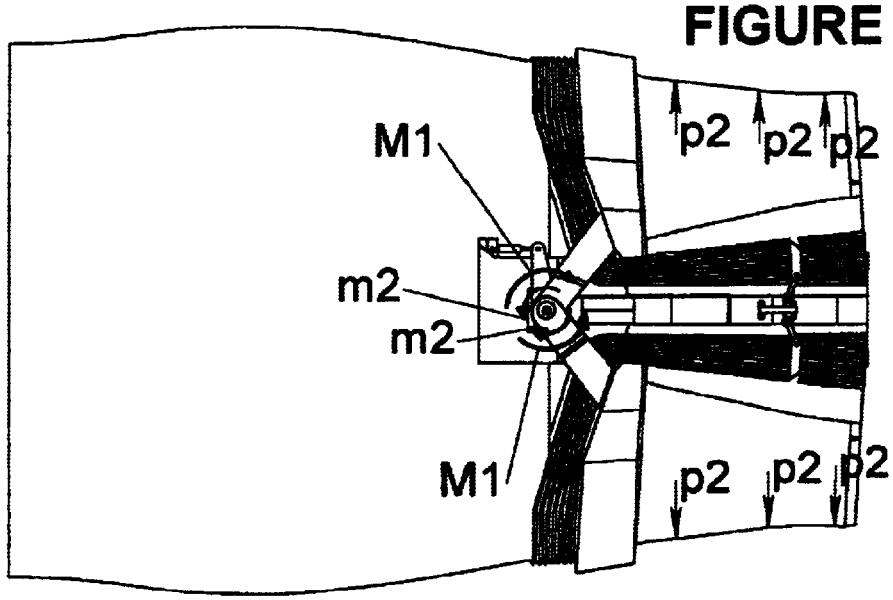
FIG. 34 depicts a side view of the nozzle of FIG. 23 showing how the aerodynamic pressure acts on the shells of the nozzle.

In the event that the value of the exhaust area formed by the shells 513, 514 needs to reach only two values, nominal for cruise, and maximal for take-off, and in the event that the failure case of the apparatus has to correspond to the maximum value of the exhaust area, FIG. 32 depicts an alternative embodiment. Actuator 518 is now composed of a single motor 518a, with a gear box 518b, a reversible ball screw rod 518g that drives a crosshead screw nut 540, and a spring 518h. Spring 518h biases crosshead screw nut 540 to position A, which corresponds to the nominal exit area value position of the shells shown in FIGS. 17, 18, 19, 20, 21, 22. Engine flow aerodynamic pressure p1 (FIG. 33) that is acting on the shells 513, 514 when the engine is set at the cruise rating or to any lower rating, generates an opening moment m1 of the shells around their pivotal axis 700 that is less than the closing moment M1 generated by the spring 518h. This results in the cross-head 540 remaining in position A. When motor 518a is de-energized, the exhaust area of the shells remains at nominal value. In normal operation, the motor 518a is energized to drive the crosshead screw nut 540 to its take-off position. The value of the exhaust area of the nozzle formed by the shells 513, 514 increases to a maximum area similar to that shown in FIGS. 23, 23a, 23b, 23c, 23d. Once position B is reached, and once engine rating has reached its take-off value, then the corresponding aerodynamic pressure p2 (p2 is greater than p1) acting on the shells generates an opening moment m2 around the shells pivotal axis 700 that is greater than the pivoting moment M1 generated by the spring 518h. Consequently, the cross-head screw nut 540 remains in position B as motor 518a is de-energized. In case motor 518a has failed, when the engine rating is set to take-off value, the aerodynamic pressure p2 acting on the shells drives the crosshead screw nut 540 to position B. This is possible because screw rod 518g is reversible. The value of the exhaust area of the nozzle formed by the shells corresponds to FIGS. 23, 23a, 23b, 23c, and 23d. It is clear that in any of the previous embodiments, it is not required to keep the motor energized for maintaining the position of the cross-crosshead nut, which in turn dictates the value of the exit area of the nozzle formed by the shells.

In summary, in one actuator embodiment, an irreversible screw secures the position of the crosshead screw nut and an emergency motor fulfills covering of the failure case of one motor. In another embodiment, keeping the position of the crosshead screw nut is ensured by a spring that is sized to generate a closing moment that is greater than or less than the aerodynamic opening moment that is acting on the shells.

The actuators 517, 517' that control the value of the thrust-vector angle, i.e., that control the jet pipe pivoting arms in a neutral position, arms-up position or arms-down position, which in turn control the exhaust nozzle angle between a neutral position, nozzle-up position, or nozzle down position, are the same type as the one depicted for the control of the value of the nozzle exhaust area. The preferred embodiment is an irreversible screw-rod that is driven by two motors that drive a screw nut. One motor is used for normal operation while the other one is for emergency use, i.e., used in case of failure of the first one or of any other components of the normal circuit. With reference to FIG. 31b, with the cross-arms in position A, the arms 519, 519' of FIG. 17a, are in the neutral position, i.e., the exhaust nozzle formed by the shells is in the neutral position of FIGS. 17, 20, 23, 23b, 24. With the cross-arms in position B or any positions between A–B, the arms 519, 519' of FIG. 19a are in the arms-down position, i.e., the exhaust nozzle formed by the shells is in the nozzle down position of FIGS. 19, 22, 23d, 24b. With the cross-arms in position C, or any positions between A–C the arms 519, 519' of FIG. 18a are in the arms-up position, i.e., the exhaust nozzle formed by the shells is in the nozzle up position of FIGS. 18, 21, 23c, 24a. The operation and description of the actuator of FIG. 31b are the same as for FIG. 31. The irreversibility of the screw rod maintains the cross arm in position without energizing of the motors. In the case that the exhaust nozzle needs to only reach two positions, i.e., neutral and nozzle up and any positions in between or neutral and nozzle down and any positions in between then the actuators 517, 517' are like the one depicted in FIG. 30a. The operation and description of the actuator of FIG. 30a are the same as for FIG. 30. To achieve the neutral and nozzle up positions, the crosshead is in position B for the neutral position. To achieve the neutral and nozzle down positions, the crosshead is in position A for the neutral position. The irreversibility of the screw rod maintains the cross arm in position without energizing of the motors for any positions including intermediate ones.

The actuation system can also be electro-hydraulic or electro-pneumatic. In order to optimize the performance of the aircraft throughout the flight envelope, the control system of the shells can be fully integrated to the engine computer and to the aircraft flight controls. Because of the high vibration environment in which most jet engines operate, all of the actuation systems described above may include a braking mechanism to secure positioning of the actuator after the motor has been de-energized. The braking mechanism could be employed regardless of whether the screw of the actuator is reversible or irreversible.

Figure 35:
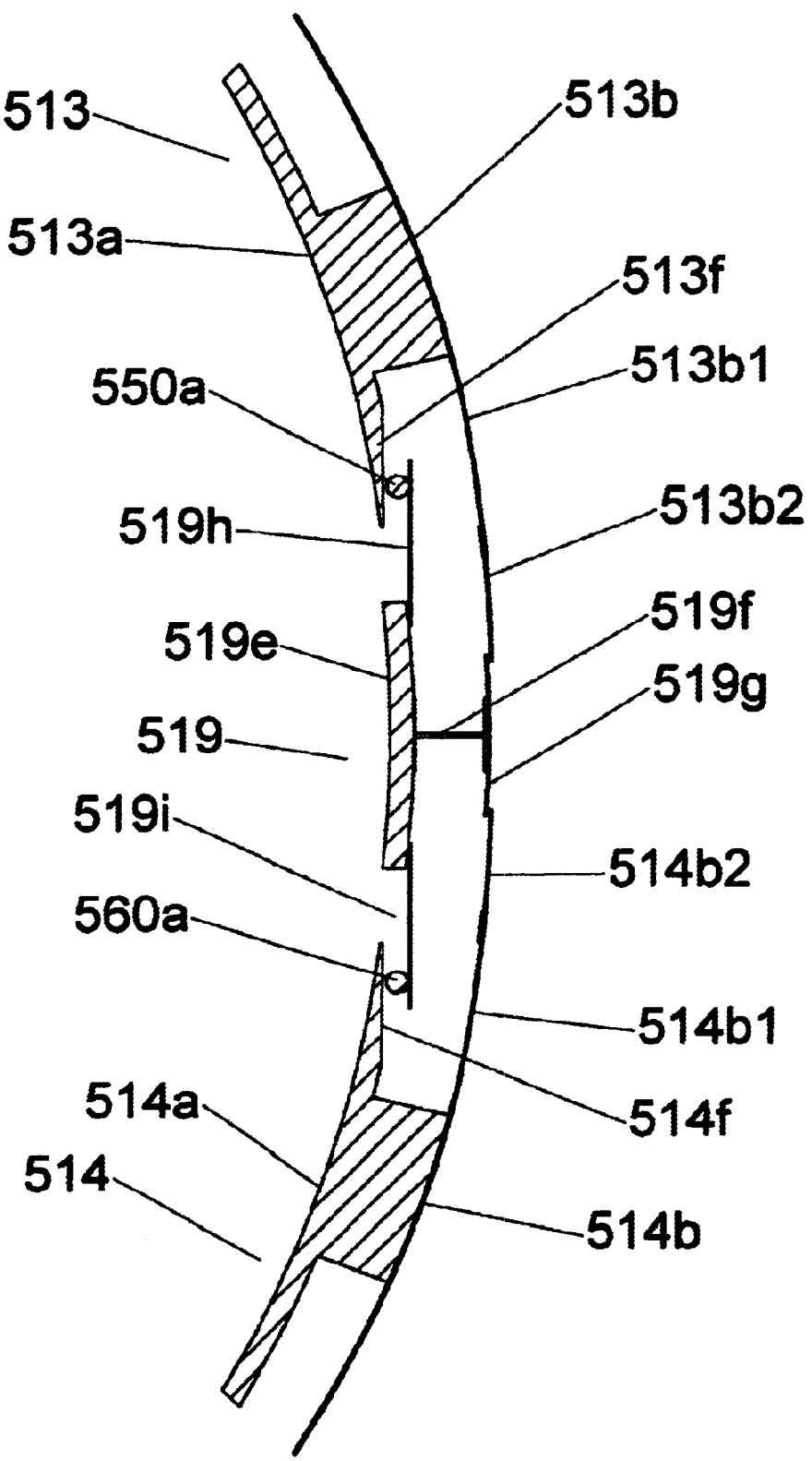
FIG. 35 illustrates a partial cross-sectional rear view of a nozzle according to an alternative embodiment of the present invention, the view being similar to that view illustrated in FIG. 28.

FIGS. 35, 36, and 37 show an alternate embodiment of the nozzle of the present invention. The arrangement of the shells and the pivoting arms, as well as the sealing between the shells, pivoting arms, and jet pipe, differ from the nozzle of FIG. 17. FIG. 35, a view of the nozzle similar to the view of FIG. 28, shows an alternate embodiment of the arrangement of each pivoting shell 513, 514 with the pivoting arm 519. More particularly, the longitudinal walls 513f, 514f of respective shells 513, 514 are now overlapping inwardly the respective extensions 519h, 519i of pivoting arm 519. Each extension 519h, 519i holds a seal 550a, 560a that seals with the walls 513f, 514f of the shells. When the exhaust area of the nozzle formed by the shells and the pivoting arms is increased, as is shown in FIG. 35, the engine flow is contained by the shells concave surfaces 513a, 514a, the walls 519h, 519i, and the concave surface 519e of the pivoting arm. A similar shells/arm arrangement is ensured for arm 519'.

FIG. 36, a view of the nozzle similar to the view illustrated in FIG. 26, shows an alternate embodiment of the radial sealing between the shell and the jet pipe. A seal 550b is now installed on shell 513 for sealing with the spherical segment 511c of the jet pipe. As can be seen on FIG. 36, this radial sealing will ensure good sealing for any angular position of the shells.

Figure 38:
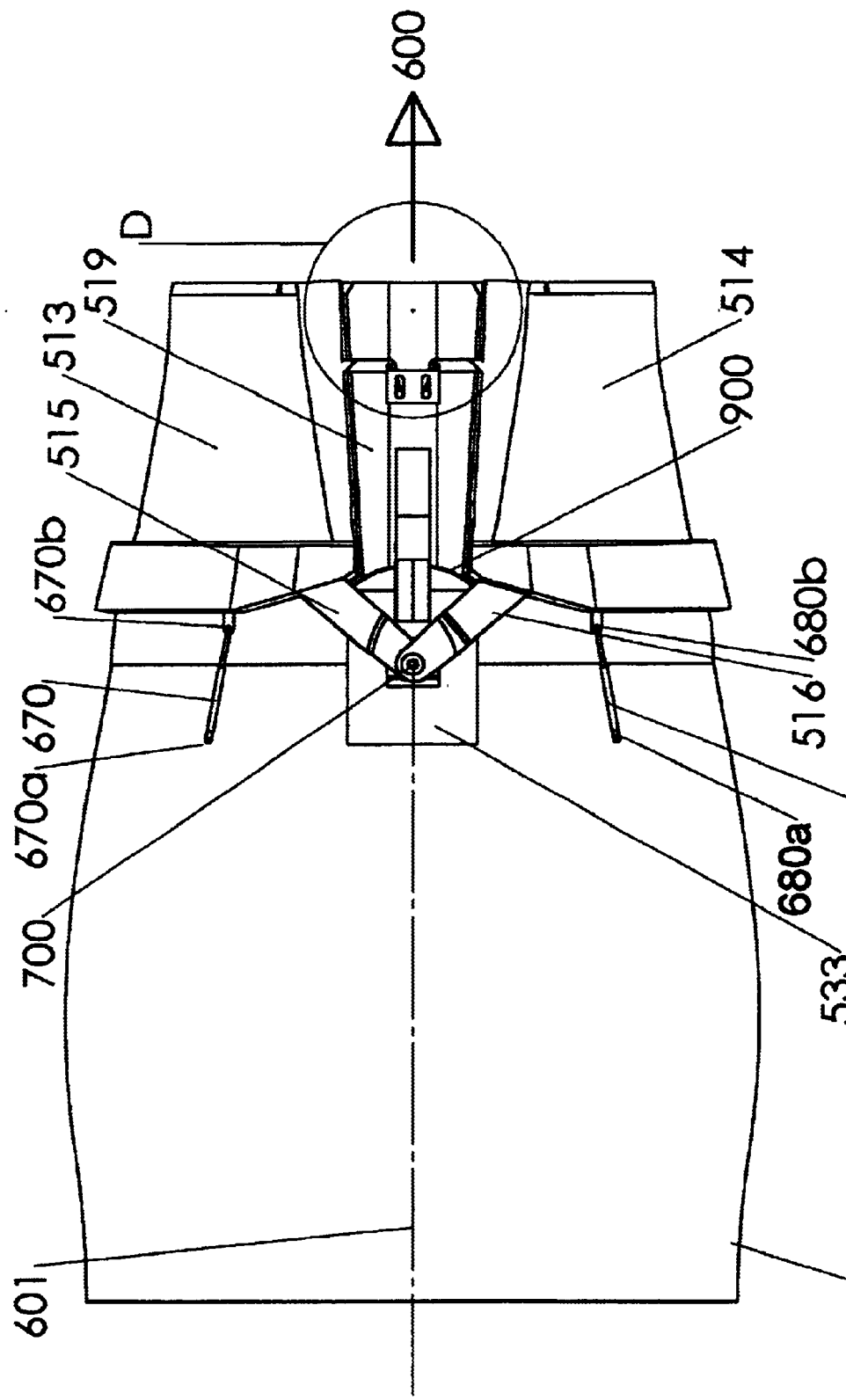
FIG. 38 depicts a side view of the nozzle of FIG. 35 with the outer skin of the jet pipe and the shells removed, the nozzle being showing in a neutral thrust vector position.

FIG. 37, a view of the nozzle similar to the view illustrated in FIG. 27, shows that seal 570 ensures the sealing between arm 519 and the jet pipe. Seal 570 is installed on the spherical portion 519b of arm 519, and seals with the corresponding spherical portion 533a of pivot fitting 533. As shown in FIGS. 37 and 38, the pivot fitting 533 is fitted with a cylindrical wall 900 centered on the common pivotal axis 700 of the shells and of the pivoting arms. The cylindrical wall 900 mates with a corresponding cylindrical wall 901 of the arm 519. Wall 900 ensures the sealing transition between the longitudinal and the radial sections of the seals of the shells. The pivot fitting 533' has the same configuration.

The sealing arrangement of FIGS. 35, 36, 37 induces friction forces between the seals and the structure on which they apply, and therefore a low friction force seal material such as Teflon, for example, is recommended with that seal embodiment.

FIG. 38 shows an alternate embodiment of the actuation system for controlling the value of the exhaust area of the nozzle formed by the shells and for controlling the thrust-vector angle. More particularly, there are at least two independent actuators 670, 680 that are connected to the shells and the jet pipe for controlling the pivoting of the shells. This time, there are no specific devices to control the pivoting of the arms 519, 519'. Instead, the shells are driven by the actuators and the motion of the shells communicates the pivoting motion to the jet pipe extension arms. One end 670a of actuator 670 is pivotally connected to the jet pipe 511 while its other end 670b is pivotally connected to shell 513. Similarly, actuator 680 has one end 680a pivotally connected to the jet pipe 511 and its other end 680b pivotally connected to shell 514. Referring to FIG. 38a, detail D of FIG. 38, each of the two longitudinal edges of shell 513 may be equipped with a clevis 630 that provides the pivoting connection 810 to one end of arm 730. The other end 760 of the arm is in position A1 and is configured to slide in slot 690 of guide fitting 800 that is mechanically attached to the pivoting arm 519. Similarly, each of the two longitudinal edges of shell 514 has a clevis 640 that provides the pivoting connection 910 to one end of arm 740. The other end 770 of the arm is configured to slide in slot 691 of guide fitting 800 that is mechanically attached to the pivoting arm 519.

FIG. 38 shows that the thrust vector 600 of the nozzle formed by the shells is aligned with the axis 601 of the jet pipe 511, and the value of the exhaust area of the shells is nominal.

Figure 39:
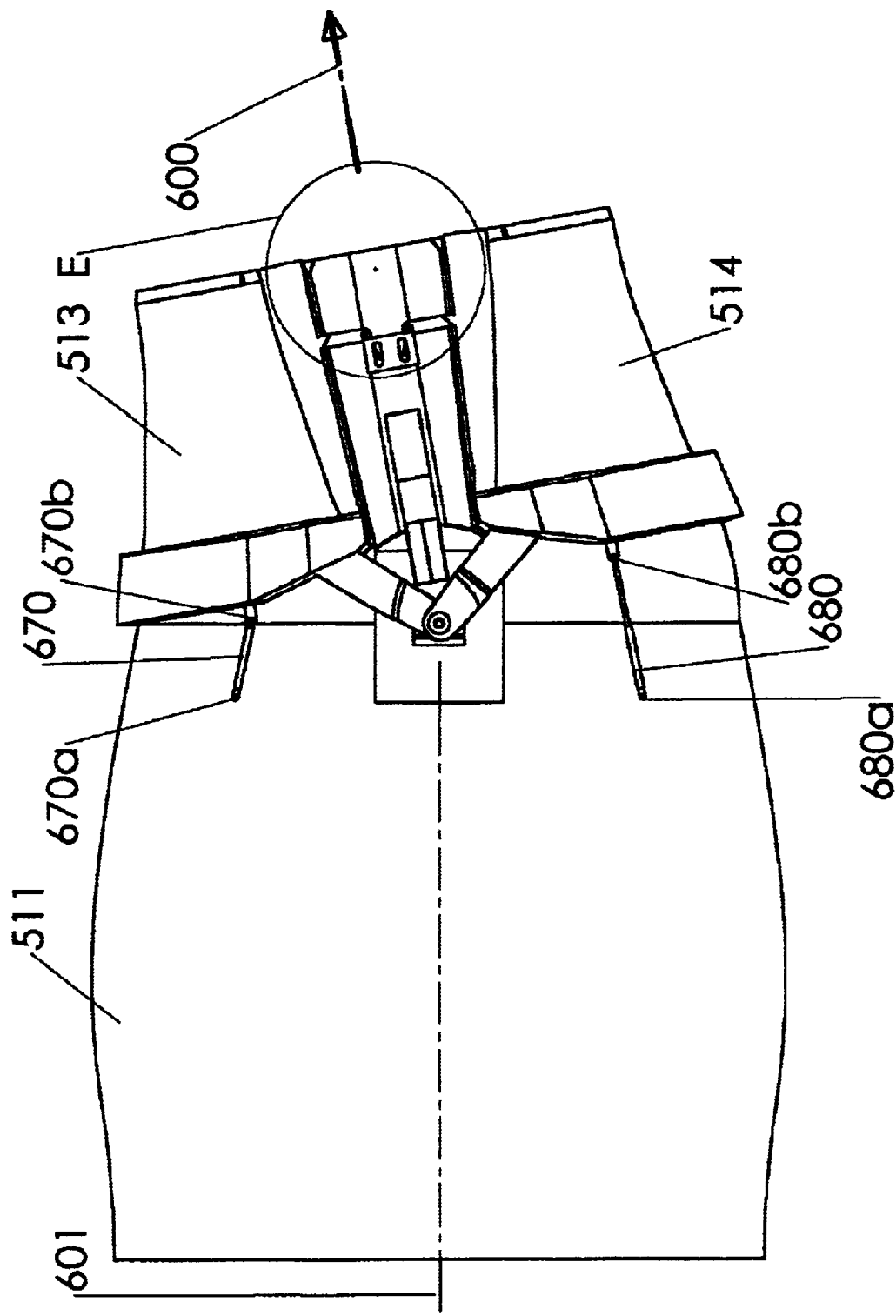
FIG. 39 depicts a side view of the nozzle of FIG. 35 with the outer skin of the jet pipe and the shells removed, the nozzle being showing in a nozzle-up position.
Figure 39A:
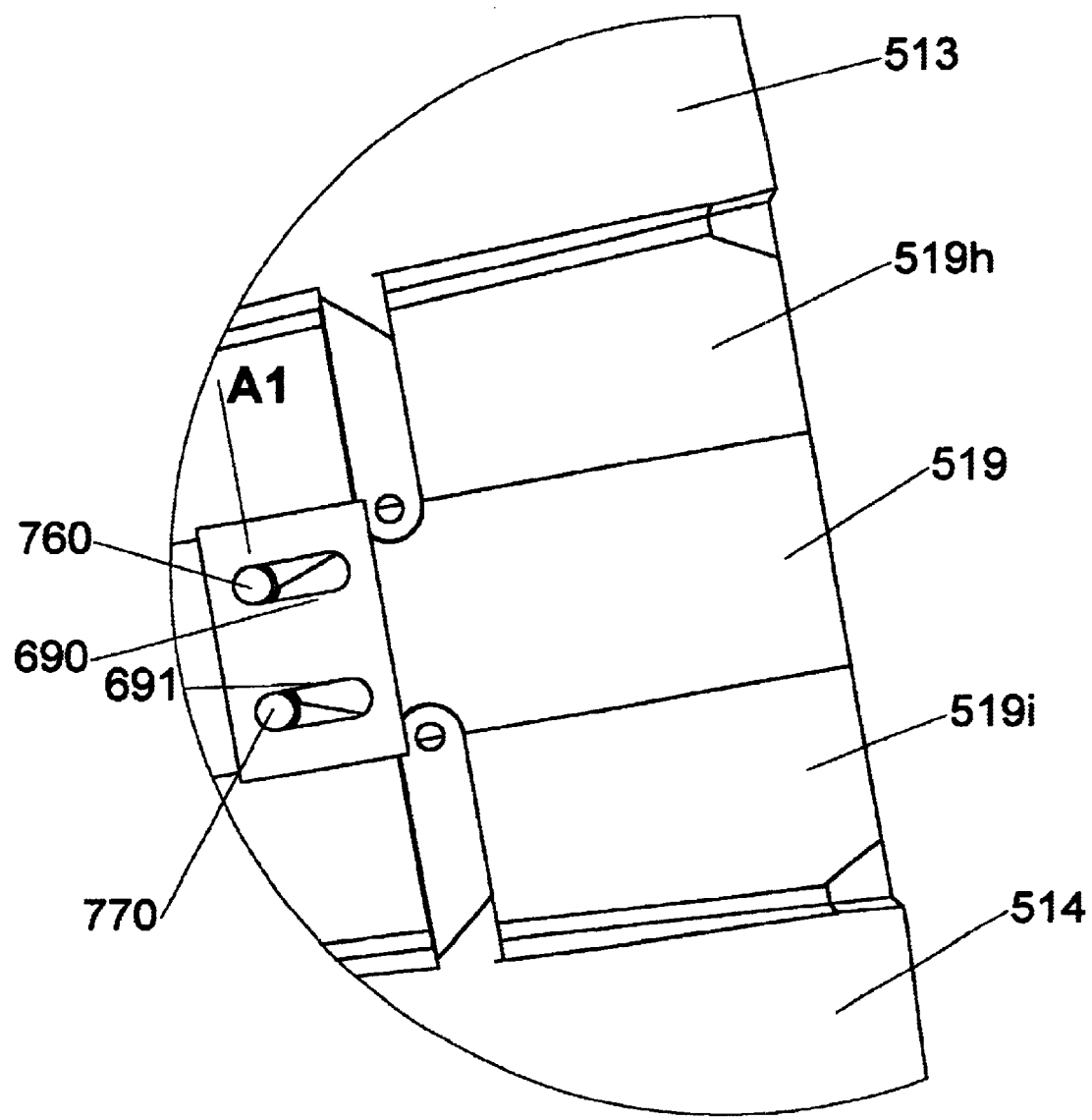
FIG. 39a illustrates an enlarged side view of the nozzle of FIG. 39 taken at Detail E.
Figure 40:
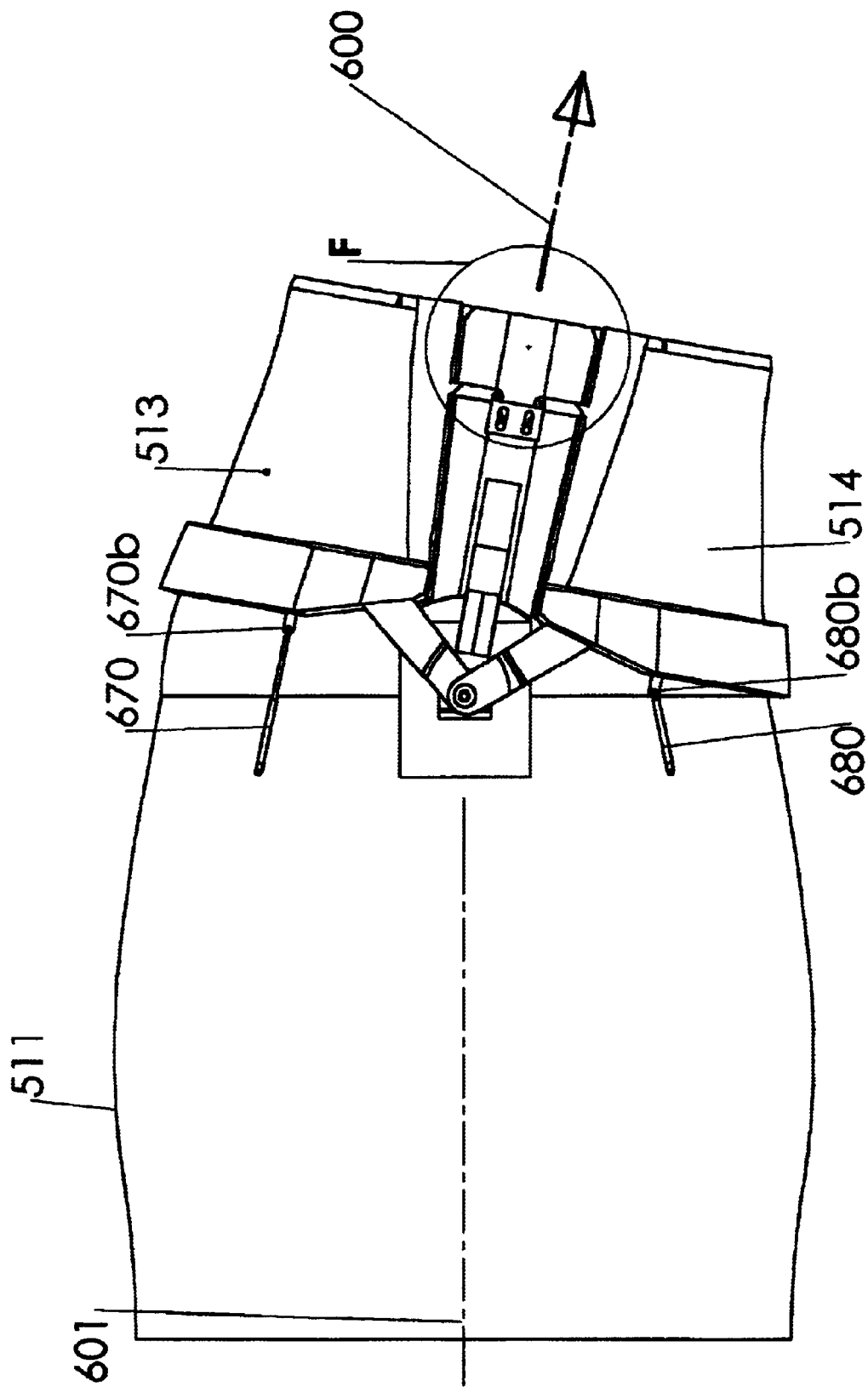
FIG. 40 depicts a side view of the nozzle of FIG. 35 with the outer skin of the jet pipe and the shells removed, the nozzle being showing in a nozzle-down position.

Referring to FIGS. 39 and 40, the actuators 670 and 680, are activated in a first method of operation to control the angular position of the exhaust nozzle by non-symmetrical activation. In FIG. 39, this causes the actuation system to provide a non-symmetrical rotation to the shells 513 and 514, such that the two shells rotate towards an upward position to cause the nozzle to have a "nozzle up position." In FIG. 40, the non-symmetrical activation provides rotation of the shells 513, and 514 to a downward position to cause the exhaust nozzle to have a "nozzle down" position. In the case of FIG. 39, the thrust vector 600 is located above the jet pipe centerline 601, while the thrust vector 600 in FIG. 40 falls below the centerline 601. With reference to FIGS. 39a, 40a, which are respective details E and F of FIGS. 39 and 40, when the shells 513, 514 are non-symmetrically controlled, the respective ends 760, 770 of links 730, 740 have not moved in their associated guiding tracks 690, 691 of fitting 800. Instead, the ends 760, 770 are still in position A1. FIGS. 38 and 39 show that the position of the ends 760, 770 of links 730, 740 in their associated tracks is the same whether the shells 513, 514 are in the neutral position depicted in FIGS. 38 and 38a, in the nozzle-up position depicted in FIGS. 39 and 39a, or in the nozzle-down position depicted in FIGS. 40 and 40a. When the apparatus is in the nozzle up position or the nozzle down position the exhaust area of the nozzle that is formed by the two shells is the same and equal to the nominal exhaust area of the nozzle depicted in FIG. 38. A characteristic of this actuation system embodiment is that the extension arms 519, 519' of the jet pipe 511 rotate with the shells and are driven by the shells when said shells are non-symmetrically driven by their associated actuators 670 and 680.

Figure 41:
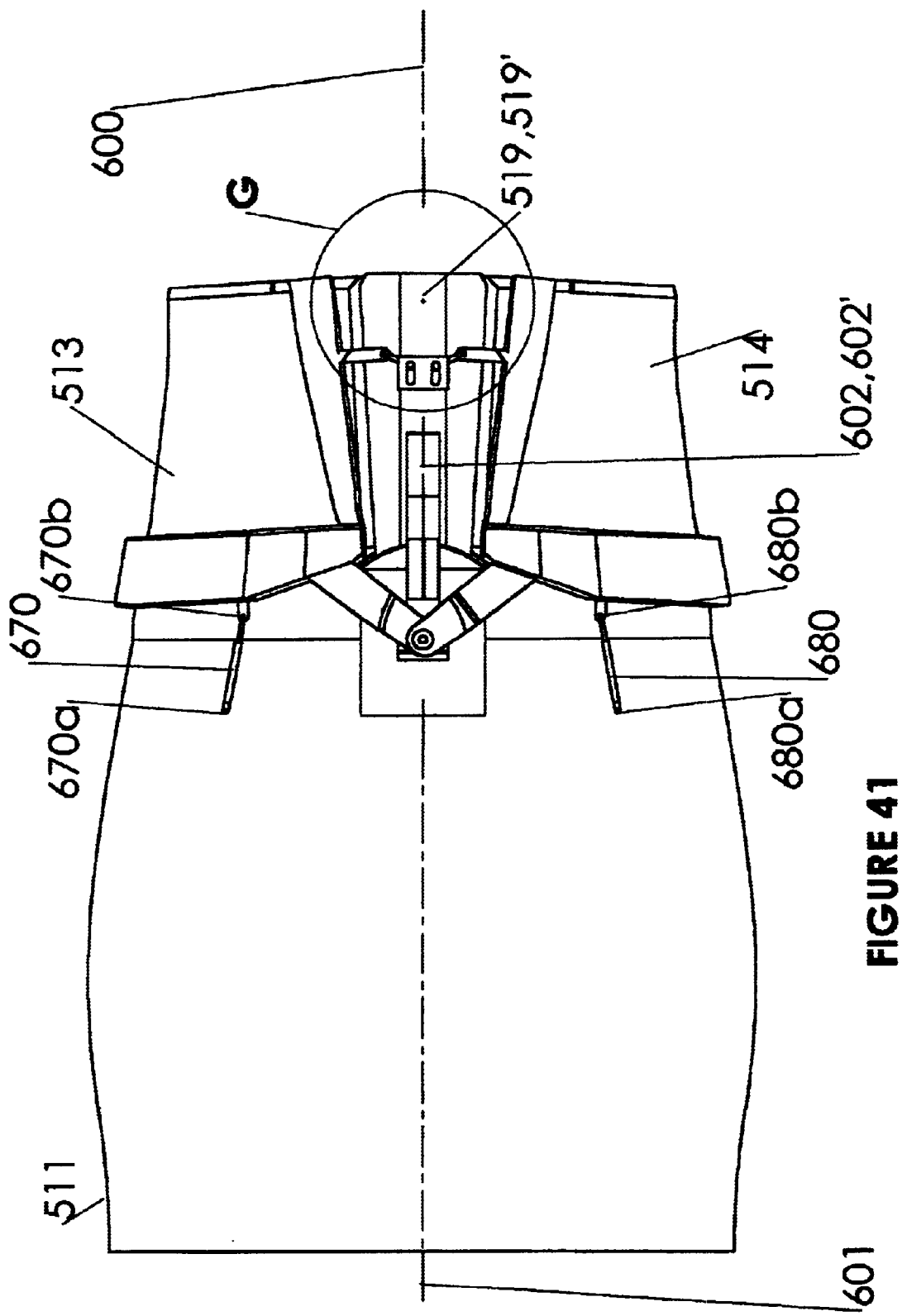
FIG. 41 depicts a side view of the nozzle of FIG. 35 with the outer skin of the jet pipe and the shells removed, the nozzle being showing in an increased exhaust area position.

In reference to FIGS. 41 and 41a, the actuators 670, 680 are activated symmetrically to provide a second mode of operation. This causes the actuators to provide a symmetrical rotation to the shells 513 and 514, so that the exhaust area of the nozzle, formed by the shells, can be increased. In these cases, the thrust vector 600 remains aligned and parallel to the jet pipe centerline 601. FIG. 41 shows another characteristic of this actuation system embodiment. When the shells are symmetrically controlled by their respective actuators 670, 680, the extension arms 519, 519' do not pivot and consequently their longitudinal axes 602, 602' remain parallel to the longitudinal axis 601 of the jet pipe. Referring to FIG. 41a, a detail G of FIG. 41, when the shells 513, 514 are symmetrically controlled, the respective ends 760, 770 of links 730, 740 have moved rearward to position A2 in their associated guiding tracks 690, 691 of fitting 800.

In the alternate nozzle embodiment first illustrated in FIG. 35, the actuators 670, 680 are similar to the ones already depicted in the preferred embodiment of the apparatus. Therefore, no further description is provided. It is apparent from the previous description and from FIGS. 38, 39, 40 and 41 that the same actuators 670, 680 are capable of two different functions for providing two methods of operation. One function is to modify the angular position of the exhaust nozzle, i.e., providing a nozzle up position (FIG. 39) or a nozzle down position (FIG. 40). The other function is to increase the exhaust area of the exhaust nozzle without modification of the thrust-vector angle (FIG. 41).

Variations in the type and location of the actuators for both the preferred and alternate embodiments may be made without departing from the scope and spirit of the present invention. For example, linear, gear driven, electromechanical, hydraulic, or pneumatic actuators may be used without departing from the scope of the invention. Furthermore, variations in the shape and relative dimensions of the shells used may be made without departing from the intended scope of the invention. For example, although it is expected that the preferred shape of the exhaust area of the nozzle will be circular, it is also appreciated that non-circular areas may be used in some circumstances without departing from the scope of the present invention. Thus, this application and the appended claims are intended to cover any and all variations, modifications and adaptations as may fall within the spirit of the invention.

It should be apparent from the foregoing that an invention having significant advantages has been provided. While the invention is shown in only a few of its forms, it is not just limited but is susceptible to various changes and modifications without departing from the spirit thereof.

I claim:

1. An engine nozzle mounted on a jet pipe of an engine, the nozzle comprising:
    a first extension arm pivotally cooperating with an inner surface of the jet pipe at a first location;
    a second extension arm pivotally cooperating with the inner surface of the jet pipe at a second location, the first and second locations being coaxial about a fixed axis;
    a first shell pivotally connected to the jet pipe at the first and second location; and
    a second shell pivotally connected to the jet pipe at the first and second location, the first and second extensions cooperating with inner surfaces of the first and second shells to form an inner surface of the engine nozzle.

2. An engine nozzle according to claim 1 further comprising:
    a first actuator operably attached between the jet pipe and at least one of the extension arms; and
    a second actuator operably attached between at least one of the extension arms and at least one of the shells.

3. An engine nozzle according to claim 1 further comprising:
    a first actuator operably attached between the jet pipe and at least one of the extension arms;
    a second actuator operably attached between at least one of the extension arms and at least one of the shells;
    wherein the first actuator permits adjustment of the value of a thrust-vector angle; and
    wherein the second actuator permits adjustment of the value of a nozzle exhaust area.

4. An engine nozzle according to claim 1 further comprising:
    an actuator operably attached between the jet pipe and at least one of the shells; and
    wherein the at least one of the shells is operably attached to at least one of the extension arms.

5. An engine nozzle according to claim 1, further comprising:
    an actuator operably attached between the jet pipe and at least one of the shells;
    wherein the at least one of the shells is operably attached to at least one of the extension arms; and
    wherein the actuator permits adjustment of one of the value of a thrust-vector angle and the value of a nozzle exhaust area.

6. An engine nozzle according to claim 1, wherein the shells and extension arms are capable of providing simultaneous adjustment of the nozzle exhaust area and the thrust-vector angle.

7. A jet engine nozzle mounted on a jet pipe of an engine and adapted to provide a variable exhaust area and a variable thrust-vector angle, the nozzle comprising:
    a first extension arm pivotally connected to the jet pipe at a first location;
    a second extension arm pivotally connected to the jet pipe at a second location;
    the first and second locations being coaxial about a fixed axis;
    a first shell pivotally connected to the jet pipe at the first and second location;
    a second shell pivotally connected to the jet pipe at the first and second location; and
    actuation means for selectively rotating the extension arms and the shells about pivotal axes of the first and second locations.

8. A jet engine nozzle according to claim 7, wherein the actuation means further comprises:
    a first actuator operably attached between the jet pipe and at least one of the extension arms; and
    a second actuator operably attached between at least one of the extension arms and at least one of the shells.

9. A jet engine nozzle according to claim 7, wherein the actuation means further comprises:
    a first actuator operably attached between the jet pipe and at least one of the extension arms;
    a second actuator operably attached between at least one of the extension arms and at least one of the shells;
    wherein the first actuator permits adjustment of the value of a thrust-vector angle; and
    wherein the second actuator permits adjustment of the value of a nozzle exhaust area.

10. A jet engine nozzle according to claim 7, wherein the actuation means further comprises:
    an actuator operably attached between the jet pipe and at least one of the shells; and
    wherein the at least one of the shells is operably attached to at least one of the extension arms.

11. A jet engine nozzle according to claim 7, wherein the actuation means further comprises:
    an actuator operably attached between the jet pipe and at least one of the shells;
    wherein the at least one of the shells is operably attached to at least one of the extension arms;
    wherein the actuator permits adjustment of one of the value of a thrust-vector angle and the value of a nozzle exhaust area.

12. A jet engine nozzle according to claim 7, wherein the shells and extension arms are capable of providing simultaneous adjustment of the nozzle exhaust area and the thrust-vector angle.

13. A jet engine nozzle mounted on a jet pipe of an engine and adapted to provide a variable nozzle exhaust area and a variable thrust-vector angle, the nozzle comprising:
    a first extension arm pivotally connected to a jet pipe at a first location;

a second extension arm pivotally connected to the jet pipe at a second location;

a first shell having a pair of first hinge arms, each first hinge arm having a distal end, one of the first hinge arms being pivotally connected to the jet pipe at the first location and the other of the first hinge arms being pivotally connected to the jet pipe at the second location;

a second shell having a pair of second hinge arms, each second hinge arm having a distal end, one of the second hinge arms being pivotally connected to the jet pipe at the first location and the other of the second hinge arms being pivotally connected to the jet pipe at the second location;

a first actuator having a first end connected to the jet pipe and a second end connected to the first extension arm; and a second actuator connected to one of the first and second extension arms, the second actuator being capable of driving a cross arm operably connected to both the first and second shells.

14. A jet engine nozzle according to claim 13, wherein:

the extension arms each include a distal arm; and wherein the first end of the first actuator is pivotally connected to the jet pipe and the second end is pivotally to the distal arm of one of the extension arms.

15. A jet engine nozzle according to claim 13, wherein the second actuator controls synchronous and symmetrical rotation of the first and second shells to enable variation of the nozzle exhaust area.

16. A jet engine nozzle according to claim 13, wherein the first actuator controls rotation of the first extension arm and the first and second shells to enable variation of the thrust-vector angle.

17. A jet engine nozzle according to claim 13, further comprising:

a first seal connected at a first end to the first shell and at a second end to the first extension arm, the jet pipe, and the second extension arm; and a second seal connected at a first end to the second shell and at a second end to the first extension arm, the jet pipe, and the second extension arm.

18. A jet engine nozzle according to claim 17, wherein the first and seals are accordion seals.

19. A jet engine nozzle according to claim 13, further comprising:

a third actuator having a first end connected to the jet pipe and a second end connected to the second extension arm; and a fourth actuator connected to the one of the first and second extension arms not connected to the second actuator, the fourth actuator being capable of driving a second cross arm operably connected to the both the first and second shells.

* * * * *

UNITED STATES PATENT AND TRADEMARK OFFICE
CERTIFICATE OF CORRECTION

PATENT NO. : 6,938,408 B2
DATED : September 6, 2005
INVENTOR(S) : Jean-Pierre Lair It is certified that error appears in the above-identified patent and that said Letters Patent is hereby corrected as shown below:

Column 7,
Line 6, after "taken at" insert -- Detail G. --.

Column 10,
Line 5, "devises" should be -- clevises --.

Signed and Sealed this

Sixth Day of December, 2005

JON W. DUDAS
*Director of the United States Patent and Trademark Office*